United States Patent
Gao et al.

(10) Patent No.: US 11,474,355 B2
(45) Date of Patent: Oct. 18, 2022

(54) METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY

(71) Applicant: MAGIC LEAP, INC., Plantation, FL (US)

(72) Inventors: Chunyu Gao, Tucson, AZ (US); Hong Hua, Tucson, AZ (US)

(73) Assignee: Magic Leap, Inc., Plantation, FL (US)

( * ) Notice: Subject to any disclaimer, the term of this patent is extended or adjusted under 35 U.S.C. 154(b) by 353 days.

(21) Appl. No.: 16/123,711

(22) Filed: Sep. 6, 2018

(65) Prior Publication Data
US 2019/0018247 A1    Jan. 17, 2019

Related U.S. Application Data

(63) Continuation of application No. 14/726,396, filed on May 29, 2015, now Pat. No. 10,156,722.

(Continued)

(51) Int. Cl.
*G02B 27/01* (2006.01)
*G02B 3/14* (2006.01)
(Continued)

(52) U.S. Cl.
CPC .......... *G02B 27/0172* (2013.01); *G02B 3/12* (2013.01); *G02B 26/0833* (2013.01); *G02B 3/14* (2013.01);
(Continued)

(58) Field of Classification Search
CPC ............................ G02B 27/01; G02B 27/0101; G02B 27/0103; G02B 27/017; G02B 27/0172;
(Continued)

(56) References Cited

U.S. PATENT DOCUMENTS

| 4,472,737 A | 9/1984 | Iwasaki |
| 4,909,613 A | 3/1990 | Kikuchi |

(Continued)

FOREIGN PATENT DOCUMENTS

| AU | 2015266585 | 5/2015 |
| AU | 2015266670 | 5/2015 |

(Continued)

OTHER PUBLICATIONS

Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481 A, Mar. 12, 2013. doi: 10.1117/12.2005117. (Year: 2013).*

(Continued)

*Primary Examiner* — Nicholas R. Pasko
(74) *Attorney, Agent, or Firm* — Vista IP Law Group, LLP

(57) ABSTRACT

Several unique hardware configurations and methods for freeform optical display systems are disclosed. A freeform display system includes primary freeform optical element(s) and secondary freeform optical element(s) in tiled arrangements to expand the horizontal field of view (FOV) or the vertical field of view. The system may include a variable focusing system that produces intermediate pupil and changes the focal distance of a single focal plane or switches among multiple focal planes for rendering objects in focus while resolving accommodation-convergence conflict. The system may map light samples to appropriate light rays in physical space and use a cluster of projectors to project the mapped light rays to produce the light field of the virtual display content. Methods for making tiled freeform optical display systems and methods for producing virtual content (Continued)

with variable focus freeform optics and rendering light fields are also disclosed.

17 Claims, 31 Drawing Sheets

Related U.S. Application Data

(60) Provisional application No. 62/005,865, filed on May 30, 2014.

(51) Int. Cl.
  *G02B 3/12* (2006.01)
  *G02B 26/08* (2006.01)

(52) U.S. Cl.
  CPC .... *G02B 26/0825* (2013.01); *G02B 2027/011* (2013.01); *G02B 2027/0118* (2013.01); *G02B 2027/0123* (2013.01); *G02B 2027/0127* (2013.01); *G02B 2027/0134* (2013.01); *G02B 2027/0147* (2013.01)

(58) Field of Classification Search
  CPC ...... G02B 2027/011; G02B 2027/0118; G02B 2027/012; G02B 2027/0121; G02B 2027/0123; G02B 2027/0125; G02B 2027/0127; G02B 2027/0129; G02B 2027/013; G02B 2027/0145; G02B 2027/0147; G02B 2027/0174; G02B 3/12; G02B 3/14
  USPC ..................... 359/630–633; 349/11
  See application file for complete search history.

(56) References Cited

U.S. PATENT DOCUMENTS

| | | |
|---|---|---|
| 5,729,242 A | 3/1998 | Margerum et al. |
| 5,751,494 A | 5/1998 | Takahashi |
| 5,764,317 A | 6/1998 | Sadovnik et al. |
| 5,880,711 A | 3/1999 | Tamada |
| 5,889,567 A | 3/1999 | Swanson et al. |
| 6,046,720 A | 4/2000 | Melville et al. |
| 6,069,650 A | 5/2000 | Battersby |
| 6,120,538 A | 9/2000 | Rizzo et al. |
| 6,215,928 B1 | 4/2001 | Friesem et al. |
| 6,504,629 B1 | 1/2003 | Popovich et al. |
| 7,077,523 B2 | 7/2006 | Seo et al. |
| 7,428,001 B2* | 9/2008 | Schowengerdt ..... H04N 13/144 348/E13.067 |
| 7,555,333 B2 | 6/2009 | Wang et al. |
| 7,616,382 B2 | 11/2009 | Inoguchi et al. |
| 7,784,697 B2 | 8/2010 | Johnston et al. |
| 8,248,458 B2* | 8/2012 | Schowengerdt ..... G02B 26/005 348/51 |
| 8,259,164 B2 | 9/2012 | Saito et al. |
| 8,317,330 B2 | 11/2012 | Yamazaki et al. |
| 8,384,999 B1 | 2/2013 | Crosby et al. |
| 8,757,812 B2 | 6/2014 | Melville et al. |
| 9,348,143 B2 | 5/2016 | Gao et al. |
| 9,740,006 B2* | 8/2017 | Gao ..................... G02B 27/0172 |
| 9,791,700 B2 | 10/2017 | Schowengerdt |
| 9,846,967 B2 | 12/2017 | Schowengerdt |
| 9,857,591 B2 | 1/2018 | Welch et al. |
| 9,915,824 B2 | 3/2018 | Schowengerdt et al. |
| 9,915,826 B2 | 3/2018 | Tekolste et al. |
| 10,156,722 B2* | 12/2018 | Gao ..................... G02B 27/0172 |
| 10,234,687 B2 | 3/2019 | Welch et al. |
| 10,317,690 B2 | 6/2019 | Cheng |
| 10,466,486 B2 | 11/2019 | Tekolste et al. |
| 10,848,740 B2 | 11/2020 | Li et al. |
| 11,150,489 B2 | 10/2021 | Cheng |
| 2001/0013960 A1 | 8/2001 | Popovich et al. |
| 2002/0163482 A1 | 11/2002 | Sullivan |
| 2003/0020879 A1 | 1/2003 | Sonehara |
| 2004/0109234 A1 | 6/2004 | Levola |
| 2004/0227703 A1 | 11/2004 | Lamvik et al. |
| 2006/0012851 A1 | 1/2006 | Wu et al. |
| 2006/0028400 A1 | 2/2006 | Lapstun et al. |
| 2006/0072843 A1 | 4/2006 | Johnston |
| 2006/0120706 A1 | 6/2006 | Cho et al. |
| 2008/0204394 A1 | 8/2008 | Cho |
| 2008/0259463 A1 | 10/2008 | Shepherd |
| 2008/0316610 A1 | 12/2008 | Dobrusskin |
| 2009/0040138 A1 | 2/2009 | Takahashi et al. |
| 2009/0129116 A1 | 5/2009 | Kim et al. |
| 2009/0316116 A1 | 12/2009 | Melville et al. |
| 2010/0039707 A1 | 2/2010 | Akahane et al. |
| 2010/0149073 A1 | 6/2010 | Chaum et al. |
| 2010/0202054 A1 | 8/2010 | Niederer |
| 2010/0289970 A1 | 11/2010 | Watanabe |
| 2011/0051226 A1 | 3/2011 | Vallius et al. |
| 2011/0075257 A1* | 3/2011 | Hua ..................... H04N 13/322 359/464 |
| 2011/0109823 A1 | 5/2011 | Galstian et al. |
| 2011/0199582 A1 | 8/2011 | Kuriki |
| 2012/0075534 A1 | 3/2012 | Katz et al. |
| 2012/0081800 A1* | 4/2012 | Cheng ..................... G03B 21/00 359/720 |
| 2012/0105310 A1 | 5/2012 | Sverdrup et al. |
| 2012/0113092 A1 | 5/2012 | Bar-Zeev et al. |
| 2012/0162549 A1* | 6/2012 | Gao ..................... G02B 27/0172 359/651 |
| 2012/0192991 A1 | 8/2012 | Gupta et al. |
| 2013/0050832 A1 | 2/2013 | Tohara et al. |
| 2013/0128230 A1 | 5/2013 | Macnamara |
| 2013/0135299 A1 | 5/2013 | Park et al. |
| 2013/0176628 A1 | 7/2013 | Batchko et al. |
| 2013/0187836 A1 | 7/2013 | Cheng et al. |
| 2013/0250430 A1 | 9/2013 | Robbins et al. |
| 2013/0265647 A1 | 10/2013 | Kern |
| 2013/0300635 A1* | 11/2013 | White ..................... H04N 13/383 345/7 |
| 2013/0314793 A1 | 11/2013 | Robbins et al. |
| 2014/0009845 A1 | 1/2014 | Cheng et al. |
| 2014/0035959 A1 | 2/2014 | Lapstun |
| 2014/0063055 A1 | 3/2014 | Osterhout et al. |
| 2014/0071539 A1 | 3/2014 | Gao |
| 2014/0111616 A1 | 4/2014 | Blayvas |
| 2014/0132501 A1 | 5/2014 | Choi et al. |
| 2014/0168034 A1 | 6/2014 | Luebke et al. |
| 2014/0184477 A1 | 7/2014 | Hino et al. |
| 2014/0192078 A1 | 7/2014 | Gilbert et al. |
| 2014/0232651 A1 | 8/2014 | Kress et al. |
| 2014/0266986 A1 | 9/2014 | Magyari |
| 2014/0266990 A1 | 9/2014 | Makino et al. |
| 2014/0300966 A1 | 10/2014 | Travers et al. |
| 2015/0016777 A1 | 1/2015 | Abovitz et al. |
| 2015/0035880 A1 | 2/2015 | Heide et al. |
| 2015/0062345 A1 | 3/2015 | Kusanagi |
| 2015/0116721 A1 | 4/2015 | Kats et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234191 A1 | 8/2015 | Schowengerdt |
| 2015/0234205 A1 | 8/2015 | Schowengerdt |
| 2015/0248012 A1 | 9/2015 | Schowengerdt |
| 2015/0260992 A1 | 9/2015 | Luttmann et al. |
| 2015/0268467 A1 | 9/2015 | Cakmakci et al. |
| 2015/0277129 A1* | 10/2015 | Hua ..................... G02B 27/0101 359/462 |
| 2015/0309263 A2 | 10/2015 | Abovitz et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2017/0160548 A1 | 6/2017 | Woltman |
| 2017/0293141 A1 | 10/2017 | Schowengerdt et al. |

(56) References Cited

U.S. PATENT DOCUMENTS

| | | | |
|---|---|---|---|
| 2018/0172998 A1 | 6/2018 | Tekolste et al. | |
| 2020/0176714 A1 | 6/2020 | Fusella et al. | |

FOREIGN PATENT DOCUMENTS

| | | | | |
|---|---|---|---|---|
| AU | 2017246864 B2 | 10/2017 | | |
| AU | 2015266670 | 5/2019 | | |
| AU | 2019219728 | 7/2021 | | |
| CN | 104360484 | 2/2015 | | |
| DE | 10 2007 021036 | 11/2008 | | |
| EP | 0785457 A2 | 7/1997 | | |
| EP | 0785457 A3 | 7/1997 | | |
| EP | 1962130 A2 | 8/2008 | | |
| JP | 58-57108 | 4/1983 | | |
| JP | 8-166559 | 6/1996 | | |
| JP | 08-184783 | 7/1996 | | |
| JP | 2002-116410 | 4/2002 | | |
| JP | 2002-512408 | 4/2002 | | |
| JP | 2002-196280 | 7/2002 | | |
| JP | 2004-252429 | 9/2004 | | |
| JP | 2006-3872 | 1/2006 | | |
| JP | 2007-505352 | 3/2007 | | |
| JP | 2007-101790 | 4/2007 | | |
| JP | 2007-514190 | 5/2007 | | |
| JP | 2009-169142 | 7/2009 | | |
| JP | 2009-186794 | 8/2009 | | |
| JP | 2010-008948 | 1/2010 | | |
| JP | 2010-039219 | 2/2010 | | |
| JP | 2010-204397 | 9/2010 | | |
| JP | 2011-077764 | 4/2011 | | |
| JP | 2014-505381 | 2/2014 | | |
| JP | 2014-092696 | 5/2014 | | |
| JP | 2014-132328 | 7/2014 | | |
| JP | 2014-222302 | 11/2014 | | |
| KR | 10-2008-0079005 | 8/2008 | | |
| KR | 10-2013-0139280 | 12/2013 | | |
| WO | WO 02/086590 | 10/2002 | | |
| WO | WO 2005/024491 | 3/2005 | | |
| WO | WO 2006017771 | 2/2006 | | |
| WO | WO 2006/070308 | 7/2006 | | |
| WO | WO 2008071830 | 6/2008 | | |
| WO | WO 20090014525 | 1/2009 | | |
| WO | WO 2011/074572 | 6/2011 | | |
| WO | WO 2011/134169 | 11/2011 | | |
| WO | WO 2011134169 | 11/2011 | | |
| WO | WO 2012/088478 | 6/2012 | | |
| WO | WO 2013/049248 | 4/2013 | | |
| WO | WO 2013/162977 | 10/2013 | | |
| WO | WO 2014/062912 | 4/2014 | | |
| WO | WO 2014053194 | 4/2014 | | |
| WO | WO 2014062912 | 4/2014 | | |
| WO | WO-2014062912 A1 * | 4/2014 | ........... | G02B 17/086 |
| WO | WO 2014064228 | 5/2014 | | |
| WO | WO 2015184409 | 12/2015 | | |
| WO | WO 2017176861 | 10/2017 | | |

OTHER PUBLICATIONS

Response to 2nd Office Action filed Dec. 25, 2018 for Chinese application No. 201580041059.8, in Chinese language.
Notice of Allowance dated Jan. 24, 2019 for U.S. Appl. No. 14/611,162.
Office Action dated Jan. 11, 2019 for Chinese Application No. 201580017627.0, including translation provided by Chinese associate.
Office action dated Jan. 15, 2019 for Israeli application No. 249091, in Israeli language with translation provided by foreign associate.
Response to Office action filed Mar. 4, 2019 for U.S. Appl. No. 14/611,154.
Notice of Allowance dated Mar. 5, 2019 for JP application No. 2016-549347.
Response to 2nd Office Action filed Mar. 20, 2019 for Chinese application No. 201580017627.0, in Chinese language only.
Response to Examination Report filed Mar. 22, 2019 for Australian application No. 2015266670.
Notice of Allowance dated Apr. 1, 2019 for JP application No. 2016-549247.
Office Action dated Mar. 15, 2019 for Japanese Application No. 2016-570027 with English Translation from foreign associate.
Notice of Allowance dated Apr. 9, 2019 for U.S. Appl. No. 14/611,154.
Office Action dated Apr. 1, 2019 for Japanese Application No. 2016-570034 with English Translation from foreign associate.
Office Action dated Mar. 1, 2019 for Chinese Application No. 201580041033.3, including translation provided by Chinese associate.
Notice of Allowance for U.S. Appl. No. 14/726,396 dated Sep. 28, 2018.
Non-Final Office Action for U.S. Appl. No. 15/896,438 dated Nov. 2, 2018.
Final Office Action for U.S. Appl. No. 15/479,700 dated Nov. 2, 2018.
Office action dated Sep. 7, 2018 for AU Application No. 2015266670.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to Final office action filed Jul. 30, 2018 for U.S. Appl. No. 14/611,154.
Response to Extended European Search Report dated Aug. 14, 2018 for EP application No. 15799569.7, 11 pages.
Office Action dated Jul. 20, 2018 for Chinese Application No. 201580017626.6, including translation provided by Chinese associate.
Notice of Allowance dated Sep. 10, 2018 for U.S. Appl. No. 15/819,887.
Office Action dated Sep. 25, 2018 for Japanese Application No. 2016-549247 with English Translation from foreign associate.
Office Action dated Oct. 6, 2018 for Australian Application No. 2015210704.
Office Action dated Sep. 21, 2018 for Japanese Application No. 2016-549347, including translation provided by Japanese associate.
Office Action dated Oct. 8, 2018 for Chinese Patent Appln. No. 20150041033.3, in Chinese language only.
Office Action response filed Dec. 3, 2018 for Chinese Appln. No. 201580017626.6, in Chinese language with claims in English.
Response to Office Action filed Nov. 29, 2018 for Japanese Application No. 2016-549347, with claims in English provided by foreign associate.
Non Final Office Action dated Dec. 4, 2018 for U.S. Appl. No. 14/611,154.
Response to Office action filed Aug. 13, 2018 for Chinese application No. 201580017627.0, in Chinese language with claims in English.
Non final office action dated Jun. 27, 2018 for U.S. Appl. No. 14/611,162.
Response to Non final office action filed Sep. 26, 2018 for U.S. Appl. No. 14/611,162.
Response to Office action filed Dec. 18, 2018 for Japan application No. 2016-54927, in Japanese language with claims in English.
Office Action dated Feb. 6, 2020 for Korean Patent Application No. 10-2016-7023727, (2 pages).
1st Examination Report for EP Patent Appln. No. 15799774.3 dated Feb. 20, 2020.
Foreign Office Action for Japanese Patent Appln. No. 2016-570027 dated Feb. 10, 2020.
Examiner's Report for New Zealand Appln. No. 722903 dated Feb. 7, 2020.
Response to Examination Report for Australian Application No. 2015266585 filed Apr. 8, 2020, 18 pages.
Response to First Examination Report for New Zealand Application No. 727365 dated Apr. 21, 2020.
Response to First Examination Report for New Zealand Application No. 727361 dated Mar. 9, 2020.

(56) References Cited

OTHER PUBLICATIONS

Foreign Office Action for Indian Patent Appln. No. 201647026958 dated Apr. 23, 2020.
Office Action Response filed Apr. 30, 2020 for Japanese Application No. 2016-570027, in Japanese language with claims in English.
Foreign Notice of Allowance for CA Patent Appln. No. 2938264 dated Apr. 9, 2020.
Foreign Office Action for New Zealand Patent Appln. No. 722904 dated May 8, 2020.
Foreign Notice of Allowance for JP Patent Appln. No. 2016-570027 dated May 8, 2020.
First Examination Report dated May 12, 2019 for New Zealand Patent Application No. 722903.
Notice of Acceptance for AU Patent Appln. No. 2015266585 dated May 11, 2020.
Foreign Office Action for KR Patent Appln. No. 10-2016-7023729, dated May 25, 2020.
Foreign Office Action for CN Patent Appln. No. 201580041033.3, dated May 11, 2020.
Foreign Office Action for KR Patent Appln. No. 10-2016-7036877, dated Jun. 19, 2020.
Extended European Search Report for EP Patent Appln. No. 20173220.3 dated Jun. 18, 2020.
Foreign Office Action for CN Patent Appln. No. 201580041033.3, dated Jul. 15, 2020.
Foreign Examiner's Report for CA Patent Appln. No. 2950429 dated Jul. 9, 2020.
Foreign Office Action Response for European Patent Appln. No. 15799774.3 dated Jul. 1, 2020.
Foreign Response for KR Patent Appln. No. 10-2016-7023729 dated Jul. 27, 2020.
Foreign OA Amendment for KR Patent Appln. No. 10-2016-7036877 dated Aug. 14, 2020.
1st Examination Report for AU Patent Appln. No. 2016262579 dated Jul. 17, 2020.
1st Examination Report for AU Patent Appln. No. 2019219728 dated Aug. 19, 2020.
Foreign Office Action for IL Patent Appln. No. 249089 dated Jul. 7, 2020.
Foreign Notice of Allowance for CA Patent Appln. No. 2938262 dated Aug. 5, 2020.
Foreign Office Action for KR Patent Appln. No. 10-2016-7023729 dated Sep. 14, 2020.
Foreign OA Response for JP Patent Appln. No. 2019-87069 dated Sep. 15, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign Response for NZ Patent Appln. No. 727365 dated Aug. 11, 2020.
Foreign 3rd Patent Exam Report for NZ Patent Appln. No. 727365 dated Sep. 30, 2020.
Non Final Office Action dated Jul. 7, 2020 U.S. Appl. No. 16/373,227 51 pages.
Amendment filed Oct. 7, 2020, U.S. Appl. No. 16/373,227 10pages.
Foreign OA Response for KR Patent Appln. No. 10-2016-7023729 dated Oct. 14, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign OA Response for KR Patent Appln. No. 10-2016-7036877 dated Oct. 16, 2020.
Foreign OA Response for CA Patent Appln. No. 2950429 dated Oct. 26, 2020.
Foreign Notice of Allowance for KR Patent Appln. No. 10-2016-7023729 dated Oct. 21, 2020.
Non-Final Office Action for U.S. Appl. No. 16/460,315 dated Jul. 28, 2020.
1st Patent Exam Report for NZ Patent Appln. No. 762432 dated Sep. 4, 2020.
Amendment Response to NFOA for U.S. Appl. No. 16/460,315 dated Oct. 28, 2020.
Foreign Office Action for Chinese Patent Appln. No. 201780021552.2 dated Feb. 6, 2020.
Notice of Allowance for U.S. Appl. No. 16/573,120 dated Apr. 15, 2020.
Amendment Response for U.S. Appl. No. 15/479,700 dated Jul. 2, 2020.
Foreign Office Action for Korean Patent Appln. No. 10-2016-7036875 dated Jul. 20, 2020.
Foreign Examiner's Report for AU Patent Appln. No. 2020204550 dated Jul. 13, 2020.
Foreign Office Action for CN Patent Appln. No. 201780021552.2 dated Jul. 15, 2020.
Foreign Office Action for JP Patent Application No. 2020-132801 dated Sep. 9, 2020.
Foreign OA Response for CN Patent Appln. No. 201780021552.2 dated Sep. 27, 2020.
Notice of Allowance for U.S. Appl. No. 16/868,826 dated Oct. 9, 2020.
Foreign 1st Exam Report for NZ Patent Appln. No. 762952 dated Oct. 1, 2020.
Final Office Action for U.S. Appl. No. 15/479,700 dated Oct. 27, 2020.
Response to Examination Report filed May 2, 2019 for Australian application No. 2015210704.
Notice of Acceptance dated Apr. 26, 2019 for Australian Application No. 2015266670.
Response to OA Filed May 13, 2019 for Israeli application No. 249091, in Israeli language with translation provided by foreign associate.
Notice of Allowance dated May 6, 2019 for Chinese Patent Application No. 201580017626.6; No English Translation.
First Examination Report dated May 3, 2019 for Australian Patent Application No. 2015210708.
Office Action dated May 30, 2019 for U.S. Appl. No. 16/261,455.
Response to 1st Office Action filed Jun. 11, 2019 for Japanese application No. 2016-570027, in Japanese language only.
Response to 1st Office Action filed Jun. 11, 2019 for Japanese application No. 2016-570034, in Japanese language only.
Office action dated Jun. 4, 2019 for Chinese application No. 201580041059.8, in Chinese language with a translation provided by the foreign associate.
Office Action dated Jun. 14, 2019 for Chinese Patent Application No. 201580017627.0, including translation provided by Chinese associate.
Response to OA filed Jul. 10, 2019 for Chinese Patent Application No. 201580041033.3, no English translation provided by Chinese associate, only amend claims in English.
Penultimate Office Action dated Aug. 6, 2019 for Japanese Application No. 2016-570027 with English Translation from foreign associate, 5 pages.
Response to OA filed Aug. 14, 2019 for Chinese Patent Application No. 201580041059.8, no English translation provided by Chinese associate, only amend claims in English, 80 pages.
Response to OA filed Aug. 23, 2019 for Chinese Patent Application No. 201580017627.0, no English translation provided by Chinese associate, 5 pgs.
Penultimate Office Action dated Aug. 1, 2019 for Japanese Application No. 2016-570034 with English Translation from foreign associate, 4 pages.
Amendment Response to OA filed for U.S. Appl. No. 16/261,455 dated Aug. 29, 2019.
Examination Report for European Application No. 15743704.7 dated Aug. 1, 2019, 6 pages.
Examination Report for New Zealand Application No. 727361 dated Sep. 13, 2019, 3 pages.
Examination Report for Australian Application No. 2015266585 dated Sep. 18, 2019, 4 pages.

(56) References Cited

OTHER PUBLICATIONS

Response to Penultimate Office Action filed Oct. 29, 2019, for Japanese Application No. 2016-570034 no English Translation, 3 pages.
Examination Report for New Zealand Application No. 727365 dated Oct. 31, 2019, 5 pages.
Non-Final Office Action for U.S. Appl. No. 14/611,154, dated Mar. 28, 2017.
Final Office Action for U.S. Appl. No. 14/611,154, dated Jul. 26, 2017.
PCT International Search Report and Written Opinion for International Appln. No. PCT/US15/13993, Applicant Magic Leap, Inc., dated Jun. 10, 2015, 7 pages.
Non-Final Office Action for U.S. Appl. No. 14/611,162, dated Dec. 7, 2016.
Final Office Action for U.S. Appl. No. 14/611,162, dated Jul. 24, 2017.
PCT International Search Report and Written Opinion for International Appln. No. PCT/US15/13998, Applicant Magic Leap, Inc., dated May 1, 2015, 9 pages.
Non-Final Office Action for U.S. Appl. No. 14/726,429, dated Sep. 2, 2016.
Final Office Action for U.S. Appl. No. 14/726,429, dated May 17, 2017.
PCT International Search Report and Written Opinion for International Appln. No. PCT/US15/33416, Applicant Magic Leap, Inc., dated Oct. 26, 2015, 12 pages.
Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481A, Mar. 12, 2013. doi: 10.1117/12.2005117.
Hu, Xinda. "Development Of The Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011, 2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11), Jun. 2, 2014,13896-13903. OI: 10.1364/0E.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., dated Oct. 26, 2015, 13 pages.
Response to Final Office Action for U.S. Appl. No. 14/726,429, filed Aug. 17, 2017.
Response to Non-Final Office Action for U.S. Appl. No. 14/611,154, filed Jun. 28, 2017.
Response to Non-Final Office Action for U.S. Appl. No. 14/611,162, filed Apr. 7, 2017.
Response to Non-Final Office Action for U.S. Appl. No. 14/726,396, filed Jun. 15, 2017.
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Notice of Allowance for U.S. Appl. No. 14/726,429 dated Sep. 13, 2017.
Extended European Search Report for EP Application No. 15743225.3 dated Sep. 19, 2017.
Amendment and Response to Final Office Action for U.S. Appl. No. 14/611,154, filed Oct. 26, 2017.
Amendment after Final Office Action filed Sep. 22, 2017 for U.S. Appl. No. 14/611,162.
Advisory Action dated Oct. 26, 2017 for U.S. Appl. No. 14/611,162.
Response to Non Final Office Action filed Feb. 28, 2017 for U.S. Appl. No. 14/726,429.
Amendment and Response accompanying RCE filed Nov. 22, 2017 for U.S. Appl. No. 14/611,162.
Amended Claims filed in EP Application No. 15799569.7 on Dec. 30, 2016.
Non-Final Office Action filed Dec. 26, 2017 for U.S. Appl. No. 14/611,154.
Extended European Search Report for EP Appln. No. 15799569.7 dated Jan. 18, 2018.
Extended European Search Report for EP Appln. No. 15799774.3 dated Jan. 2, 2018.
Shiro SUYAMA et al., "Three-Dimensional Display System with Dual-Frequency Liquid-Crystal Varifocal Lens", Jpn J. Appl. Phys., vol. 39 (2000) pp. 480-484, Part1, No. 2A, Feb. 2000, 6 pp.
Amendment after Non-Final Office Action for U.S. Appl. No. 14/726,396 dated Mar. 21, 2018.
Amendment after Non-Final Office Action for U.S. Appl. No. 14/611,154 dated Mar. 23, 2018.
Response to Extended EP Search report filed Mar. 29, 2018 for EP application No. 15743704.7.
Office action dated Feb. 2, 2018 for Chinese application No. 201580041059.8, office action is in Chinese language with a translation provided by the foreign associate.
Response to Extended EP Search report filed Apr. 12, 2018 for EP application No. 15743225.3.
Non-Final Office Action for U.S. Appl. No. 15/819,887, dated Apr. 19, 2018.
Final Office Action for U.S. Appl. No. 14/611,154, dated Apr. 30, 2018.
Office action dated Apr. 3, 2018 for Chinese application No. 201580017627.0, in Chinese language with English translation provided by the foreign associate.
Amendment after Non-Final Office Action filed Jul. 19, 2018 for U.S. Appl. No. 15/819,887.
Notice of Allowance for U.S. Appl. No. 14/726,396 dated Jul. 2, 2018.
Response to Extended European Search Report filed Jul. 30, 2018 for EP application No. 15799774.3.
Response to Extended European Search Report submited Aug. 14, 2018 for EP application No. 15799569.7, 11 pages.
Hu, et al. "High-resolution optical see-through multi-focal-plane head-mounted display using freeform optics," Optics Express, 22 (11), Jun. 2, 2014,13896-13903. DOI: 10.1364/0E.22.013896.
PCT International Search Report and Written Opinion for International Appln. No. PCT/US15/33412, Applicant Magic Leap, Inc., forms PCT/ISA/210, 220, and 237, dated Oct. 26, 2015 (13 pages).
Non-Final Office Action for U.S. Appl. No. 14/726,396 dated Mar. 15, 2017.
Final Office Action for U.S. Appl. No. 14/726,396 dated Aug. 16, 2017.
Restriction Requirement for U.S. Appl. No. 14/726,396 dated Sep. 1, 2017.
Response to Restriction Election dated Feb. 21, 2017 for U.S. Appl. No. 14/726,396.
PCT International Search Report and Written Opinion for International Appln. No. PCT/US2017/26102, Applicant Magic Leap, Inc., forms PCT/ISA/210, 220, and 237, dated Jun. 26, 2017 (9 pages).
PCT International Search Report and Written Opinion of the ISA (corrected version) dated Apr. 21, 2016, for PCT/US2016/14988, Applicant Magic Leap, Inc., dated Apr. 8, 2016 (13 pages).
Notice of Allowance for U.S. Appl. No. 15/007,117 dated Oct. 19, 2017.
Non-Final Office Action for U.S. Appl. No. 15/007,117 dated Apr. 6, 2017.

(56) References Cited

OTHER PUBLICATIONS

Response to Non-Final Office Action dated Jun. 30, 2017 for U.S. Appl. No. 15/007,117.
Response to Final Office Action filed Nov. 16, 2017 for U.S. Appl. No. 14/726,396.
Non-Final Office Action for U.S. Appl. No. 14/726,396 dated Dec. 21, 2017.
Non-Final Office Action dated Mar. 27, 2018 for U.S. Appl. No. 15/479,700.
Amendment after Non-Final Office Action for U.S. Appl. No. 15/479,700 dated Jun. 27, 2018.
Notice of Allowance for U.S. Appl. No. 15/896,438 dated Jul. 31, 2018.
Extended European Search Report dated Aug. 23, 2018 for EP application No. 16743992.6, Applicant Magic Leap, Inc. 8 pages.
Machine generated translation of Foreign Patent No. DE 10 2007 02136, granted Nov. 6, 2008, translation prepared Aug. 21, 2018, 21 pages.
Notice of Allowance dated Nov. 19, 2019 for U.S. Appl. No. 16/261,455.
Office Action dated Nov. 12, 2019 for Chinese Patent Application No. 201580041033.3, including English translation provided by Chinese associate (7 pages).
Response to Examination Report for European Application No. 15743704.7 filed Dec. 10, 2019, 10 pages.
Response to Examination Report for Australian Application No. 2015210708 filed Dec. 11, 2019, 18 pages.
Office action dated Dec. 12, 2019 for Chinese application No. 201580041059.8, in Chinese language with a translation provided by the foreign associate, 8 pages.
Office Action dated Decemeber 12, 2019 for Chinese Patent Application No. 201580017627.0, including English translation provided by Chinese associate, 5 pages.
Response to Office Action filed Jan. 10, 2020 for Chinese Patent Application No. 201580041033.3, no English Translation, (4 pages).
Notice of Acceptance dated Dec. 16, 2019 for Australian Application No. 2015210708.
Notice of Allowance for Japanese Appln. No. 2016-570034 dated Jan. 8, 2020.
Examination Report for New Zealand Application No. 722904 dated Feb. 7, 2020, 2 pages.
Response to Office Action filed Feb. 19, 2020 for Chinese Patent Application No. 201580017627.0, no English Translation, (9 pages).
Response to Office Action filed Feb. 26, 2020 for Chinese Patent Application No. 201580041059.8, no English Translation, (9 pages).
Office Action dated Jan. 29, 2020 for Japanese Patent Application No. 2019-65723, including English translation, (10 pages).
Cited Ref2 for Japanese Patent Application No. 2019-65723, no English translation, (11 pages).
Notice of Allowance dated Mar. 4, 2020 for U.S. Appl. No. 16/261,455.
RCE and Response to Office Action for U.S. Appl. No. 15/479,700, filed Feb. 4, 2019.
Non-Final Office Action dated Feb. 19, 2019 for U.S. Appl. No. 15/479,700.
Response to Office Action filed Mar. 4, 2019 for U.S. Appl. No. 15/896,438.
Response to Extended European Search Report filed Mar. 18, 2019 for European Patent Application No. 16743992.6, Applicant Magic Leap, Inc. 12 pages.
Extended European Search Report dated Mar. 26, 2019 for European Application No. 17779729.7, Applicant Magic Leap, Inc. 10 pages.
Notice of Acceptance dated Apr. 26, 2019 for AU Appln.No. 2015266670.
Response to Office Action for U.S. Appl. No. 15/479,700, filed May 20, 2019.
Response to OA filed Aug. 14, 2019 for Chinese Patent Application No. 201580041059.8, in Chinese language only with translation of amended claims in English, 80 pages.

Office Action dated Aug. 1, 2019 for Japanese Application No. 2016-570034, in Japanese with English Translation from foreign associate, 4 pages.
Final Office Action dated Sep. 6, 2019 for U.S. Appl. No. 15/479,700.
Office action dated Aug. 15, 2019, for Chinese application No. 201680018144.7, in Chinese language with an English translation provided by the foreign associate, (11 pages).
Response to Extended European Search Report filed Oct. 21, 2019 for European application No. 17779729.7, Applicant Magic Leap, Inc. (9 pages).
Examination Report for New Zealand Application No. 734573 dated Nov. 14, 2019, 2 pages.
Response to Office action filed Dec. 13, 2019, for Chinese application No. 201680018144.7, in Chinese language no English translation, (4 pages).
Office Action dated Dec. 13, 2019 for Japanese Application No. 2017-539020, in Japanese with English Translation from foreign associate, 8 pages.
Examination Report for Australian Application No. 2016211623 dated Jan. 3, 2020, 2 pages.
Non-Final Office Action dated Mar. 6, 2020 for U.S. Appl. No. 15/479,700.
First Exam Report for AU Patent Appln. No. 2019213313 dated Sep. 8, 2020.
Foreign OA Response for JP Patent Application No. 2019-108514 dated Nov. 25, 2020.
Foreign OA Response for JP Patent Application No. 2020-132801 dated Dec. 1, 2020.
Foreign Notice of Allowance for JP Patent Appln. No. 2020-132801 dated Dec. 18, 2020.
Foreign Notice of Allowance for JP Patent Appln. No. 2019-108514 dated Dec. 28, 2020.
Notice of Allowance for U.S. Appl. No. 16/868,826 dated Dec. 24, 2020.
Foreign OA for CN Patent Appln. No. 201780021552.2 dated Dec. 11, 2020.
Foreign OA for IN Patent Appln. No. 201847038959 dated Jan. 29, 2021.
Notice of Allowance for U.S. Appl. No. 15/479,700 dated Feb. 12, 2021.
Foreign OA for KR Patent Appln. No. 10-2017-7023982 dated Feb. 19, 2021.
Foreign Response for CN Patent Appln. No. 201780021552.2 dated Feb. 22, 2021.
Foreign Amendment Response for NZ Patent Appln. No. 727365 dated Oct. 29, 2020.
Foreign OA Response for IN Patent Appln. No. 201647026958 dated Oct. 22, 2020.
Foreign OA for JP Patent Appln. No. 2019-195867 dated Oct. 23, 2020.
Foreign OA Response for KR Patent Appln. No. 10-2016-7036877 dated Nov. 13, 2020.
Final Office Action for U.S. Appl. No. 16/460,315 dated Nov. 19, 2020.
Foreign Final OA for JP Patent Application No. 2019-87069 dated Nov. 4, 2020.
Foreign Notice of Allowance for KR Patent Appln. No. 10-2016-7036877 dated Dec. 3, 2020.
Foreign OA Response for JP Patent Application No. 2019-65723 dated Dec. 16, 2020.
Foreign OA Response for JP Patent Appln. No. 2019-195867 dated Dec. 23, 2020.
Foreign Response for AU Patent Application No. 2019280001 dated Dec. 23, 2020.
Foreign Notice of Allowance for CA Patent Appln. No. 2950429 dated Dec. 15, 2020.
Foreign Notice of Allowance for CN Patent Appln. No. 201580041033.3 dated Dec. 16, 2020.
Foreign Response for IL Patent Appln. No. 249089 dated Jan. 3, 2021.
RCE Amendment and response Final Office Action for U.S. Appl. No. 16/460,315, filed Feb. 19, 2021.

(56) References Cited

OTHER PUBLICATIONS

Foreign Exam Report for CA Patent Appln. No. 2950425 dated Feb. 9, 2021.
Foreign Response for EP Patent Appln. No. 20173220.3 dated Mar. 19, 2021.
Foreign Response for NZ Patent Appln. No. 762432 dated Apr. 1, 2021.
Non-Final Office Action for U.S. Appl. No. 16/460,315 dated Apr. 5, 2021.
Gordon D. Love, David M. Hoffman, Philip JW. Hands, James Gao, Andrew K. Kirby and Martin S. Banks, "High-speed switchable lens enables the development of a volumetric stereoscopic display", Optics Express, vol. 17, No. 18, p. 15716-15725,2009 (Year: 2009).
Foreign Resonse for AU Patent Appln. No. 2019213313 dated Apr. 12, 2021.
Final Office Action for U.S. Appl. No. 16/123,711 dated Apr. 23, 2021.
Foreign Response for CA Patent Appln. No. 2950425 dated May 14, 2021.
Foreign First Exam Report for EP Patent Appln. No. 15743225.3 dated Apr. 29, 2021.
Non-Final Office Action for U.S. Appl. No. 16/794,513 dated Jun. 24, 2021.
Foreign Exam Report for NZ Patent Appln. No. 764960 dated May 26, 2021.
Foreign Exam Report for NZ Patent Appln. No. 764952 dated May 26, 2021.
Foreign Response for AU Patent Appln. No. 2019219728 dated Jun. 28, 2021.
Foreign Exam Report for EP Patent Appln. No. 20173220.3 dated Jun. 16, 2021.
Amendment Response to NFOA for U.S. Appl. No. 16/460,315 dated Jul. 6, 2021.
1st Exam Report for NZ Patent Appln. No. 764950 dated Jun. 3, 2021.
Foreign Response for NZ Patent Appln. No. 762952 dated Mar. 26, 2021.
Foreign 2nd Exam Report for NZ Patent Appln. No. 762952 dated Mar. 30, 2021.
Foreign Exam Report for AU Patent Appln. No. 2017246864 dated May 14, 2021.
Foreign Response for AU Patent Appln. No. 2020204550 Jun. 25, 2021.
Foreign Response for KR Patent Appln. No. 10-2017-7023982 dated Apr. 12, 2021.
Foreign NOA for KR Patent Appln. No. 10-2017-7023982 dated Apr. 21, 2021.
Foreign Response for CN Patent Appln. No. 201780021552.2 dated Jul. 16, 2021.
Foreign Decision of Rejection for CN Patent Appln. No. 201780021552.2 dated Apr. 1, 2021.
Foreign OA for CN Patent Appln. No. 202010626647.0 dated Apr. 16, 2021.
Foreign Response for CN Patent Appln. No. 201910654692.4 dated Jul. 12, 2021.
Foreign OA for CN Patent Appln. No. 201910654692.4 dated Feb. 24, 2021.
Foreign Response for IN Patent Appln. No. 201847038959 dated Jul. 21, 2021.
Foreign OA for IN Patent Appln. No. 201747028773 dated Dec. 30, 2020.
Foreign OA for JP Patent Appln. No. 2018-552061 dated Mar. 3, 2021.
Foreign NOA for JP Patent Appln. No. 2019-87069 dated Apr. 8, 2021.
Foreign OA for JP Patent Appln. No. 2019-195867 dated Mar. 23, 2021.
Foreign Response for JP Patent Appln. No. 2018-552061 dated May 25, 2021.
Foreign NOA for JP Patent Appln. No. 2019-65723 dated May 25, 2021.
Foreign Respinse for JP Patent Appln. No. 2019-195867 dated Jun. 11, 2021.
Foreign NOA for IL Patent Appln. No. 249089 dated Mar. 14, 2021.
Foreign NOA for IL Patent Appln. No. 253732 dated Apr. 27, 2021.
Foreign Response for IL Patent Appln. No. 253732 dated Apr. 20, 2021.
Foreign Office Action for IL Patent Appln. No. 253732 dated Dec. 21, 2020.
Foreign NOA for IL Patent Appln. No. 246995 dated Feb. 17, 2021.
Foreign NOA for IL Patent Appln. No. 246996 dated Feb. 17, 2021.
Foreign Response for IL Patent Appln. No. 274429 dated Jun. 29, 2021.
Foreign Notice of Acceptance for AU Patent Appln. No. 2019219728 dated Jul. 20, 2021.
Notice of Allowance for U.S. Appl. No. 16/640,315 dated Aug. 20, 2021.
Amendment Response to NFOA for U.S. Appl. No. 16/794,513 dated Sep. 24, 2021.
Foreign Exam Report for EP Patent Appln. No. 15799569.7 dated Sep. 10, 2021.
Foreign OA for CN Patent Appln. No. 202010405568.7 dated Aug. 25, 2021 (with English translation).
Foreign Response for EP Patent Appln. No. 20173220.3 dated Oct. 22, 2021.
Foreign OA for CN Patent Appln. No. 202110217829.7 dated Sep. 22, 2021.
Foreign Response for NZ Patent Appln. No. 764952 dated Nov. 19, 2021.
Foreign Response for NZ Patent Appln. No. 764960 dated Nov. 19, 2021.
Foreign Response for NZ Patent Appln. No. 764950 dated Nov. 26, 2021.
Foreign Exam Report for NZ Patent Appln. No. 764952 dated Nov. 24, 2021.
Foreign Response for CN Patent Appln. No. 202010626647.0 dated Sep. 1, 2021.
Foreign FOA for JP Patent Appln. No. 2018-552061 dated Sep. 15, 2021 with English translation.
Foreign OA for KR Patent Appln. No. 10-2018-7032129 dated Oct. 20, 2021.
Foreign OA for CN Patent Appln. No. 202010626647.0 dated Nov. 3, 2021.
Foreign OA for CN Patent Appln. No. 202010626648.5 dated Nov. 1, 2021.
Foreign NOA for CA Patent Appln. No. 2950425 dated Aug. 20, 2021.
Foreign Response for EP Patent Appln. No. 15743225.3 dated Sep. 2, 2021.
2nd Exam Report for NZ Patent Appln. No. 764960 dated Nov. 30, 2021.
Foreign OA for JP Patent Appln. No. 2021-007792 dated Dec. 2, 2021.
Foreign Exam Report for 3089749 dated Dec. 1, 2021.
Foreign NOA for CN Patent Appln. No. 201910654692.4 dated Dec. 15, 2021.
Foreign NOA for IL Patent Appln. No. 246995 dated Nov. 22, 2021.
Foreign NOA for IL Patent Appln. No. 283164 dated Nov. 22, 2021.
Foreign Response for CN Patent Appln. No. 202010405568.7 dated Jan. 5, 2022.
Final Office Action for U.S. Appl. No. 16/794,513 dated Jan. 13, 2022.
Foreign Response for EP Patent Appln. No. 15799569.7 dated Jan. 18, 2022.
Foreign Response for CN Patent Appln. No. 202110217829.7 dated Jan. 25, 2022.
Foreign NOA for CN Patent Appln. No. 202010405568.7 dated Jan. 26, 2022.
Foreign Response for JP Patent Appln. No. 2021-7792 dated Feb. 17, 2022.
Foreign Response for CN Patent Appln. No. 202010626648.5 dated Mar. 9, 2022.

(56) References Cited

OTHER PUBLICATIONS

Amendment After Final for U.S. Appl. No. 16/794,513 dated Mar. 10, 2022.
Foreign Communication for EP Patent Appln. No. 15743225.3 dated Mar. 17, 2022.
Foreign Response for CA Patent Appln. No. 3089749 dated Mar. 25, 2022.
Foreign NOA for IL patent Appln. No. 274429 dated Feb. 16, 2022.
Notice of Allowance for U.S. Appl. No. 16/794,513 dated Mar. 30, 2022.
Non-Final Office Action for U.S. Appl. No. 17/327,924 dated Apr. 8, 2022.
Foreign NOA for CN Patent Appln. No. 202110217829.7 dated Mar. 28, 2022.
Foreign OA for JP Patent Appln. No. 2021-102212 dated Mar. 31, 2022.
Notice of Allowance for U.S. Appl. No. 16/794,513 dated Apr. 15, 2022.
Foreign NOA for CN Patent Appln. No. 202010626648.5 dated Apr. 15, 2022.
Foreign Response for AU Patent Appln. No. 2017246864 dated Dec. 10, 2021.
Foreign OA for KR Patent Appln. No. 10-2021-7023212 dated Dec. 10, 2021.
Foreign Response for KR Patent Appln. No. 10-2018-7032129 dated Dec. 16, 2021.
Foreign Notice of Appeal with Response for JP Patent Appln. No. 2018-552061 dated Dec. 21, 2021.
Foreign OA for JP Patent Appln. No. 2021-5068 dated Dec. 14, 2021.
Foreign Response and Written Submission for IN Patent Appln. No. 201747028773 dated Dec. 30, 2021.
Foreign Response for CN Patent Appln. No. 202010626647.0 dated Jan. 6, 2022.
Foreign Exam Report for AU Patent Appln. No. 2017246864 dated Jan. 11, 2022.
Foreign OA for IL Patent Appln. No. 261829 dated Dec. 12, 2021.
Foreign Exam Report for CA Patent Appln. No. 2975234 dated Jan. 18, 2022.
Foreign NOA for KR Patent Appln. No. 10-2018-7032129 dated Feb. 8, 2022.
Foreign Response for KR Patent Appln. No. 10-2021-7023212 dated Feb. 8, 2022.
Foreign FOA for KR Patent Appln. No. 10-2018-7032129 dated Feb. 8, 2022 (English Traslation).
Foreign Exam Report for EP Patent Appln. No. 17779729.7 dated Feb. 2, 2022.
Foreign NOA for KR Patent Appln. No. 10-2021-7023212 dated Feb. 14, 2022.
Foreign NOA for JP Patent Appln. No. 2018-552061 dated Mar. 8, 2022.
Foreign NOA for CN Patent Appln. No. 202010626647.0 dated Feb. 23, 2022.
Foreign Exam Report for EP Patent Appln. No. 16743992.6 dated Feb. 17, 2022.
Foreign Response for JP Patent Appln. No. 2021-5068 dated Mar. 11, 2022.
Foreign Response for KR Patent Appln. No. 10-2018-7032129 dated Mar. 10, 2022.
Foreign Response for AU Patent Appln. No. 2017246864 dated Mar. 24, 2022.
Foreign Notice of Acceptance for AU Patent Appln. No. 2017246864 dated Apr. 4, 2022.
Amendment Response to NFOA for U.S. Appl. No. 17/327,924 dated Jul. 8, 2022.
Notice of Allowance for U.S. Appl. No. 17/327,924 dated Jul. 26, 2022.
Notice of Allowance for U.S. Appl. No. 17/209,426 dated Jun. 27, 2022.
Foreign Response for CA Patent Appln. No. 2975234 dated May 18, 2022.
Foreign Exam Report for NZ Patent Appln. No. 746486 dated May 10, 2022.
Foreign Response for EP Patent Appln. No. 17779729.7 dated Jun. 7, 2022.
Foreign Response for EP Patent Appln. No. 16743992.6 dated Jun. 15, 2022.
Foreign OA for JP Patent Appln. No. 2021-7792 dated Jun. 6, 2022 with English translation.
Foreign FOA for JP Patent Appln. No. 2021-5068 dated Jun. 22, 2022 with English translation.
Foreign Decision to Grant for EP Patent Appln. No. 20173220.3 dated Jun. 17, 2022.
Foreign Response for JP Patent Appln. No. 2021-102212 dated Jun. 30, 2022.
Foreign NOA for IL Patent Appln. No. 283694 dated May 31, 2022.
Foreign OA for JP Patent Appln. No. 2021-33242 dated May 25, 2022.
Foreign Notice of Acceptance for NZ Patent Appln. No. 764950 dated Jun. 3, 2022.
Foreign Response for CA Patent Appln. No. 3114696 dated Aug. 10, 2022.
Foreign Response for JP Patent Appln. No. 2021-33242 dated Aug. 22, 2022.
Foreign Exam Report for CA Patent Appln. No. 2975234 dated Jul. 26, 2022.
Foreign Response for IL Patent Appln. No. 261829 dated Aug. 14, 2022.
Foreign Notification Prior to Acceptance for IL Patent Appln. No. 285033 dated Aug. 2, 2022.

* cited by examiner

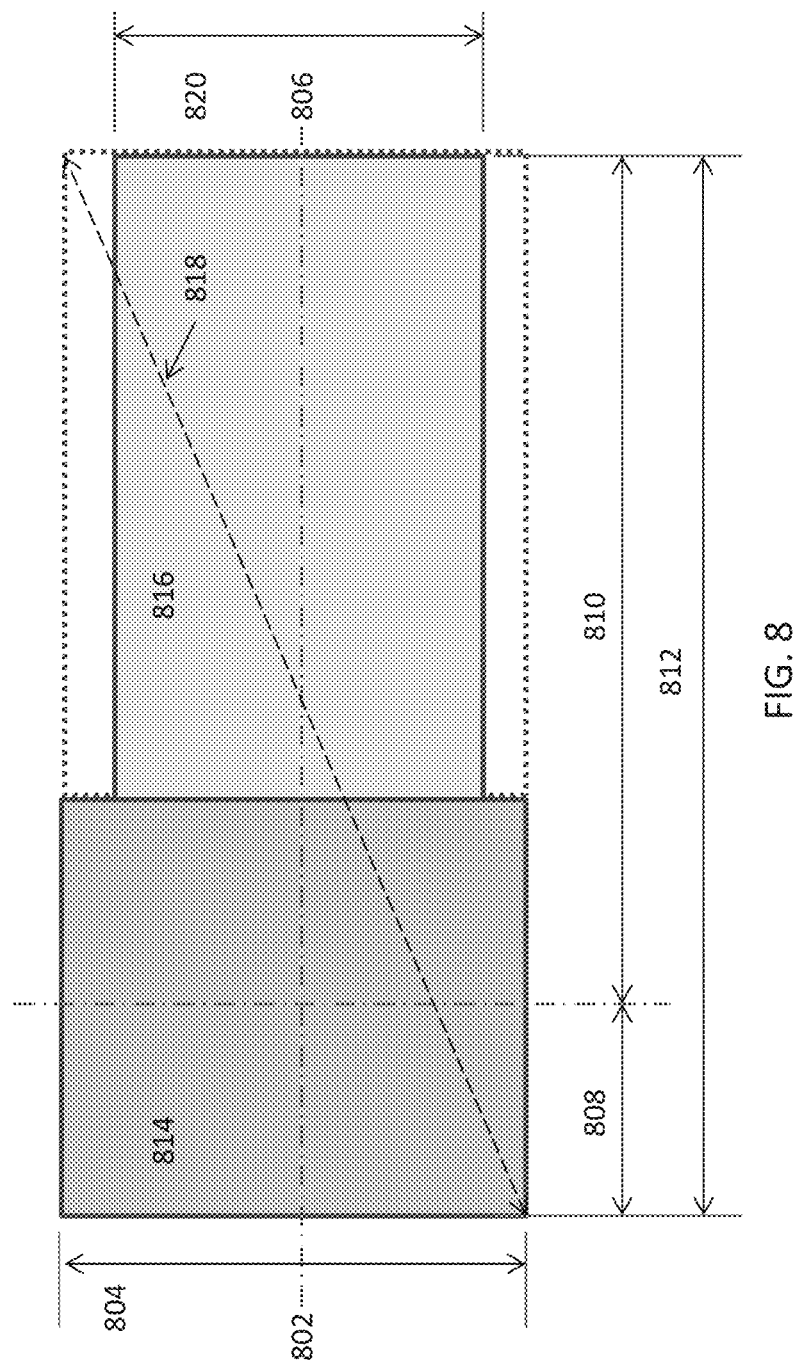

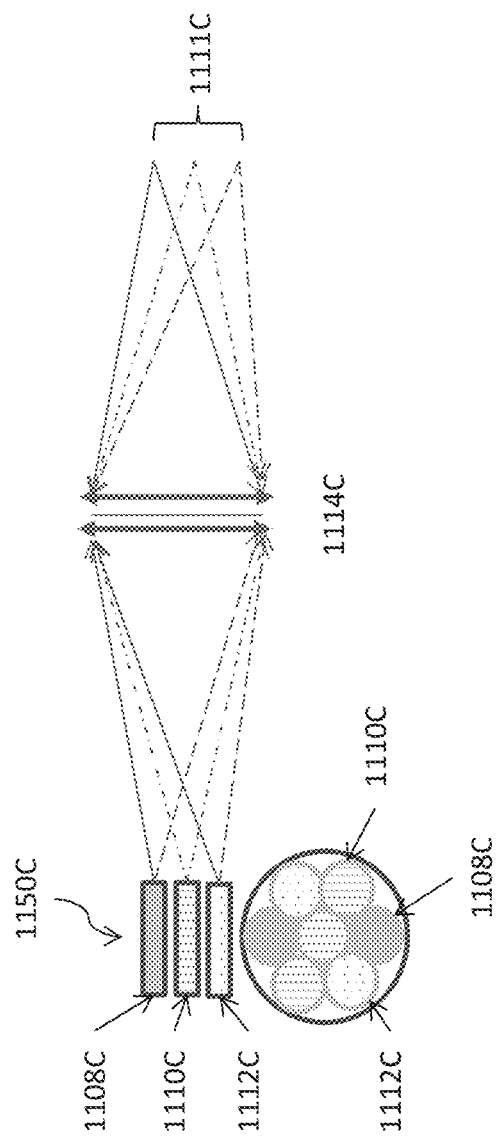

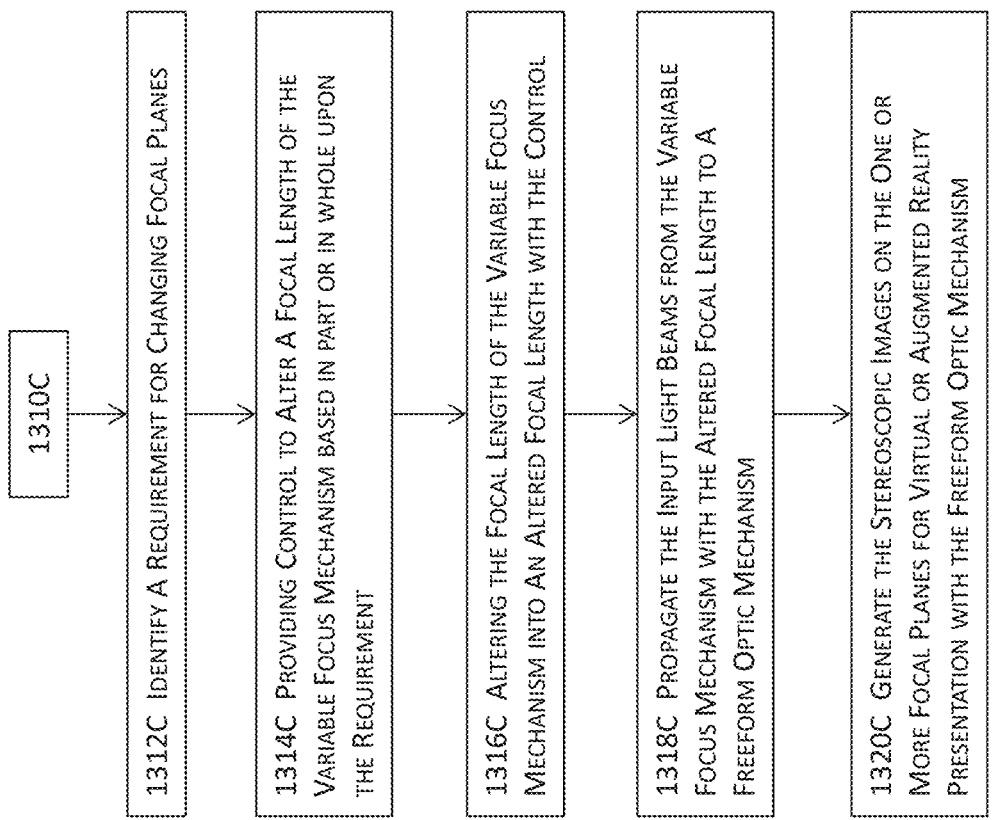

METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY

CROSS-REFERENCE TO RELATED APPLICATION(S)

This application is a continuation of pending U.S. patent application Ser. No. 14/726,396, filed May 29, 2015 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY", which claims the benefit of U.S. Provisional Patent Application Ser. No. 62/005,865 filed on May 30, 2014 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY". This application is cross-related to U.S. Provisional Patent Application Ser. No. 62/005,834 filed on May 30, 2014 and entitled "METHODS AND SYSTEM FOR CREATING FOCAL PLANES IN VIRTUAL AND AUGMENTED REALITY", U.S. Patent Application Ser. No. 62/005,807 filed on May 30, 2014 and entitled "METHODS AND SYSTEMS FOR VIRTUAL AND AUGMENTED REALITY", U.S. patent application Ser. No. 13/335,884 filed on Dec. 22, 2011 and entitled "ERGONOMIC HEAD MOUNTED DISPLAY DEVICE AND OPTICAL SYSTEM" claiming priority to U.S. Prov. Patent App. Ser. No. 61/427,162 filed on Dec. 24, 2010, and International Application published under the Patent Cooperation Treaty (PCT) under International Application Number PCT/US2011/067033 filed on Dec. 22, 2011, entitled "An Ergonomic Head Mounted Display Device and Optical System", and claiming priority to U.S. Prov. Patent App. Ser. No. 61/427,162 filed on Dec. 24, 2010. The content of the aforementioned patent applications is hereby expressly incorporated by reference in its entirety.

BACKGROUND

Head-mounted displays (HMD) have long been proven invaluable for many applications, spanning the fields of scientific visualization, medicine, and military training, engineering design and prototyping, tele-manipulation and tele-presence, and personal entertainment systems. In mixed and augmented reality systems, optical see-through HMDs are one of the basic approaches to combining computer-generated virtual scenes with the views of a real-world scene. Typically through an optical combiner, an optical see-through head-mounted display (OST-HMD) optically overlays computer-generated images onto the real-world view while maintaining a direct, minimally-degraded view of the real world. An OST-HMD presents a great potential for creating a mobile display solution that offers much more attractive image quality and screen size than other popular mobile platforms such as smart phones and PDAs (personal digital assistants). There exist many technical and practical difficulties preventing the technology from being widely adopted.

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

When placing digital content (e.g., 3-D content such as a virtual chandelier object presented to augment a real-world view of a room, or 2-D content such as a planar/flat virtual oil painting object presented to augment a real-world view of a room), design choices may be made to control behavior of the objects. For example, the 2-D oil painting object may be head-centric, in which case the object moves around along with the user's head (e.g., as in a Google Glass approach); or the object may be world-centric, in which case it may be presented as though it is part of the real world coordinate system, so that the user may move his head or eyes without moving the position of the object relative to the real world.

As a result, a question or design choice often arises as to whether the object should be presented as world centric (i.e., the virtual object stays in position in the real world so that the user may move his body, head, eyes around it without changing its position relative to the real world objects surrounding it, such as a real world wall); body or torso centric, in which case a virtual element may be fixed relative to the user's torso, so that the user may move his head or eyes without moving the object, but such movement is slaved to torso movements; head centric, in which case the displayed object (and/or display itself) may be moved along with head movements, as described above in reference to Google Glass; or eye centric, as in a "foveated display" configuration wherein content is slewed around as a function of the eye position.

Conventional stereoscopic displays provide binocular disparity that supports convergence on any point but only allows the viewer to accommodate on the display surface and thus suffer from accommodation—convergence conflict. These convention displays often decouple the accommodation cue from the convergence cue and tie the accommodation cue to a fixed distance. Thus, there exists a need for methods and system for image displaying stereoscopy with a freeform optical system with addressable focus for virtual and/or augmented reality.

SUMMARY

Some embodiments are directed at a method for generating stereoscopic images with a freeform optical display system. The method may identify a primary display device defining a primary vertical field of view and optionally increase or maximize the primary vertical field of view of the primary display device. The primary display device may include one or more freeform optical elements. In addition or in the alternative, the method may further optionally configure or devise a secondary display device to have an increased or maximized secondary horizontal field of view.

One or more secondary freeform optical elements may be identified and attached to the primary display device in a tiled arrangement to form a tiled freeform display device that provides an expanded field of view in the horizontal viewing direction, the vertical viewing direction, or in both directions. The method may further adjust a focal distance of one or more focal planes by using a variable focusing system in the freeform optical display system.

Some embodiments are directed at a method for generating stereoscopic images with a variable focusing freeform optical display system. The method may receive first light signals at an optical system from an image source to render a part of virtual display content in focus and determine a first focal distance of a first focal plane for rendering the part of virtual display content in focus. The method may further address both accommodation cues and convergence cues with the first focal distance, without tying the accommodation cues or the convergence cues to a fixed focal distance and render the virtual display content with the first light signal using at least a freeform optical display device and the first focal distance.

Some embodiments are directed at a method for generating a light field display with a freeform optical system. The method may identify the first light rays to be used for rendering a virtual object in virtual display content transmit the first light rays from a bundle of image sources to a freeform optical display device. The method may further synthesize a light field corresponding to the virtual object and render the virtual display content for the virtual object by using a freeform optical display device.

Some first embodiments are directed to a tiled freeform optical display system that comprises an image source injecting light rays into a primary freeform optical element; a secondary freeform optical element attached to the primary a freeform optical element in a first tiled arrangement to form a tiled freeform optical display device for displaying virtual display content with the light rays from the image source; and a variable focusing element operatively coupled to the image source and the tiled freeform optical display device to change a focal distance of a focal plane on which at least a part of the virtual display content is rendered in focus.

Some second embodiments are directed to a freeform light field display system that includes a computing device to determine light rays from light samples reflected from an object and recorded for reproducing a virtual content display for the object with the freeform light field display system; an image source comprising a bundle of projectors to inject the light rays into a freeform optical element, wherein the computing device further determines one or more light rays from the light rays to render a part of a light field for displaying the virtual content display for the object; and a coupling lens group situated between and operatively coupled to the image source and the freeform optical element to produce an intermediate pupil.

Some third embodiments are directed to a method for generating stereoscopic images with a freeform optical display mechanism in a tiled arrangement. In these embodiments, a primary display device comprising a primary freeform optical element and defining a primary field of view may be identified; a secondary display device defining a secondary field of view and comprising a secondary freeform optical element may also be identified; and a tiled display device that expands the primary field of view of the primary display device may be devised at least by integrating the secondary display device to the primary display device.

Some fourth embodiments are directed to a method for generating stereoscopic images with a variable focusing freeform optical display system for virtual or augmented reality. In these embodiments, input light beams may be received at an optical system from an image source; a focal length of a variable focus mechanism for the input light beams may be altered based in part or in whole upon positioning of at least one focal plane for the stereoscopic images; the input light beams may be propagated within at least a part of the variable focusing freeform optical system by using the variable focus mechanism with an altered focal length to a freeform optic mechanism; and the stereoscopic images may be generated on the at least one focal plane for virtual or augmented reality presentation with the freeform optic mechanism.

Some fifth embodiments are directed to a method for generating a light field display with a freeform optical system. In these embodiments, bundles of light rays may be received from an image source to produce virtual display content for a virtual object in the bundles of light rays; information for the virtual object may be extracted from the bundles of light rays; modulated bundles of light rays may be generated based in part or in whole upon the information extracted from the bundles of light rays; and the virtual display content for the virtual object may be rendered with the modulated bundles of light rays and a freeform optical display device.

Some sixth embodiments are directed to a freeform optical display mechanism for generating stereoscopic images that includes a primary display device comprising a primary freeform optical element and defining a primary field of view; a secondary display device defining a secondary field of view and comprising a secondary freeform optical element; and a tiled display device including the primary display device and the secondary display device to expand the primary field of view.

Some seventh embodiments are directed to a variable focusing freeform optical display system for generating stereoscopic images for virtual or augmented reality that comprises an image source emitting input light beams into an optical system; a variable focus mechanism having a focal length that is altered into an altered focal length based in part or in whole upon positioning of at least one focal plane for the stereoscopic images; and a freeform optic mechanism to receive the input light beams directed by the variable focus mechanism with an altered focal length to generate the stereoscopic images on the at least one focal plane for virtual or augmented reality presentation with the freeform optic mechanism.

Additional details of the methods and system for displaying stereoscopy with a freeform optical system with addressable focus for virtual and/or augmented reality are described in the Detailed Description Section below with reference to FIGS. 1-14D.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 8 illustrates another schematic representation of the vertical and horizontal field of view (FOV) of two freeform optical elements in a horizontally tiled arrangement in some embodiments.

FIG. 11C illustrates a simplified schematic representation of a display source for the light field display in FIG. 11B in some embodiments.

FIGS. 13C-D jointly illustrate a flow diagram of a process for generating stereoscopic images with a variable focusing freeform optical system in a tiled arrangement in some embodiments.

DETAILED DESCRIPTION

Figure 1:
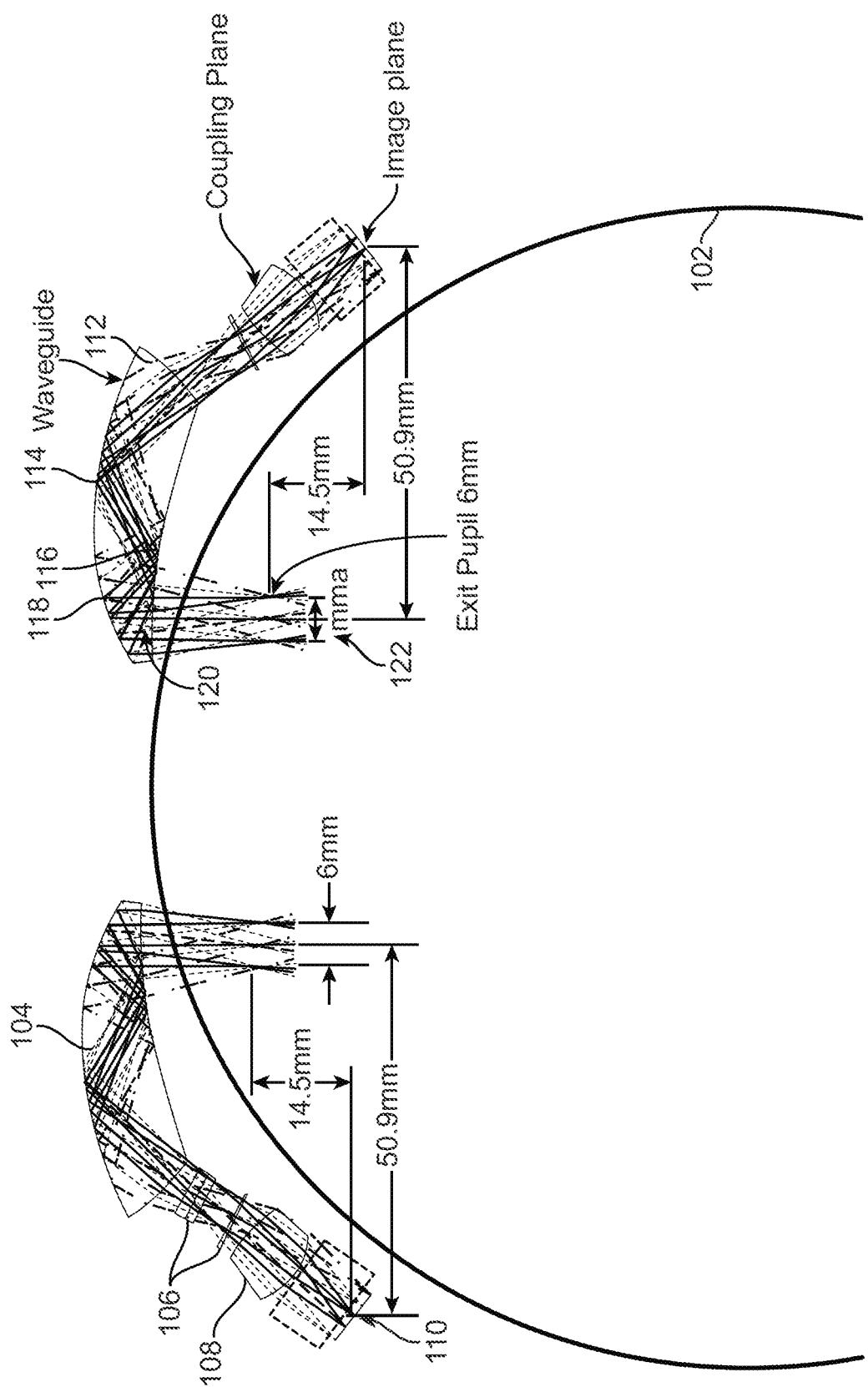
FIG. 1 illustrates a schematic view of a wrap-around system for displaying stereoscopy with a freeform optical system with addressable focus for virtual and/or augmented reality in some embodiments.

Various embodiments of the invention are directed to a methods, systems, and articles of manufacture for displaying stereoscopy with a freeform optical system with addressable focus for virtual and/or augmented reality in a single embodiment or in some embodiments. Other objects, features, and advantages of the invention are described in the detailed description, figures, and claims.

Disclosed are a method and a system for visual displays that are well-suited for virtual and augmented reality applications, as well as other applications such as near-to-eye displays, computing and display applications, or even text-only displays. Some embodiments are directed at a system for displaying stereoscopy with a freeform optical system with addressable focus for virtual and/or augmented reality. In some embodiments, the system may include an image source that injects light rays directly without intervening elements or indirectly with one or more intervening elements into one or more primary freeform optical elements for an eye of a user. The primary freeform optical element may include a wedge-shaped freeform optical element coupled with a folding mirror and one or more relay lenses in some embodiments. In some other embodiments, the primary freeform optical element may include a freeform waveguide. The primary freeform optical element comprises one or more refractive surfaces and one or more reflective surfaces to allow the injected light rays to deflect or reflect between these surfaces before finally exiting the primary freeform optical element to form the virtual display content.

These one or more refractive surfaces or one or more reflective surfaces may have the same or different surface properties including, for example, a refractive index, a reflective index, a surface profile, the material and/or thickness of a surface coating, a transmission coefficient or curve, one or more filter coefficients, or any combinations thereof. The system may further include one or more secondary freeform optical elements that are operatively coupled to the one or more primary freeform optical elements to form a tiled freeform optical display system that expands the horizontal field of view (FOV) and/or the vertical field of view. The system may also include an optical coupling lens or an optical coupling lens group operatively coupled to the image source, the one or more primary freeform optical elements, and/or the one or more secondary freeform optical elements to relay or couple light rays and to correct or improve certain characteristics of the light rays injected from the image source as well as the light rays from the real-world scenes passing through the one or more primary and/or secondary freeform optical elements.

In some embodiments, the freeform optical display system may include a freeform optical element. The freeform optical element may include a waveguide having one or more refractive surfaces and one or more reflective surfaces to allow the injected light rays to deflect or reflect between these surfaces before finally exiting the primary freeform optical element to form the virtual display content. These one or more refractive surfaces or one or more reflective surfaces may have the same or different surface properties including, for example, a refractive index, a reflective index, a surface profile, the material and/or thickness of a surface coating, a transmission coefficient or curve, one or more filter coefficients, or any combinations thereof.

The system may also include an image source to inject light rays into the freeform optical element for rendering virtual display content. In some of these embodiments, the system may include a variable focusing system that changes the focal distance of a single focal plane onto which at least a portion of the virtual display content will be rendered in focus. In some other embodiments, the system may include a variable focusing system that switches among a plurality of focal planes at a flickering-free rate to render at least a portion of the virtual display content will be rendered in focus. The system may render the virtual display content or a respective portion thereof onto several focal planes of the plurality of focal planes in parallel.

The system employs the variable focusing system to address both the accommodation cue and the convergence cue to the changing focal distance, without tying the accommodation cue or the convergence cue to a fixed distance value, to resolve the accommodation-convergence conflict. In yet some other embodiments, the system may include a variable focusing system that changes the respective focal distances of multiple focal planes onto which at least a portion of the virtual display content will be rendered in focus.

In some embodiments, the freeform optical display system includes a computing device that determines appropriate light rays from light samples reflected from or artificially created for an object and recorded for reproducing a virtual content display for the object with the freeform optical display system. The freeform optical display system may extract the radiance and/or depth information form the light rays and use the extracted information to determine where the light rays are to be projected, which image projector(s) is (are) to be used to project the corresponding light rays, and where the image projector(s) is or are projecting the corresponding light rays to render the light field. The freeform optical display system may then project various light rays with their corresponding image projectors to synthesize the light field.

A freeform display system may include a primary freeform optical element and one or more secondary freeform optical elements to expand the horizontal field of view (FOV) or the vertical field of view of the freeform display system for displaying virtual content for virtual or augmented reality. The primary freeform and the one or more secondary freeform optical elements may be arranged in a tiled arrangement. The freeform display system may further include a variable focusing system to produce an intermediate pupil. The variable focusing system may change the focal distance of a single focal plane in some embodiments or may switch among multiple focal planes for rendering objects in focus while resolving accommodation-convergence conflict in some other embodiments. The freeform display system may map light samples to appropriate light rays in physical space and use a cluster of projectors to project the mapped light rays to produce a light field of the virtual display content in some embodiments. Methods for making or using a freeform optical display system and methods for producing virtual content with variable focus freeform optics and rendering light fields are also disclosed.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are methods and systems for displaying stereoscopy with a freeform optical system with addressable focus for virtual and/or augmented reality. FIG. 1 illustrates a schematic view of a wrap-around display system for displaying stereoscopy with a freeform optical system with addressable focus for virtual and/or augmented reality in some embodiments. In these embodiments illustrated in FIG. 1, the wrap-around display system may include a monocular or binocular human wearable display glasses, a head-mounted display, or a near-eye display that fits around a head or face profile 102. A binocular version of the display system as illustrated in FIG. 1 may include a pair of light guiding devices 104 (referred to as a freeform waveguide prism or a freeform optical element hereafter), each including one or more freeform refractive surfaces and one or more reflective surfaces.

The inner physical surface closer to the user's eye and the outer physical surface away from the user's eye of the freeform optical element 104 include two continuous, smooth surfaces having no discontinuities on either surface. Each of these two physical surfaces is described by a set of freeform surface parameters. The freeform optical element 104 may include one or more refractive surfaces that are not a part of the inner surface and may be described by one or more different sets of surface parameters. The freeform optical element 104 may further include one or more reflective surfaces that may or may not be a part of the inner surface or the outer surface and may be described by the same or one or more different sets of surface parameters. In some embodiments, the display system may include multiple freeform optical elements that are arranged in a tiled arrangement to expand the horizontal field of view, the vertical field of view, or both.

The multiple freeform optical elements may be arranged in an array having one or more horizontal rows of freeform optical elements each having one or more freeform optical elements in a horizontal arrangement and working in conjunction with each other to expand the horizontal field of view (and hence the diagonal field of view). In some embodiments where the array includes multiple rows arranged in a vertical arrangement, the freeform optical elements in the vertical arrangement also function in conjunction with each other to expand the vertical field of view (and hence the diagonal field of view). These multiple freeform optical elements may include one or more primary freeform optical elements and one or more secondary freeform optical elements in some embodiments. In some embodiments, a primary freeform optical element may include a freeform waveguide in vertical arrangement (e.g., the vertical arrangement shown in FIG. 3) or in horizontal arrangement (e.g., the arrangement shown in FIG. 2). In some other embodiments a primary freeform optical element may include a freeform wedge and one or more relay lenses in a folded arrangement (e.g., the freeform wedge and relay lens shown in FIGS. 9A-B). The multiple freeform optical elements may also include one or more secondary freeform optical element that may include a freeform waveguide or freeform wedge in some embodiments.

The display system may also include one or more additional coupling optical elements (e.g., a coupling lens 108, a focusing element 106, and/or one or more relay lenses, etc.) to properly inject light from the image source 110 (e.g., a bundle of projectors) into the waveguide prism 104. The locations and geometric profiles of the surfaces of the freeform waveguide prism and the coupling optics may be designed such that a viewer may be able to see a clear, magnified image of the displayed content from the image source 110. The image source 110 may include a micro-display panel and a field lens that is used to achieve tele-centricity of light at the micro-display surface.

The micro-display panel may be either a reflective type micro-display (for example: LCoS or Liquid Crystal on Silicon, FLCoS or Ferroelectric Liquid Crystal on Silicon, or DMD or Digital Micromirror Device panels) or a transmissive type micro-display (for example: LCD or Liquid Crystal Display panel) or a self-emissive type micro-display (for example: OLED or Organic Light Emitting Diode panel). In some embodiments where a reflective type micro-display panel is used, one or more beam splitters (not shown) may be used after the field lens to introduce an illumination path (not shown). Between the image source 110 and the freeform optical element 104, the display system may further include a coupling lens 108 to correct optical aberrations and improve image qualities. The focusing element 106 may be a multi-focal element that includes a liquid lens in some embodiments.

The focusing element 106 (e.g., the liquid lens) may also be integrated to the coupling lens group 108 which may include one or more coupling lenses. In some other embodiments, the focusing element 106 may include a deformable membrane mirror (DMM) and a beam splitting device that is coupled to a coupling lens group (e.g., the coupling lens group 108) to receive the display content from the image source 110 and to pass the display content to the freeform elements. More details about the focusing element will be described in subsequent paragraphs with reference to FIG. 10A-10B.

In some embodiments, the secondary display may or may not have the addressable focusing functionality. In some of these embodiments where the addressable focusing functionality may not be required or desired, the secondary display may be implemented in favor of a larger overall field of view (FOV), lighter weight, and/or a more compact size.

In these embodiments illustrated in FIG. 1, the light rays originated from the image source 110 enter the freeform optical element 104 through the refractive surface 112, are reflected three times by the inner surfaces and the outer surface of the freeform optical element 104, are then transmitted through the refractive surface 120, and reach the exit pupil 122. In these embodiments, among the three reflections, the reflections from surfaces 114 and 116 may satisfy the TIR condition, and the reflection from surface 118 on the outer surface may not satisfy the TIR condition. In order to increase the reflective efficiency for the reflection from the surface 118, it may be required or desired to apply a semi-transparent coating to the outer surface 118. In order to maintain TIR condition for the reflection from the surface 114, a dielectric coating may be applied to the surface 114 in some embodiments. To ensure an eyeglass form factor, the inner surface of the freeform optical element may be constrained to approximate a pre-defined curve in some embodiments.

In some embodiments where the freeform optical element comprises a see through optical element, the see-through path of the head-mounted display device includes the freeform optical element 104 and a freeform see-through compensation lens (e.g., reference numeral 408B of FIG. 4B) that may be separably or inseparably attached to an exterior surface of the freeform optical element 104. The see-through compensation lens, including one or more freeform refractive surfaces, may provide proper viewing of the surrounding environment across a very wide see-through field of view. The freeform optical element 104 and the see-through compensation lens may also properly designed to ergonomically fit with the ergonomic factors (e.g., the head or face profile 102) of the human heads enabling a wrap-around design of a lightweight, low profile, compact, and see-through display system that may have an eyeglass-form or a helmet-form appearance, wide see-through field of view, and superior optical performance.

The compensation lens, including one or more freeform refractive surfaces, provides proper viewing of the surrounding environment across a very wide field of view. The surfaces of the compensation lens may be enhanced or optimized to minimize or reduce the shift and distortion introduced to the light rays from a real-world scene when the compensation lens is combined with the freeform optical element (e.g., 104 of FIG. 1). In some embodiments where the reflection on the attached surfaces of the freeform optical element 104 satisfies TIR (Total Internal Reflection) condition along the virtual image display path within the freeform optical element 104, it may be required or desired to maintain a small air gap between the freeform optical element 104 and the compensation lens.

Some embodiments provide a see-through capability in the display systems and allow users to view their surrounding environment through the viewing optics (e.g., the freeform optical elements 104 and the freeform see-through compensation lens) as well as the displayed content on the display device. In some of these embodiments, the display system offers a see-through field of view (FOV) that may be substantially larger than the FOV of the virtual view (e.g., more than 15 degrees larger in the horizontal, vertical, or diagonal FOV). This substantially larger FOV may be provided by several mechanisms including, for example, moving the image source 110 closer to the side of the head to extend the clear optical aperture of the freeform optical element 104, controlling the surfaces on the freeform optical element 104 and the compensation lens to correct light ray shifts and distortions, and/or ensure high see-through performance across a large FOV.

In some of these embodiments, the see-through FOV may extend as large as 120-degrees in the horizontal direction and 80-degrees in the vertical direction. The see-through through FOV of the display device may be extended to match the field of view of human eyes in some embodiments. In some embodiments, the light rays from the same point on the image source may cross at least once inside the freeform optical element 104. Crossing light rays form an intermediate image or an intermediate pupil of the virtual display within the freeform optical element 104, although the light ray crossing points may not be well formed due to the complexities of the light paths within the freeform optical element 104

In some embodiments, the virtual image path of the display device may include an image source 110 (e.g., a bundle of projectors, micro-array displays, LCoS or Liquid Crystal on Silicon, or DLP or Digital Light Processing, etc.) for supplying display content and an ergonomically-shaped display viewing optics through which a user views a magnified image of the display content. The display viewing optics may include one or more freeform optical elements including one or more freeform refractive surfaces and one or more reflective surfaces, and may also include additional coupling optics. The waveguide prism may serve as a near-eye viewing optics that magnifies the image for the user to perceive.

Light rays emitted from the image source 110 are injected into the freeform optical element 104 via the first refractive surface of the freeform optical element 104. The light rays may be injected into the prism directly from the image source 110 or through a group of coupling lens (e.g., a coupling lens 108, a focusing element 106, and/or one or more relay lenses, etc.) The injected light rays propagate through the freeform optical element 104 via reflections (typically three or more reflections) and are then coupled out of the freeform optical element 104 via the second refractive surface of the freeform optical element 104. The outgoing light rays continue propagating and reach the exit pupil of the system where a user places her/his eye to view the virtual display content.

When light propagating through the freeform optical element 104, if Total Internal Reflection (TIR) condition on a reflective surface is satisfied, the light loss through the reflection may be reduced or minimized. Therefore, it is desired, but not strictly required, that all or most of the reflections satisfy the TIR condition in some of these illustrated embodiments. Nonetheless, it may also be desirable to achieve thin designs of the waveguide prism by compromising the TIR condition on some of the reflective surfaces in some embodiments. For the reflective surfaces located inside the designated see-through FOV of the device, where the TIR condition is not satisfied, a semi-transparent coating may be applied to these surfaces in order to ensure that sufficient light from the image source 110 unit reaches the exit pupil and produce a sufficiently bright image, while facilitating the optical see-through capability.

For the reflective surfaces outside the see-through FOV of the display device, if the TIR condition is not satisfied, a high-reflection coating may be applied to at least some of the external surfaces of the freeform optical element 104 to reduce or minimize light loss. In some embodiments, the image source 110 may include any type of self-emissive or illuminated pixel arrays that may serve as an image source, including, but not limited to, a liquid crystal on silicon (LCoS) display device, a liquid crystal display (LCD) panel, an organic light emitting display (OLED), Ferroelectric liquid crystal on silicon (FLCoS) device, digital mirror device (DMD), a micro-projector or pico-projector built upon these aforementioned, a bundle of projectors such as a bundle of laser projectors or fiber scanners, or any other suitable types of micro-display devices.

In some embodiments, the freeform optical element 104 may include a long optical path within the freeform optical element 104 that allows shifting the image source 110 away from the display FOV. This shifting of the image source 110 away from the display FOV may place the image source on user's forehead or at the side of the user's head which may achieve a better weight balance by, for example reducing the front weight of the HMD system and hence improves the ergonomic fit of the system. This shifting of the image source 110 away from the display FOV may increase the system overall achievable see-through FOV by moving the coupling lens and display away from the human nature field of view.

In addition or in the alternative, the shape of the freeform optical element 104 may be designed to approximate the natural curve or profile of the human head (e.g., the head or face curve or profile 102) for better optimal ergonomic fit. For example, the shape of the freeform optical element 104 in some embodiments may be curved to approximate the curvature of a pair of 8-base curve eyeglasses; and the shape of the freeform optical element 104 in some other embodiments may approximately follow the form factor of a pair of 4-base curve eyeglasses. Moreover, the overall thickness of the freeform optical element 104 in the viewing direction and that of the compensation lens may be controlled to achieve a thinner optics profile (e.g., less than 30 mm) to achieve a wraparound design of optical see-through display system that offers better ergonomic fit and more attractive eyeglass-like style.

In some embodiments, the display system may include a bundle of image sources and synthesize a light field by mapping each light sample to an appropriate light ray in physical space and extracting information including radiance and/or depth from the appropriate light ray to render stereoscopic images.

Figure 2:
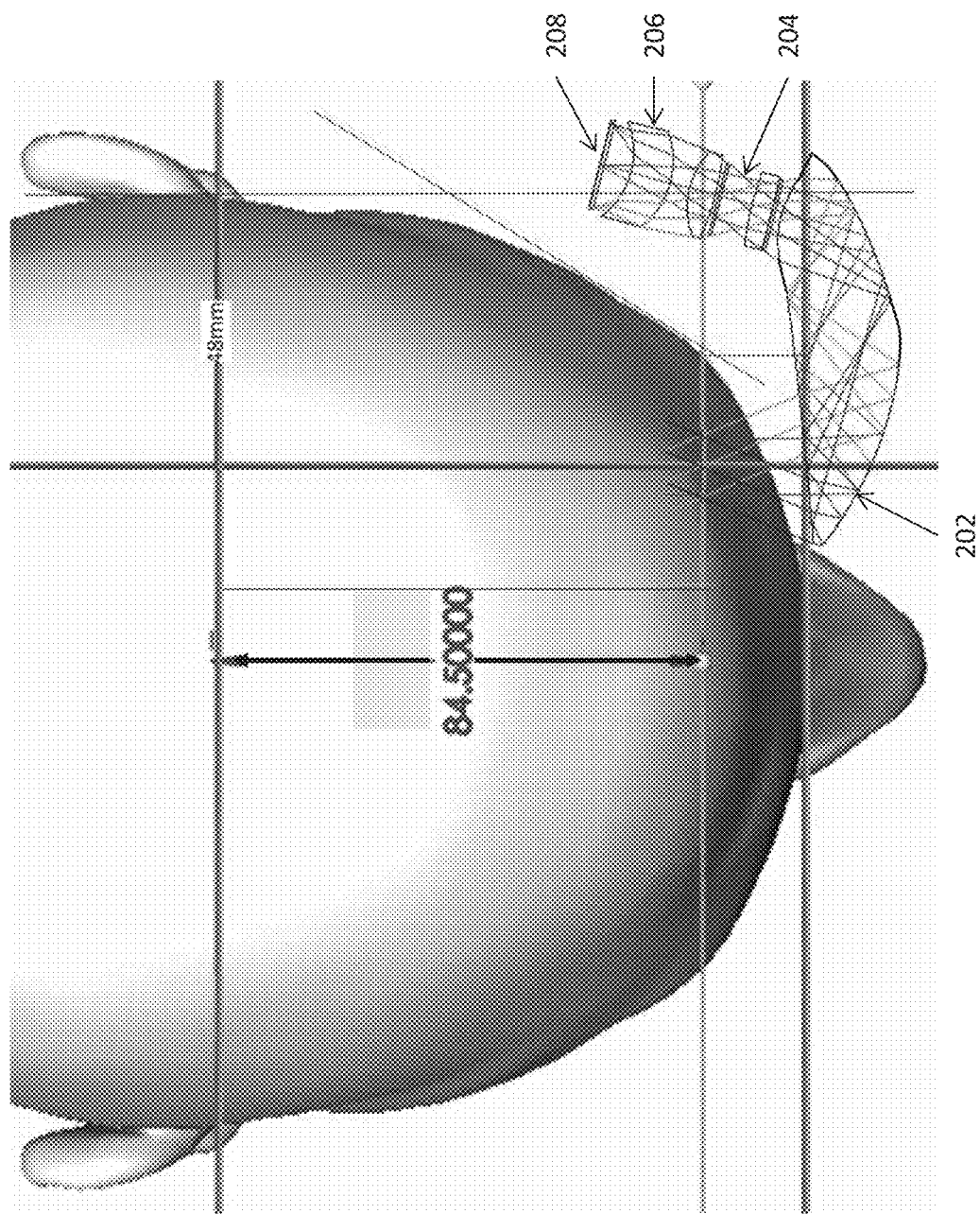
FIG. 2 illustrates a partial, schematic view of a horizontally mounted system for displaying stereoscopy with a freeform optical system with addressable focus for virtual and/or augmented reality in some embodiments.

FIG. 2 illustrates a partial, schematic view of a horizontally mounted system for displaying stereoscopy with a freeform optical system with addressable focus for virtual and/or augmented reality in some embodiments. In these embodiments, the display system may be horizontally mounted to shift the weight distribution closer to the side of the user's head. More particularly, the display system includes the freeform optical element 202, a focusing system 204, a coupling lens system 206, and an image source 208. As FIG. 2 shows, the focusing system 204, the coupling lens system 206, as well as the image source 208 are shifted to the side of the user's head to prevent these systems from blocking the field of view and also to shift the weight distribution of the display system to the rear side to prevent a front heavy configuration for better comfort.

In this illustrative configuration, the image source 208 (e.g., a bundle of projectors, micro-array displays, LCoS or Liquid Crystal on Silicon, or DLP or Digital Light Processing, etc.) injects light rays of display content into the coupling lens system 206, which may correct light ray shifts and distortions, and/or ensure high performance across a large FOV. The coupling lens system 206 is operatively coupled to a focusing system 204 which may change the focal distance of the display content by adjusting the focal distance of the virtual display content of a single focal plane or by switching among a plurality of focal planes (e.g., six to twenty) at different focal distances. In yet some other embodiments, the system may include a variable focusing system that changes the respective focal distances of multiple focal planes onto which at least a portion of the virtual display content will be rendered in focus. The system may render these multiple focal planes either individually in some of these embodiments or at least two of these focal planes in parallel in some other embodiments.

That is, the focusing system 204 may couple, rather than decouple, the accommodation cues and the convergence cues without forcing the accommodation cue without tying the accommodation cues to a fixed focal distance by providing dynamic addressability of the focal distance of a single focal plane or rendering the virtual objects in the virtual display content in parallel on multiple focal planes at a flickering-free rate. In some embodiments where the display system renders the virtual display content on multiple focal planes in parallel, the separation between two immediately neighboring focal planes is one-seventh diopters. The freeform optical element 202 is substantially similar or identical to reference numeral 104 of FIG. 1, and the compensation lens is also not shown in FIG. 1. The focusing system 204 may include a liquid mirror or a deformable membrane mirror (DMD) in some embodiments.

There are two main ways of creating a perception of variable depth: multiple-plane focus systems and a variable focus system. In a multiple-plane focus system, the system is able to project images on fixed depth planes in the z direction. In a variable focus system, the system projects a limited number of depth planes, but moves the depth planes in space to create 3D perception. In some embodiments, a virtual or augmented reality system may include at least one image generating processor, at least one spatial light modulators, a plurality of lenses/optical elements, one or more beam splitters, and one or more variable focus elements.

The image generating processor is responsible for generating virtual content to be ultimately displayed to the user. The image generating processor may convert an image or video associated with the virtual content to a format that may be projected to the user in three-dimensional space. For example, in generating 3D content, the virtual content may need to be formatted such that portions of a particular image are displayed on a particular depth plane while other are displayed at other depth planes. Or, all of the image may be generated at a particular depth plane. Or, the image generating processor may be programmed to feed slightly different images to right and left eye such that when viewed together, the virtual content appears coherent and comfortable to the user's eyes.

The image generating processor may further include a memory, a CPU (central processing unit), a GPU (graphic processing unit), and other circuitry for image generation and processing. The image generating processor may be programmed with the desired virtual content to be presented to the user of the virtual or augmented reality system. It should be appreciated that in some embodiments, the image generating processor may be housed in the wearable virtual or augmented reality system. In other embodiments, the image generating processor and other circuitry may be housed in a belt pack that is coupled to the wearable optics.

The focusing element (106 and 204) comprises a variable focus element (VFE), which is configured for focusing the projected light generated from the spatial light modulator onto a desired depth plane. It should be appreciated that VFEs may be used in both multi-focus and variable focus systems. Thus, the VFE, in conjunction with the plurality of lenses and mirrors, may be configured for projecting the light associated with the virtual object at the desired depth plane(s) such that it is perceived as three-dimensional object to the eye(s) of the user.

The variable focus lens element may be a refractive element, such as a liquid crystal lens, an electroactive lens, a conventional refractive lens with moving elements, a mechanical-deformation-based lens (such as a fluid-filled membrane lens, or a lens akin to the human crystalline lens, wherein a flexible element may be flexed and relaxed by one or more actuators), an electrowetting lens, or a plurality of fluids with different refractive indices. A variable focus element may also comprise a switchable diffractive optical element (such as one featuring a polymer dispersed liquid crystal approach wherein a host medium, such as a polymeric material, has micro-droplets of liquid crystal dispersed within the material; when a voltage is applied, the molecules reorient so that their refractive indices no longer match that of the host medium, thereby creating a high-frequency switchable diffraction pattern).

One embodiment includes a host medium in which micro-droplets of a Kerr effect-based electroactive material, such as lithium niobate, is dispersed within the host medium, enabling refocusing of image information on a pixel-by-pixel or line-by-line basis, when coupled with a scanning light display, such as a fiber-scanned display or scanning-mirror-based display. In a variable focus element configuration wherein liquid crystal, lithium niobate, or other technology is utilized to present a pattern, the pattern spacing may be modulated to not only change the focal power of the variable focus lens element, but also to change the focal power of the overall optical system—for a zoom lens type of functionality.

In one embodiment, the plurality of lenses could be telecentric, in that focus of the display imagery may be altered while keeping magnification constant—in the same way that a photography zoom lens may be configured to decouple focus from zoom position. In another embodiment, the lenses may be non-telecentric, so that focus changes will also slave zoom changes. With such a configuration, such magnification changes may be compensated for in software with dynamic scaling of the output from the graphics system in sync with focus changes).

In some embodiments, various types of gratings may be used to implement a various focus element. For example, the OPE (orthogonal pupil expanders) gratings and the EPE (exit pupil expanders) gratings described in U.S. provisional patent application Ser. No. 62/005,807 filed on May 30, 2014 and entitled "METHODS AND SYSTEMS FOR VIRTUAL AND AUGMENTED REALITY" may be used to implement VFEs. More specifically, the OPE gratings and the EPE gratings may be arranged in a folded or overlaid manner on both sides of a layer in some embodiments. In some other embodiments, the OPE gratings and the EPE gratings may be arranged and recorded in a single, unitary, spatially-coincident layer to form a multiplexed layer having the functions of both the OPE gratings and the functions of the EPE gratings. Multiple such layers mentioned above may be stacked on top of each other to form a multi-planar configuration where each layer may host its respective focal plane associated with its respective focal length.

It shall be noted that although the use of the term "gratings" does not imply or suggest that the diffractive structures in the "gratings" include only linear diffractive elements or structures. Rather, gratings (e.g., EPE gratings, OPE diffractive elements, etc.) may include linear diffractive structures, circular diffractive structures, radially symmetric diffractive structures, or any combinations thereof. The OPE diffractive elements and the EPE diffractive elements may include both the linear grating structures and the circular or radially symmetric structures to both deflect and focus light beams.

The multi-planar configuration may provide a larger focal range, and each layer in the multi-planar configuration may be dynamically switched on and off to present images that appear at different focal lengths to viewers. More details about the variable focusing element or system are described in U.S. provisional patent application Ser. No. 62/005,834 filed on May 30, 2014 and entitled "METHODS AND SYSTEM FOR CREATING FOCAL PLANES IN VIRTUAL AND AUGMENTED" REALITY filed on May 30, 2014 and U.S. provisional patent application Ser. No. 62/005,807 filed on May 30, 2014 and entitled "METHODS AND SYSTEMS FOR VIRTUAL AND AUGMENTED REALITY" the content of the aforementioned U.S. provisional patent applications is hereby expressly incorporated by reference for all purposes.

Figure 3:
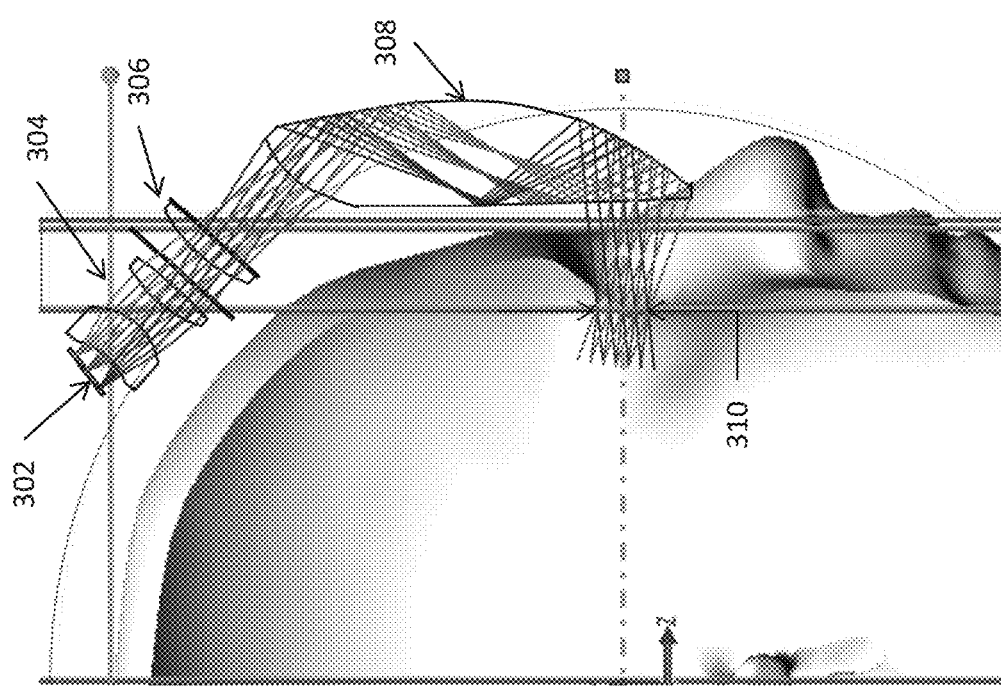
FIG. 3 illustrates a partial, schematic view of a vertically mounted system for displaying stereoscopy with a freeform optical system with addressable focus for virtual and/or augmented reality in some embodiments.

FIG. 3 illustrates a partial, schematic view of a vertically mounted system for displaying stereoscopy with a freeform optical system with addressable focus for virtual and/or augmented reality in some embodiments. In these embodiments, the display system may be vertically mounted and fit around a user's head. More particularly, the display system includes the freeform optical element 308, a focusing system 306, a coupling lens system 304, and an image source 302. In this illustrative configuration, the image source 302 (e.g., a bundle of projectors, micro-array displays, LCoS or Liquid Crystal on Silicon, or LCD based DLP or Digital Light Processing, etc.) injects light rays of display content into the coupling lens system 304, which may correct light ray shifts and distortions, and/or ensure high performance across a large FOV.

The coupling lens system 304 may further be operatively coupled to a focusing system 306 which may address the focal distance of the display content by adjusting the focal distance of a single focal plane or by switching among and rendering the virtual display content on a plurality of focal planes at different focal distances. In yet some other embodiments, the system may include a variable focusing system that changes the respective focal distances of multiple focal planes onto which at least a portion of the virtual display content will be rendered in focus, wherein the system may render the virtual content onto these multiple focal planes individually in some embodiments or onto at least two of these focal planes in parallel in some other embodiments. The freeform optical element 308 may be devised in such a way that exit pupil 310 of the output light rays covers the eye of a user. In one specific embodiment employing substantially similar configuration as shown in FIG. 3, the exit pupil diameter may be 10 mm; the diagonal field of view may be 50 degrees; the horizontal field of view may be 44.23 degrees; and the vertical field of view may be 25.75 degrees.

Figure 9A:
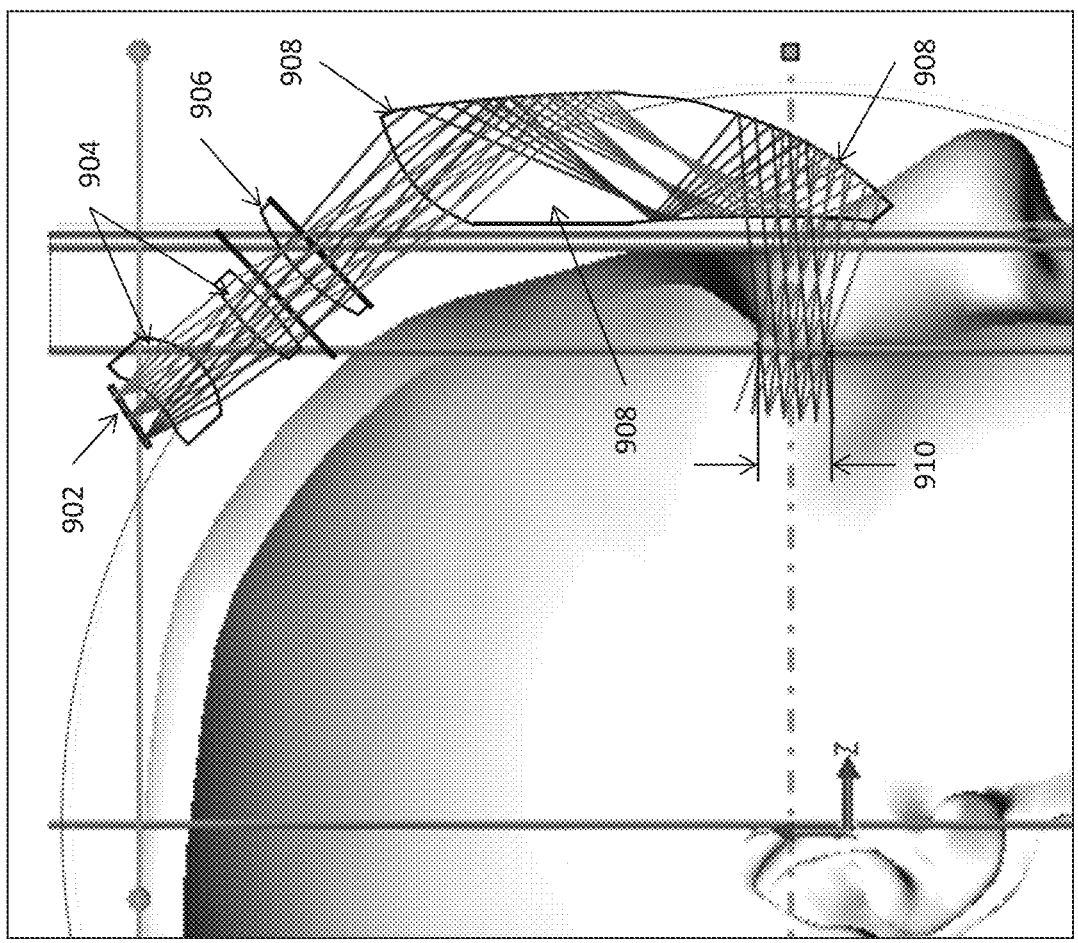
FIG. 9A illustrates a simplified, schematic representation of a primary display device in a tiled arrangement of freeform optical elements in some embodiments.

FIG. 9A illustrates a simplified, schematic representation of a variable focusing display system having a freeform optical system in some embodiments. In these embodiments, the display system may be vertically mounted and fit around a user's head as shown in FIG. 9A or horizontally mounted as shown in FIG. 2. More particularly, the display system includes the primary freeform optical element 908, a focusing system 906, a coupling lens system 904, and an image source 902. In these illustrated embodiments, the image source 902 (e.g., a bundle of projectors, micro-array displays, LCoS or Liquid Crystal on Silicon, or DLP or Digital Light Processing, etc.) injects light rays of display content into the coupling lens system 904, which may correct light ray shifts and distortions, and/or ensure high performance across a large FOV.

The coupling lens system 904 may further be operatively coupled to a focusing system 906 which may address the focal distance of the display content by adjusting the focal distance of a single focal plane or by switching among and rendering the virtual display content on a plurality of focal planes at different focal distances. In some embodiments, the system may include a variable focusing system that changes or addresses the respective focal distances of multiple focal planes onto which at least a portion of the virtual display content will be rendered in focus. The primary freeform optical element 908 may be devised in such a way that exit pupil 910 of the output light rays covers the eye of a user.

Figure 9B:
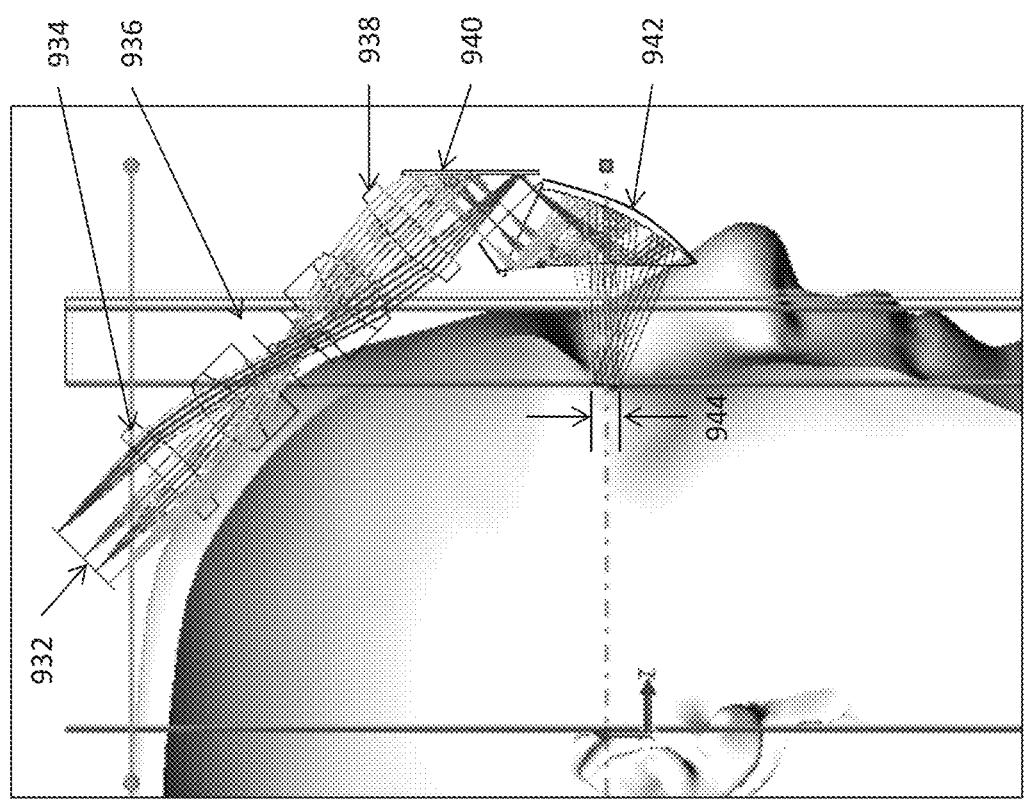
FIG. 9B illustrates another simplified, schematic representation of a primary display device in a tiled arrangement of freeform optical elements in some embodiments.

FIG. 9B illustrates another simplified, schematic representation of a variable focusing display system having a freeform optical system in some embodiments. In these embodiments illustrated in FIG. 9B, the display system may include the image source 932 (e.g., a bundle of projectors, micro-array displays, LCoS or Liquid Crystal on Silicon, or DLP or Digital Light Processing, etc.) that injects light rays into the first relay lens 934. The first relay lens 934 is operatively coupled to a variable focusing system 936 that adjusts the focal distance of the virtual display content.

The variable focusing system 936 may adjust the focal distance for the virtual display content of a single focal plane or switch among and render the virtual content onto a plurality of focal planes (e.g., six to twenty) at different focal distances. The variable focusing system 936 may thus couple, rather than decouple, the accommodation cues and the convergence cues, without forcing the accommodation cue without tying the accommodation cues to a fixed focal distance, by providing dynamic addressability of the focal distance of a single focal plane or rendering the virtual objects in the virtual display content in parallel on multiple focal planes at a flickering-free rate. In some embodiments where the display system renders the virtual display content on multiple focal planes in parallel, the separation between two immediately neighboring focal planes is one-seventh diopters.

The variable focusing system 936 is further operatively coupled to the second relay lens 938 to transmit the light rays onto a reflector 940 which further couples the light rays into the freeform wedge or a freeform wedge-shaped optical element 942 (collectively freeform wedge hereinafter). In some embodiments, the reflector 940 may include a folding mirror assembly. The free form wedge 942 functions in substantially similar manners as those described for the freeform optical element above. The light rays propagate between the one or more refractive surfaces and one or more reflective surfaces within the freeform wedge 942.

The freeform wedge 942 may be devised with appropriate surface parameters for these one or more refractive surfaces and one or more reflective surfaces to produce an exit pupil 942. Each of the first relay lens 934 and relay lens 938 may include a single relay lens or a group of lenses to invert an image. A relay lens may thus include one or more conventional lenses, achromatic doublets, or a cylindrical gradient-index of refraction lens. The first and the second relay lenses 934 and 938 may be used to produce the intermediate focal plane for the display system.

Figure 9C:
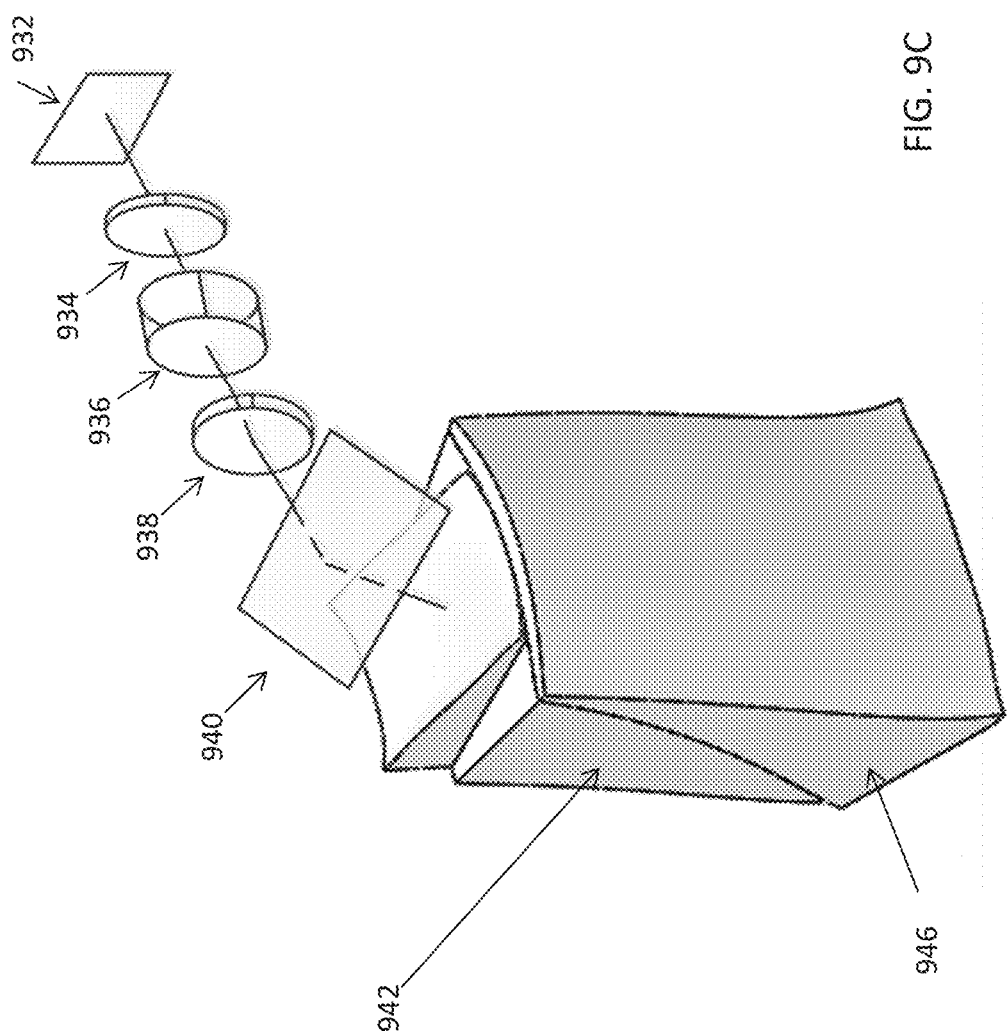
FIG. 9C illustrates another simplified, schematic representation of a primary display device in a tiled arrangement of freeform optical elements in some embodiments.

FIG. 9C illustrates another simplified, schematic representation of a variable focusing display system having a freeform optical system in some embodiments. In these embodiments, the image source 932 may inject light rays through a first relay lens 934 that is operatively coupled to a variable focusing system 936 that changes the focal distance of the virtual display content.

The variable focusing system 936 may change the focal distance for the virtual display content of a single focal plane or switch among and render the virtual content onto a plurality of focal planes (e.g., six to twenty) at different focal distances to for stereoscopy for the virtual display content. The light rays are further transmitted to the second relay lens 938 that is operatively coupled to a reflector 940 (e.g., a folding mirror assembly) which reflects and couples the light rays into the freeform wedge 942. The reflector 940 folds or diverts the optical path away from the fore head along the eyebrow to the side of the head in favor to a goggle- or glass-like appearance. The free form wedge 942 functions in substantially similar manners as those described for the freeform optical element above.

In addition or in the alternative, a compensation lens element 946 may be attached to the freeform wedge 942 to provide proper viewing of the surrounding environment across a very wide see-through field of view and/or to minimize or reduce the shift and distortion introduced to the light rays from a real-world scene when the compensation lens is combined with the freeform optical element (e.g., the freeform wedge 942). The light rays propagate between the one or more refractive surfaces and one or more reflective surfaces within the freeform wedge 942. The freeform wedge 942 may be devised with appropriate surface parameters for these one or more refractive surfaces and one or more reflective surfaces to produce an exit pupil 942.

Figure 10A:
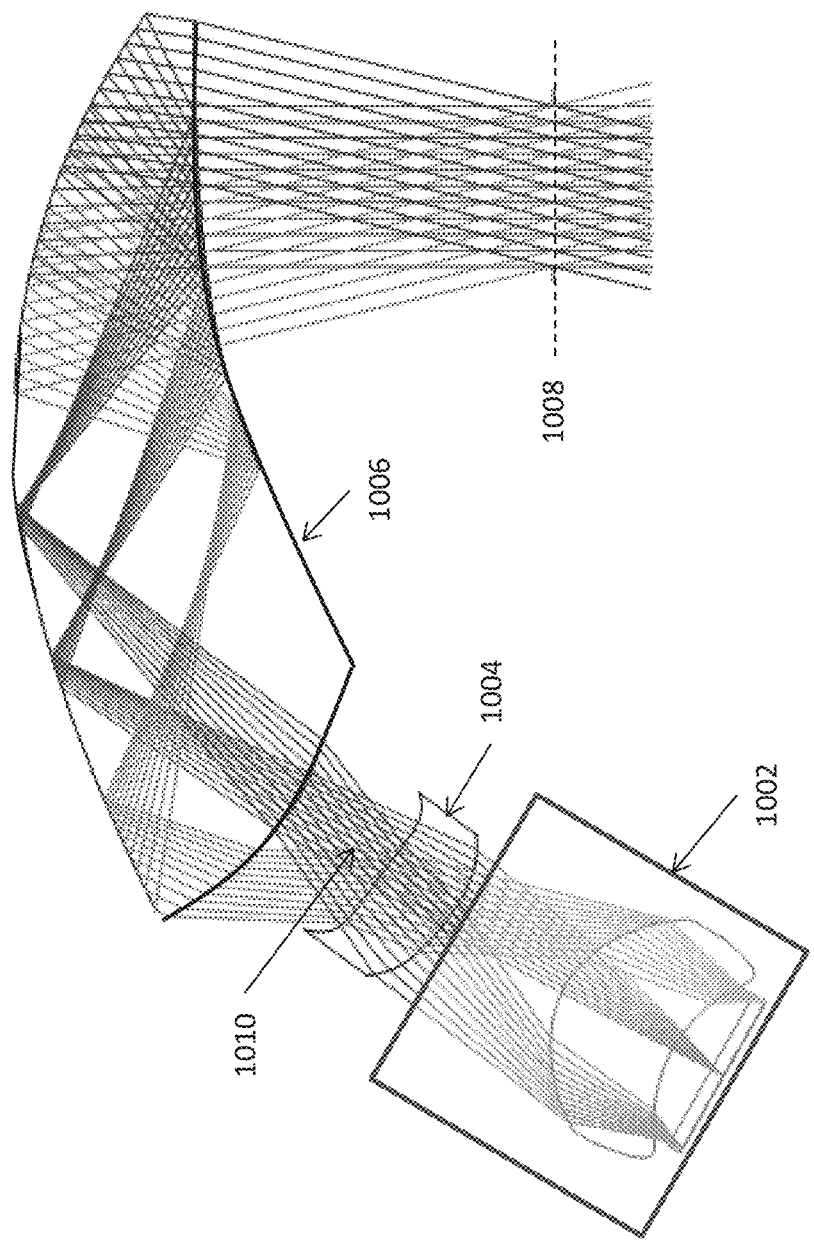
FIG. 10A illustrates a simplified schematic representation of a variable focusing display system having a freeform optical system in some embodiments.

FIG. 10A illustrates a simplified schematic representation of a variable focusing display system having a freeform optical system in some embodiments. In these embodiments, the variable focusing display system may include an image source 1002 which may include one or more of a bundle of projectors (e.g., pico-projectors, laser projectors, etc.), micro-array displays, LCoS or Liquid Crystal on Silicon, or LCD based DLP or Digital Light Processing, etc. The image source 1002 injects light rays through a coupling lens group 1004 that may be devised to include a liquid lens in the coupling lens group 1004 to form an intermediate pupil or intermediate focus plane 1010.

The variable focusing displaying system may alter the optical power of the liquid lens in the coupling lens group 1004 to change the focal length of the liquid lens. The changing focal length of the liquid lens effectively moves the intermediate focus plane 1010. The display system may further drive the liquid lens to produce fast and continuous focus control to, for example, produce the virtual display content with fast and continuously changing focal planes. The light rays are then relayed into the freeform optical element 1006 and propagate between one or more freeform refractive surfaces and one or more freeform reflective surfaces to produce the virtual display content at the conjugated exit pupil 1008.

Figure 10B:
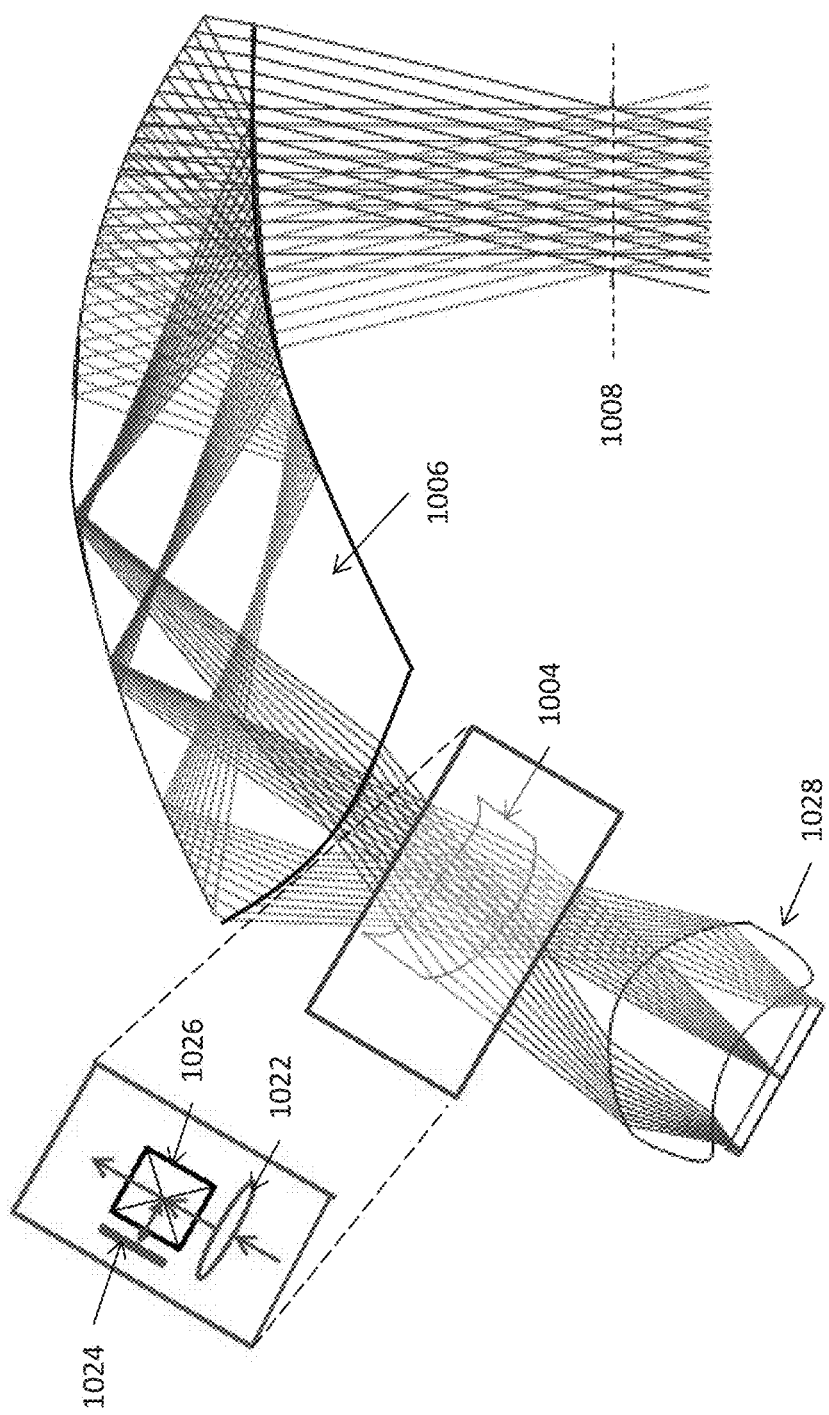
FIG. 10B illustrates another simplified schematic representation of another variable focusing display system having a freeform optical system in some embodiments.

FIG. 10B illustrates another simplified schematic representation of another variable focusing display system having a freeform optical system in some embodiments. In these embodiments, the variable focusing display system includes identical or substantially similar freeform optical element 1006 producing virtual display content at the exit pupil 1008.

The light rays from the micro display are propagated into a pair of polarized beam splitters 1026 (e.g., X-cube beam-splitter). The beam splitter 1026 first receives light rays from an image source 1028 through an optic 1022 in the variable focusing mechanism and directs the light rays to a deformable membrane mirror or a deformable mirror 1024; the deformable mirror 1024 reflects the light rays back to the beamsplitter 1026; the beamsplitter 1026 then relays the light rays into the freeform optical element 1006. The deformable mirror 1024 has a surface (not shown) that may be deformed to achieve wavefront control and other optical functions (e.g., correcting optical aberrations, etc.) The variable focusing displaying system may alter the optical power of the deformable mirror 1024 to change the focal length of the deformable mirror 1024.

The changing focal length of the deformable mirror 1024 effectively moves the intermediate focus plane. The display system may further drive the deformable mirror to produce fast and continuous focus control to, for example, produce the virtual display content with fast and continuously changing focal planes. The light rays are relayed into the freeform optical element 1006 and propagates between one or more freeform refractive surfaces and one or more freeform reflective surfaces. The light rays reflect and deflect in the freeform optical element 1006 and eventually produce the virtual display content at the conjugated exit pupil 1008.

Figure 11A:
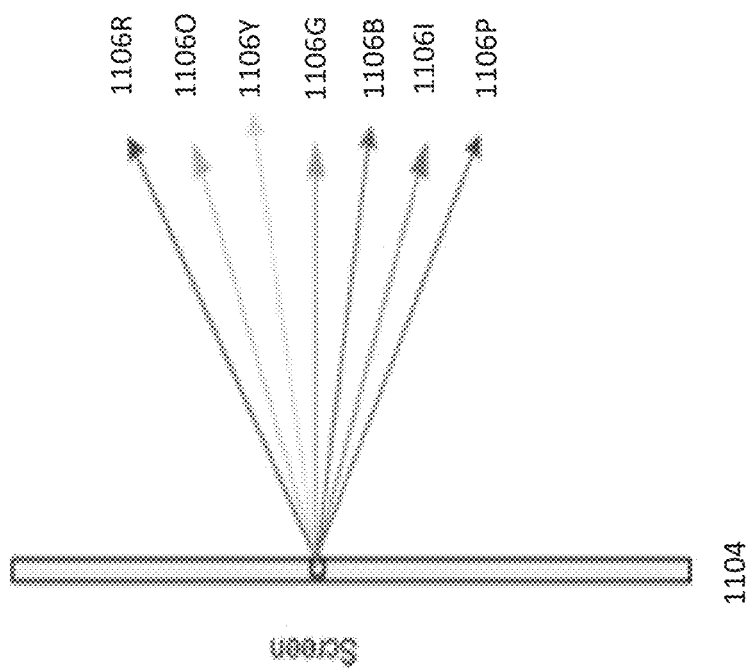
FIG. 11A illustrates a simplified representation of a light field display in comparison with a traditional two-dimensional display in some embodiments.

FIG. 11A illustrates a simplified representation of a light field display in comparison with a traditional two-dimensional display in some embodiments. Unlike conventional two-dimensional display 1002 that emits lights isotropically, a light field display maps light samples of different colors and radiances to appropriate light rays (e.g., 1106R, 1106O, 1106Y, 1106G, 1106B, 1106I, 1106P for light rays in red, orange, yellow, green, blue, indigo, and purple, respectively) in the physical space as schematically illustrated in 1104.

Figure 11B:
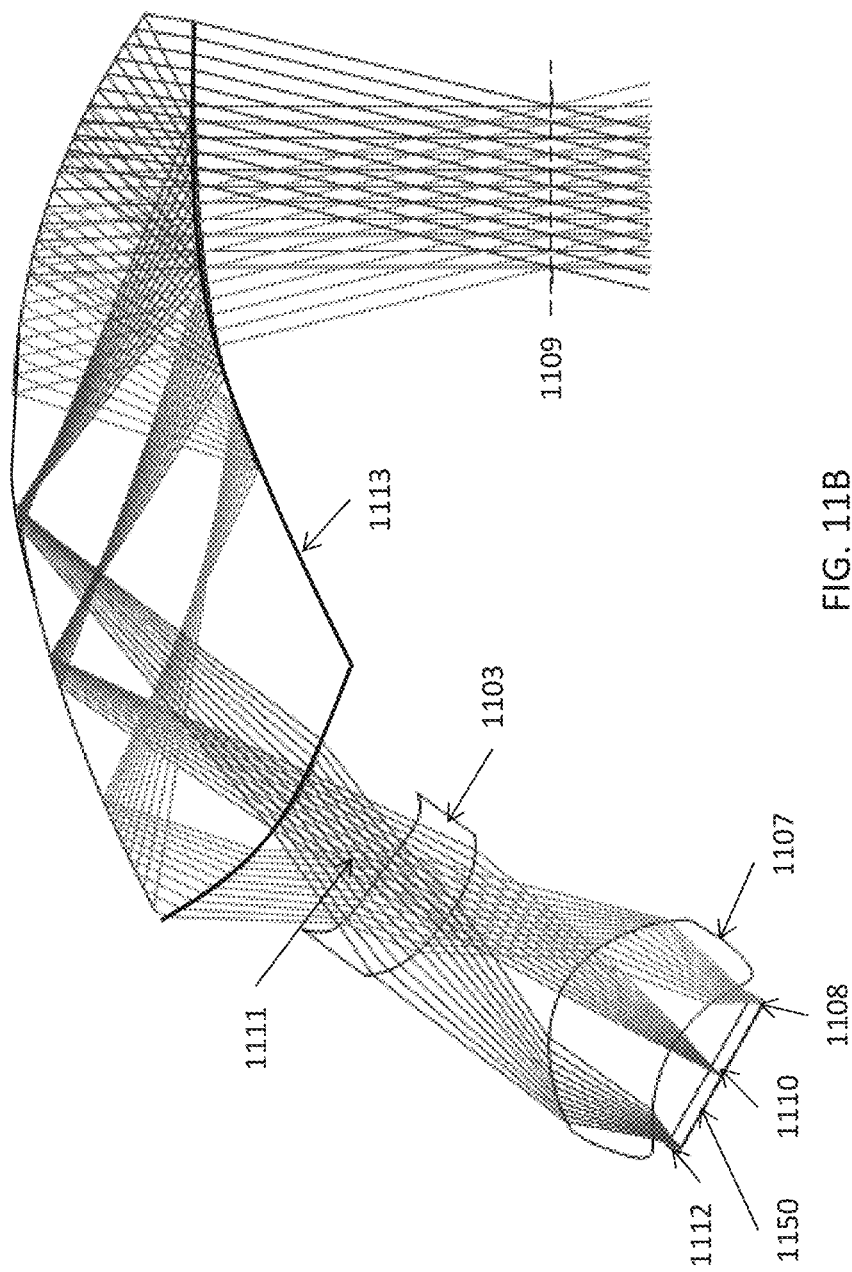
FIG. 11B illustrates a simplified schematic representation of a light field display with freeform optics that provides control of clustered bundles of light rays and modulates the radiance and color of the light rays as a function of direction of the light rays in some embodiments.

FIG. 11B illustrates a simplified schematic representation of a light field display system with freeform optics that provides control of clustered bundles of light rays and modulates the color and radiance of the light rays as a function of direction of the rays in some embodiments. The light field display illustrated in FIG. 11B provides control of clustered bundles of light rays and modulate their radiances and/or color as a function of direction. In these embodiments illustrated in FIG. 11B, the light field display system processes a bundle of light rays 1108, 1110, and 1112 with modulated radiance and/or color(s) emitted from one or more image sources 1150 and propagated into a coupling lens group 1107 having one or more coupling lenses 1103 to correct optical aberrations and improve image qualities and/or to produce an intermediate pupil 1111.

The light rays are then relayed into the freeform optical element 1113 to reflect and deflect between one or more refractive surfaces and one or more reflective surfaces having various surface parameters to produce the virtual display content at the conjugated exit pupil 1109. The light field display illustrated in FIG. 11B may also resolve the accommodation-convergence conflict without having to tie the accommodation cues to a fixed focal distance for displaying the proper light field content.

In some embodiments where the light field display system is implemented as a head-mounted display or a human wearable display, the light field display system resolves the accommodation-convergence conflict, provides a wide field of view (especially with a tiled arrangement of freeform optical elements as described above with reference to FIGS. 2-10B), and generate virtual display content images in focus within the natural accommodation range of human eyes, despite the light field display being in close proximity of the eyes.

The image source 1150 is a micro display or display system which is capable of emitting the modulated light rays. FIG. 11C illustrates one example of such image sources. More specifically, FIG. 11C illustrates one example of image source 1150C which maps and injects different light samples having different colors and radiances, represents one or more objects in the virtual display content to appropriate light rays with a bundle of image projectors (1108C, 1110C, and 1112C) in the physical space. the light rays emitted from the bundle of image projectors (1108C, 1110C, and 1112C) are effectively mixed together through a pair of field lens groups and injected into the freeform element through the coupling lens 1103 (in FIG. 11B) and the intermediate pupil 1111C. In some embodiments where the light field display system is implemented as a head-mounted display or a human wearable display, the light field display system displays the virtual display content to the eye(s) of a user without needing a screen.

Figure 11D:
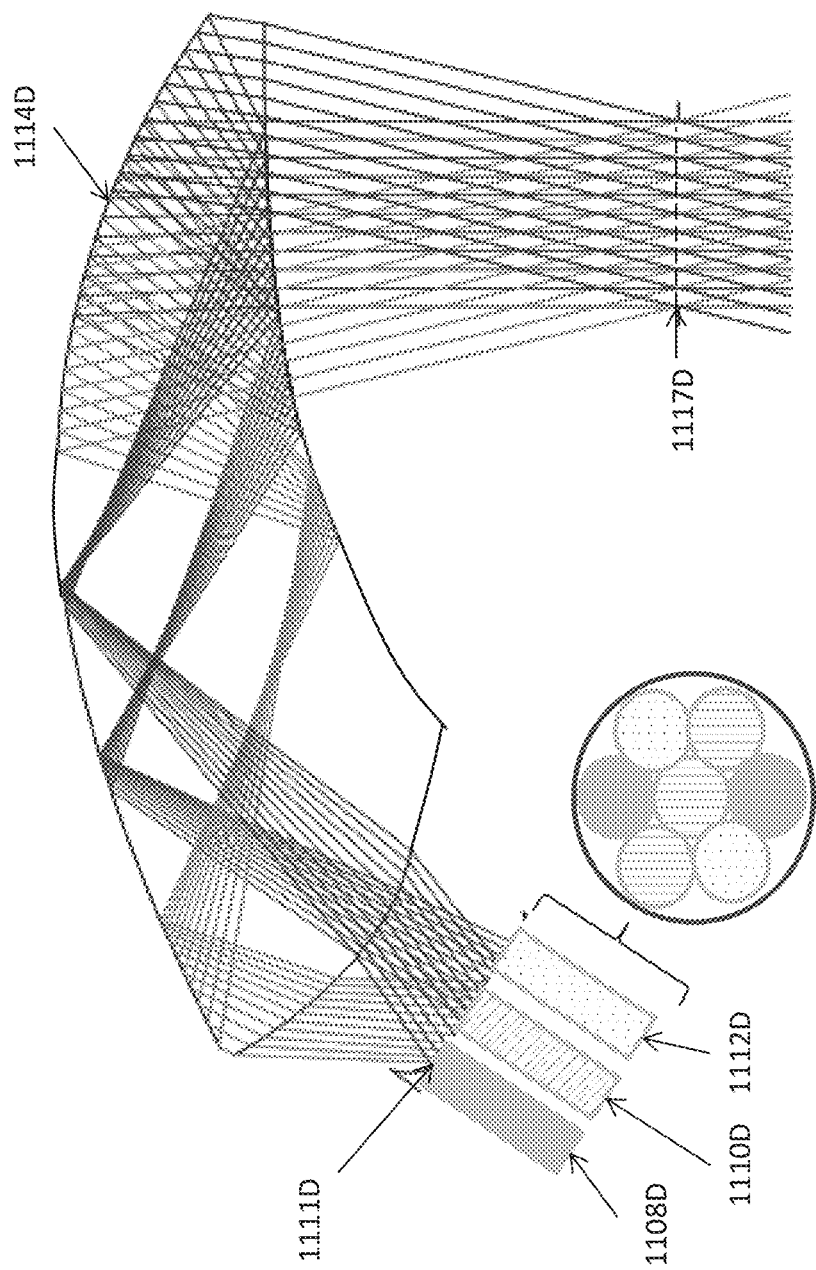
FIG. 11D illustrates another simplified schematic representation of a light field display with freeform optics that provides control of clustered bundles of light rays and modulates the radiance and color of the light rays as a function of direction of the rays in some embodiments.

FIG. 11D illustrates another simplified schematic representation of a light field display system with freeform optics that provides control of clustered bundles of light rays and modulates the radiance and/or color(s) of the clustered bundles of light rays as a function of position and/or direction of the clustered bundles of light rays in some embodiments. In these embodiments illustrated in FIG. 11D, the light field display system includes a computing system (not shown) to map light samples of different colors, radiances, and/or depths of one or more virtual objects emitting these light samples in the virtual display content to appropriate light rays. The light field display system may further use a bundle of image projectors (e.g., 1108D, 1110D, and 1112D) that are controlled by the computing system to emit these mapped light rays into the freeform optical element 1114D through intermediate pupil 1111D to finally produce the virtual display content at the exit pupil 1117D without using focusing systems or elements.

In some embodiments, the number of projectors in the bundle of image projectors may be determined based at least in part the required or desired resolution, the angular resolution of human eyes, or any other appropriate factors. That is, the light field display system may determine or identify the first light rays by modulating or mapping light samples of different colors, radiances, and/or depths of the virtual object that emits the first light rays when recording or producing the light rays that are subsequently used for reproducing the virtual object in virtual display content. When provided with such recorded information, the light field display system may extract the radiance and/or depth information form the light rays and use the extracted information to determine where the light rays are to be projected, which image projector(s) is (are) to be used to project the corresponding light rays, and where the image projector(s) is or are projecting the corresponding light rays to render the light field.

Figure 5:
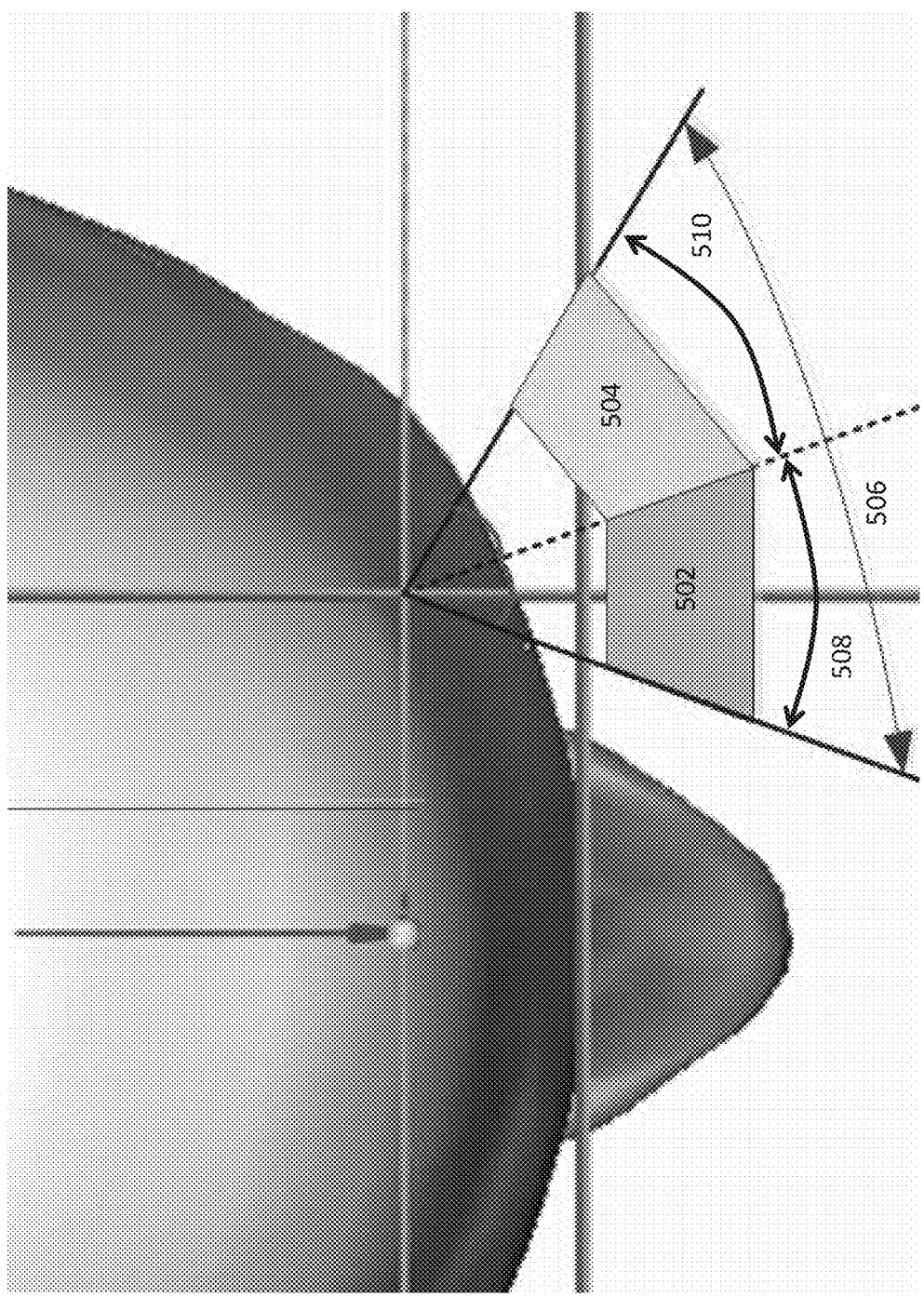
FIG. 5 shows a schematic representation of the horizontal field of view (FOV) of some freeform optical elements in a tiled arrangement in some embodiments.

FIG. 5 shows a schematic representation of the horizontal field of view (FOV) of some freeform optical elements in a tiled arrangement in some embodiments. More specifically, FIG. 5 illustrates a horizontal arrangement of the primary freeform optical element 502 and the secondary freeform optical element 504. The primary freeform optical element 502 is a freeform optical system with the addressable focus capability and centered with the user eye. The secondary freeform optical element 504 is also a freeform optical system with or without the addressable focus capability and is placed at the side of the primary display 502.

The primary freeform optical element 502 and the secondary freeform optical element 504 jointly provide an expanded horizontal field of view 506 including the contribution from the horizontal field of view 508 of the primary freeform optical element 502 and the horizontal field of view 510 of the secondary freeform optical element 504. In one embodiment, the tiled horizontal field of view of the primary freeform optical element 502 and secondary freeform optical element 504 falls with the range of 60 to 120 degrees.

Figure 6:
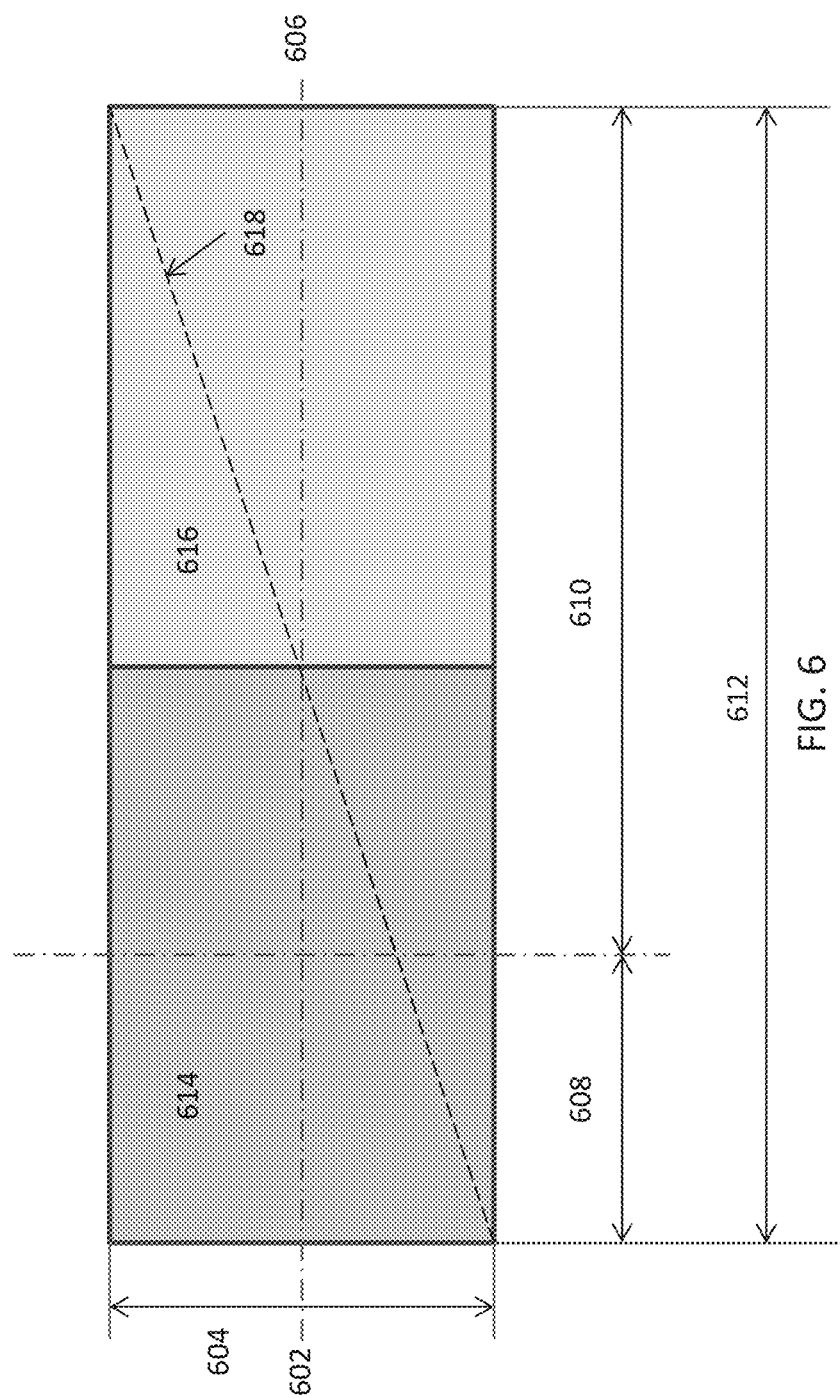
FIG. 6 illustrates a schematic representation of the vertical and horizontal field of view (FOV) of two freeform optical elements in a horizontally tiled arrangement in some embodiments.

FIG. 6 illustrates a schematic representation of the vertical and horizontal field of view (FOV) of two freeform optical elements in a monocular horizontally tiled arrangement in some embodiments. The schematic representation includes the primary field of view 614 provided by a primary freeform optical element and the secondary field of view 616 provided by a secondary freeform optical element. The primary freeform optical element is arranged near the nasal side 602 of the user, and the secondary freeform optical element is arranged near the temple side 606 of the user in this schematic representation.

In this particular representation, the primary freeform optical element and the secondary freeform optical element have the same field of view and aspect ratio. In these embodiments, both the primary and secondary freeform optical elements have the vertical field of view 604, which is also the vertical field of view of the tiled arrangement of the primary and secondary freeform optical elements. As naturally perceived by a human eye, the aggregated horizontal field of view 612 of this tiled arrangement may include the nasal horizontal field of view 608 and the temple horizontal field of view 610. The two horizontally tiled freeform optical elements jointly provide a diagonal field of view 618 as illustrated in FIG. 6.

Figure 7:
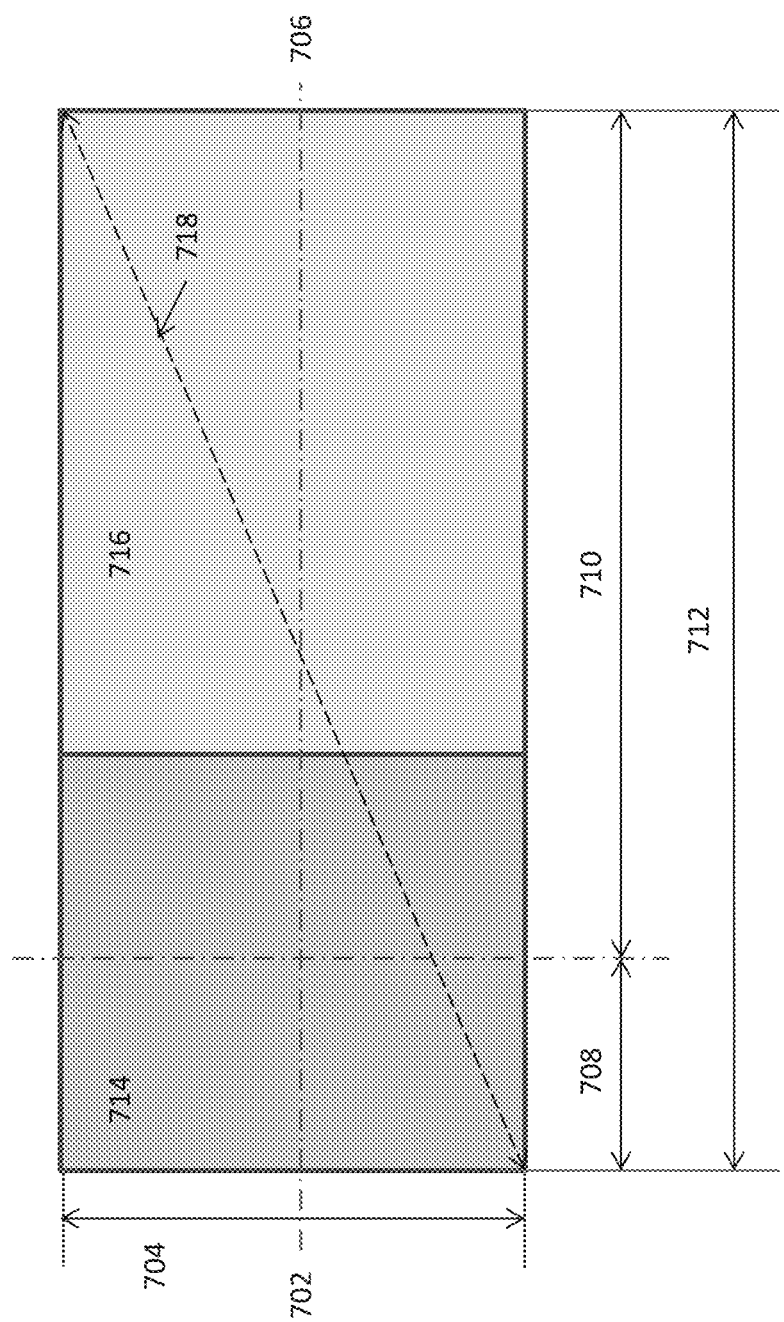
FIG. 7 illustrates another schematic representation of the vertical and horizontal field of view (FOV) of two freeform optical elements in a horizontally tiled arrangement in some embodiments.

FIG. 7 illustrates another schematic representation of the vertical and horizontal field of view (FOV) of two freeform optical elements in a monocular horizontally tiled arrangement in some embodiments. More specifically, FIG. 7 illustrates the field of view of another tiled arrangement of a primary and a secondary freeform optical element. The primary freeform optical element is arranged closer to the nasal side 702 and provides a primary field of view 714 having the vertical field of view 704. The secondary freeform optical element is arranged closer to the temple side and provides a secondary field of view 716 also having the vertical field of view 704. In these embodiments, the primary freeform optical element is devised in such a way to increase or maximize the vertical field of view The secondary freeform optical element is devised to provide the same vertical field of view 704 as the primary freeform optical element and is devised in such a way to increase or maximize the horizontal field of view. Depending on the aspect ratio and thus the horizontal field of view provided by the primary freeform optical element, the secondary freeform optical element may also be devised to expand the horizontal field of view provided by the primary freeform optical element to a desired or required aspect ratio in some embodiments. The secondary freeform optical element may provide a field of view with a different aspect ratio that differs from that of the primary field of view. The field of view of the tiled arrangement of the primary and secondary freeform optical elements thus provides a diagonal field of view 718 as illustrated in FIG. 7. As naturally perceived by a human eye, the aggregated horizontal field of view 712 may include the nasal horizontal field of view 708 and the temple horizontal field of view 710.

FIG. 8 illustrates another schematic representation of the vertical and horizontal field of view (FOV) of two freeform optical elements in a horizontally tiled monocular arrangement in some embodiments. More specifically, FIG. 8 illustrates the field of view of another tiled arrangement of a primary and a secondary freeform optical element. The primary freeform optical element is arranged closer to the nasal side 802 and provides a primary field of view 814 having the vertical field of view 804. The secondary freeform optical element is arranged closer to the temple side and provides a secondary field of view 816 also having the vertical field of view 820. In these embodiments, the primary freeform optical element is devised in such a way to increase or maximize the vertical field of view 804 (e.g., to around 135-degree).

The secondary freeform optical element is devised in such a way to increase or maximize the horizontal field of view. The secondary freeform optical element provides a secondary field of view 816 having the vertical field of view 806 which may or may not match the vertical FOV 804. The second freeform optical element may or may not produce the field of view with the same aspect as that produced by the primary freeform optical element. The diagonal field of view 818 of the tiled arrangement of the primary and secondary freeform optical elements is nevertheless defined by the vertical field of view 804 of the primary freeform optical element and the aggregated horizontal field of view 812. As naturally perceived by a human eye, the aggregated horizontal field of view 812 may include the nasal horizontal field of view 808 and the temple horizontal field of view 810.

Figure 4A:
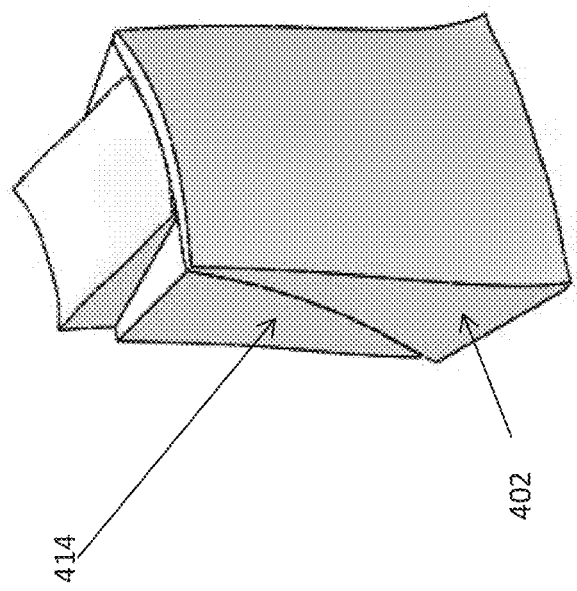
FIGS. 4A-B illustrate a partial schematic representation of the freeform optical elements of a system for displaying stereoscopy with a compensation lens element for virtual and/or augmented reality in some embodiments.

FIG. 4A illustrates a simplified schematic representation of a primary display device having a compensation lens in some embodiments. In these embodiments, the compensation lens 402, including one or more freeform refractive surfaces, may provide proper viewing of the surrounding environment across a very wide see-through field of view. The surfaces of the compensation lens 402 may be enhanced or optimized to minimize or reduce the shift and distortion introduced to the light rays from a real-world scene when the compensation lens element 402 functions in conjunction with the freeform optical element(s) (e.g., the freeform wedge 414).

Figure 4B:
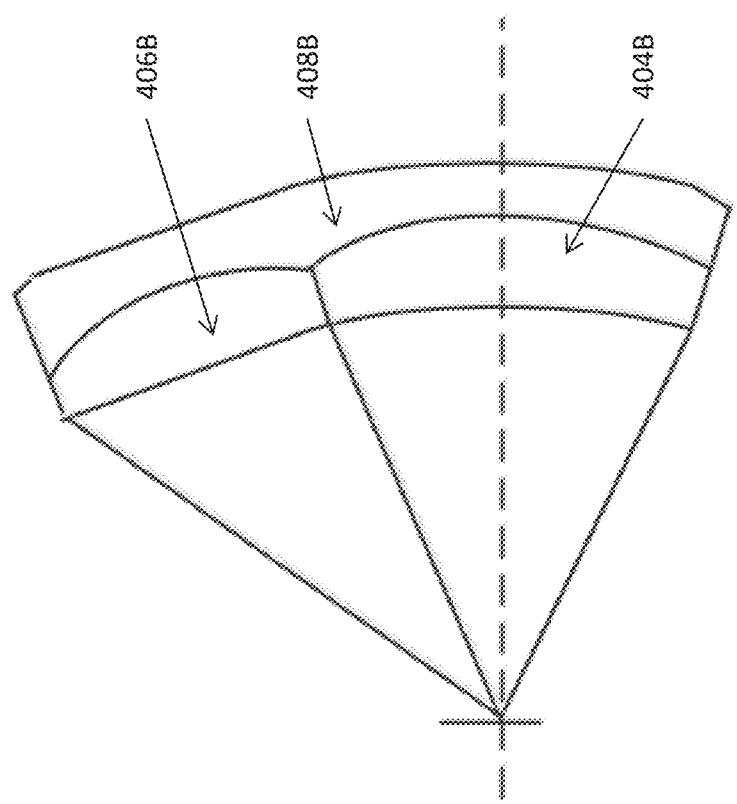

FIG. 4B illustrates another simplified schematic representation of a primary display element, a second display element, and a compensation lens element in some embodiments. More specifically, FIG. 4B illustrates the primary freeform display element 404B and the secondary freeform display element 406B a tiled arrangement. The simplified schematic representation further includes a compensation lens element 408B that is attached to and covers at least a part of the primary display freeform element 404B and the secondary freeform display element 406B. The compensation lens element 408B may function in conjunction with the two freeform display elements to provide proper viewing of the surrounding environment across a very wide see-through field of view. In addition or in the alternative, the surfaces of the compensation lens 408B may be enhanced or optimized to minimize or reduce the shift and distortion introduced to the light rays from a real-world scene when the compensation lens element 408B functions in conjunction with the freeform optical element(s).

Figure 12A:
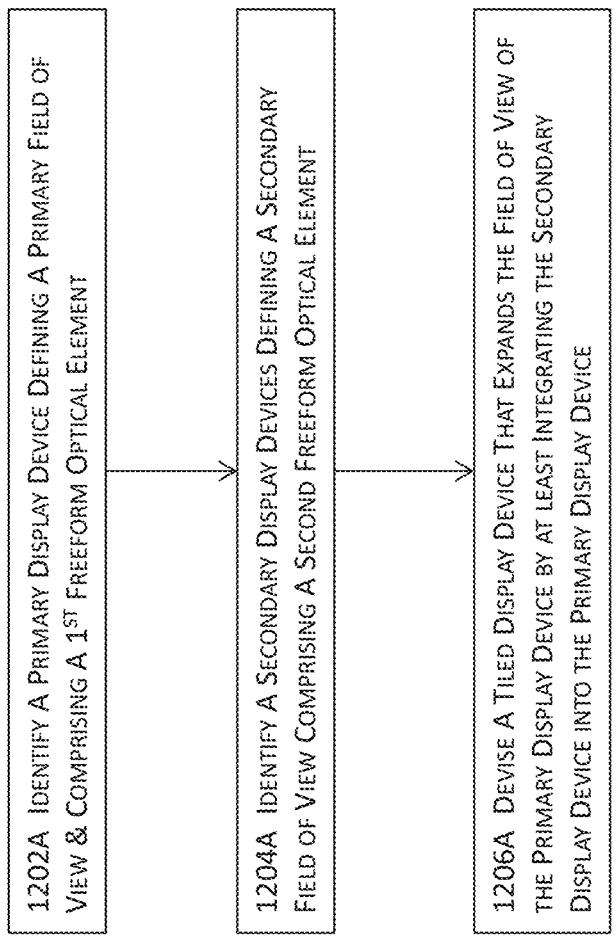
FIG. 12A illustrates a high level flow diagram of a method for generating stereoscopic images with a freeform optical system in a tiled arrangement in some embodiments.

FIG. 12A illustrates a high level flow diagram of a method for generating stereoscopic images with a freeform optical display system in a tiled arrangement in some embodiments. In these embodiments illustrated in FIG. 12A, the method may comprise identifying a primary display device at 1202A. In some of these embodiments, the primary display device defines a primary vertical field of view. The primary field of view may include at least one of a primary horizontal field of view, a primary vertical field of view, or a combination of the primary horizontal field of view and the primary vertical field of view. In addition or in the alternative, the primary display device may comprise a first freeform optical element such as the freeform optical element 908 of FIG. 9A or 940 of FIG. 9B. The primary display device is coupled to a first image source (e.g., image source 902 of FIG. 9A or 932 of FIG. 9B) via a first coupling optical system that includes a variable focus element in some of these illustrated embodiments.

In some of these illustrated embodiments, the first coupling optical system is devised to correct optical aberrations and improve image qualities of the virtual display content rendered by the freeform optical system. The primary vertical field of view of the primary display device may be optionally increased or maximized. In some embodiments, at 1204A, a secondary display device may be devised (if not yet devised) or identified (if already existing). The secondary display device includes a second freeform optical element such as the freeform optical element 908 of FIG. 9A or 940 of FIG. 9B. In addition or in the alternative, a secondary display device may have an increased or maximized secondary horizontal field of view. The secondary vertical field of view of the secondary display device may exactly or approximately match the primary vertical field of view of the first display device in some embodiments. In some of these embodiments, the secondary display device identified at 1204A comprises a second freeform optical element.

A tiled display device may be devised (if already existing) or identified (if not yet existing) by attaching the secondary display device to the primary device in a tiled arrangement to form a tiled display device. In some of these embodiments illustrated at 1206A in FIG. 12A, the secondary display device may be attached to the primary device in a tiled arrangement that expands the horizontal field of view of the primary display device. In some embodiments, the tiled arrangement includes a horizontal arrangement in which the secondary display device and the primary display device are disposed adjacent to each other. In some other embodiments, the tiled arrangement includes a vertical arrangement in which the secondary display device is disposed atop the primary display device, or the primary display device is disposed atop the secondary display device.

In addition or in the alternative, one or more other secondary display devices may be attached or integrated to the primary display device in a first tiled arrangement for the tiled display device. In some of these embodiments, the first tiled arrangement includes attaching at least some of the one or more other secondary display devices to a horizontal side of the tiled display device. In some other embodiments, the first tiled arrangement includes attaching at least some of the one or more other secondary display devices to a vertical side of the tiled display device. In yet other embodiments, the first tiled arrangement includes attaching at least some of the one or more other secondary display devices to both a horizontal side and a vertical side of the tiled display device. In some embodiments illustrated in FIG. 12A, the field of view of the tiled display device defines an aggregated horizontal field of view and an aggregated vertical field of view that meet a required or desired aspect ratio. In one embodiment, the required or desired aspect ratio of width to height is 16:9. In another embodiment, the required or desired aspect ratio of width to height is 4:3. In another embodiment, the required or desired aspect ratio of width to height is 2.35:1.

FIGS. 12B-E jointly illustrate a more detailed flow diagram of a method for generating stereoscopic images with a freeform optical system in a tiled arrangement in some embodiments. In these embodiments illustrated in FIGS. 12B-E, a primary display device defining a primary field of view and comprising a first freeform optical element may be identified (if already existing) or devised (if not yet existing) at 1202B. The primary display device may also be coupled to a first image source such as a bundle of projectors, one or more pico-projectors, one or more micro-projectors, etc. In some of these embodiments, the primary display device may include a variable focusing mechanism for the freeform optical display apparatus.

The primary field of view of the primary display device may be optionally increased or maximized at 1204B. The primary field of view may include at least one of a primary horizontal field of view, a primary vertical field of view, or a combination of the primary horizontal field of view and the primary vertical field of view in some embodiments. A secondary display device may be identified (if already existing) or devised (if not yet existing) at 1206B. The secondary display device defines a secondary field of view and comprises a second freeform optical element.

Figure 12B:
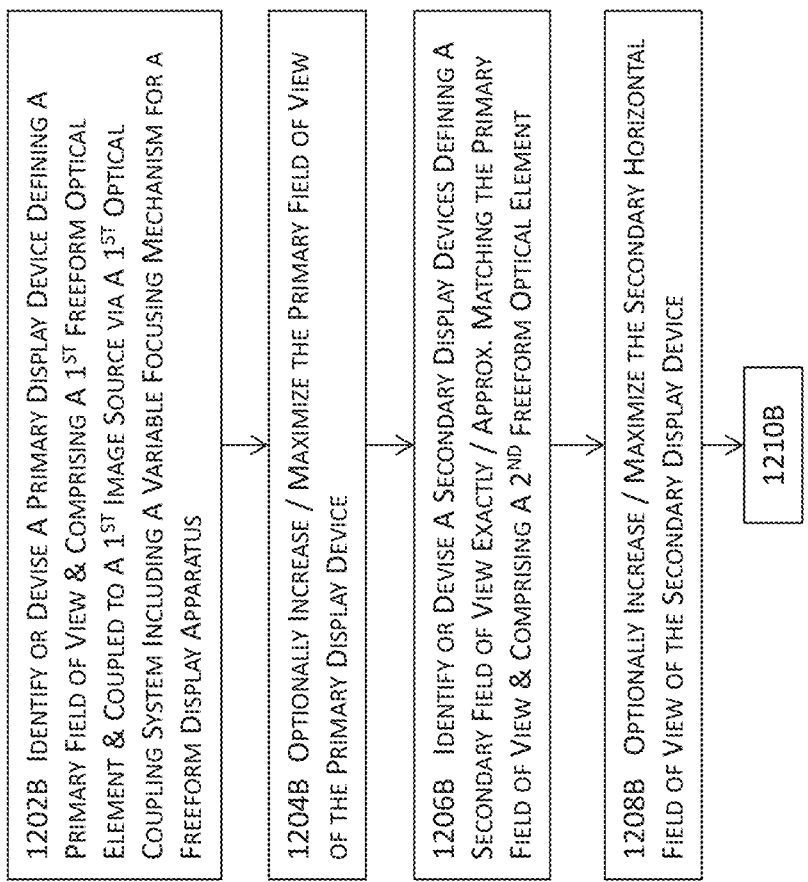
FIGS. 12B-E jointly illustrate a more detailed flow diagram of a method for generating stereoscopic images with a freeform optical system in a tiled arrangement in some embodiments.
Figure 12C:
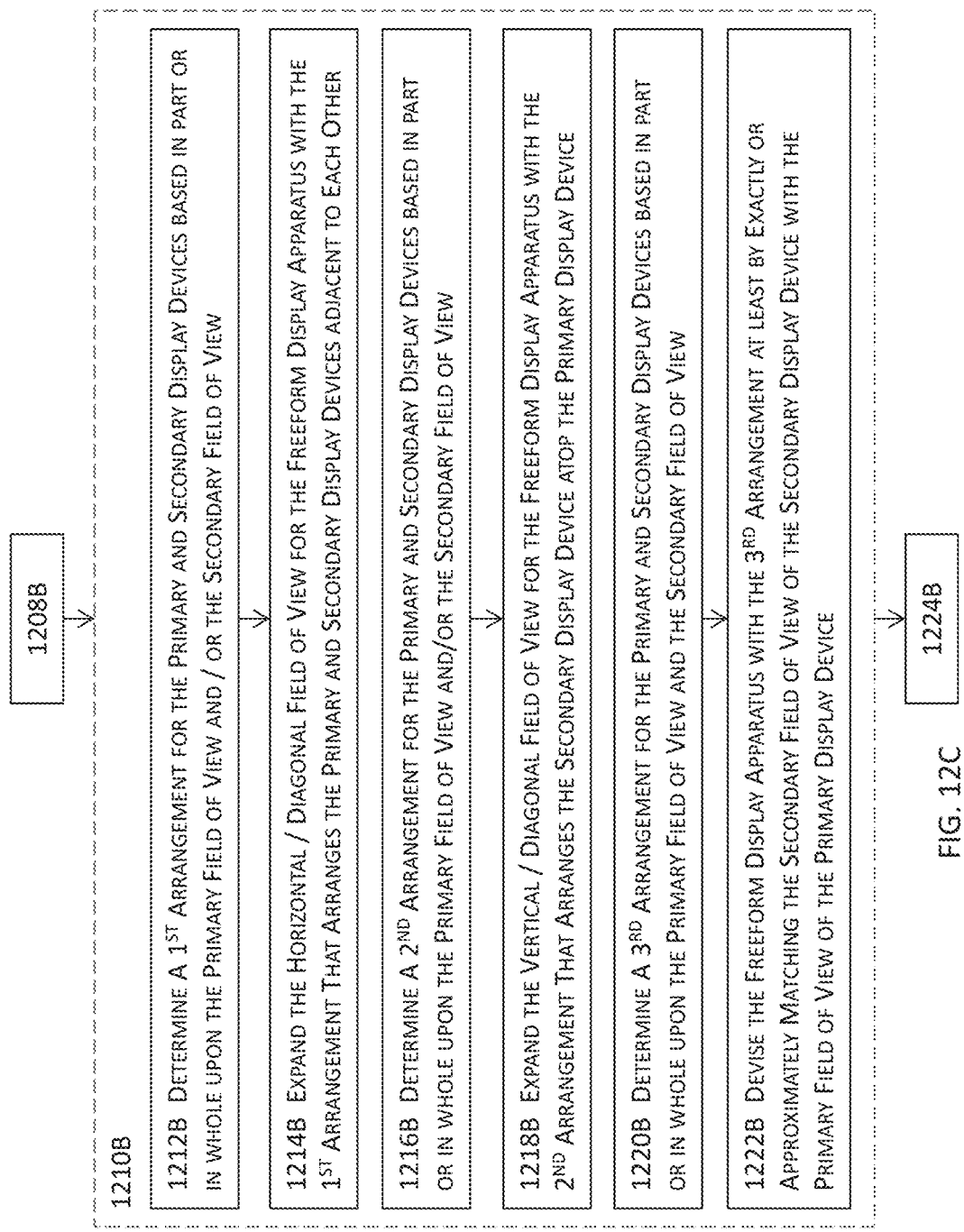
Figure 12D:
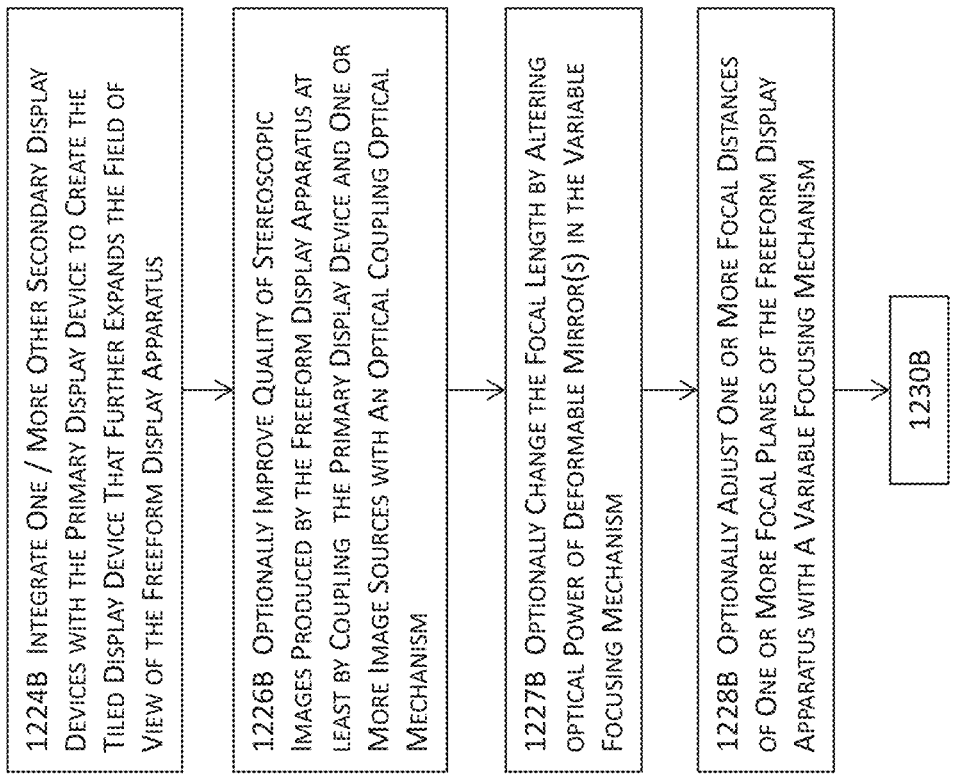
Figure 12E:
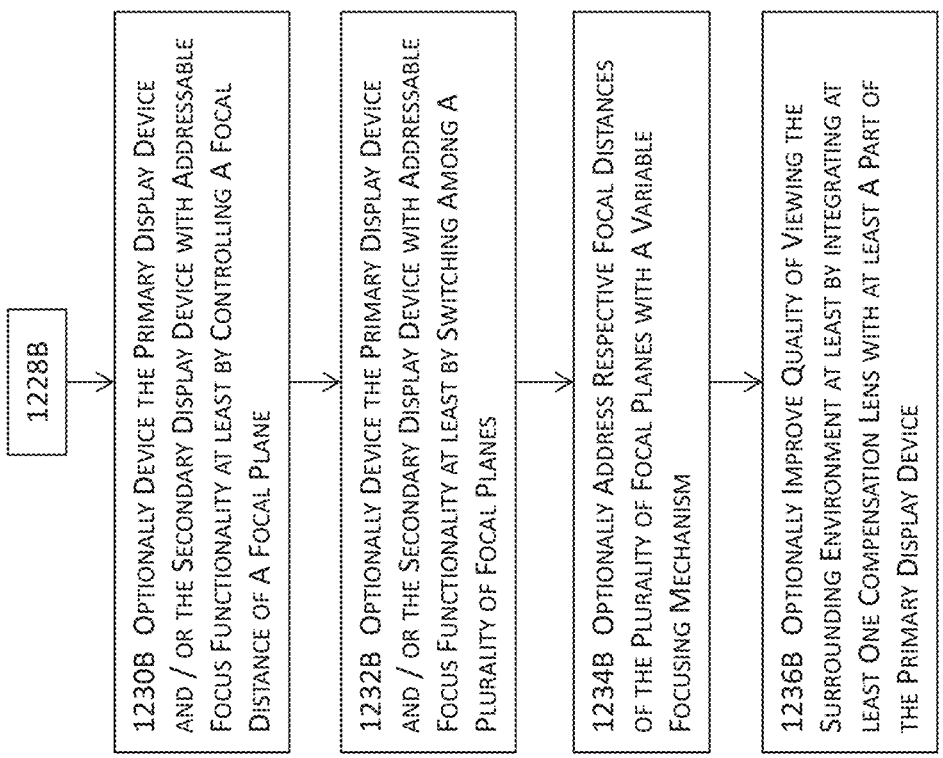

In some of these embodiments illustrated in FIG. 12B, the secondary field of view may exactly or approximately match the primary field of view. The secondary field of view may include at least one of a secondary horizontal field of view, a secondary vertical field of view, or a combination of the secondary horizontal field of view and the secondary vertical field of view in some embodiments. At 1208B, the secondary horizontal field of view of the secondary display device may be optionally increased or maximized in some of these embodiments illustrated in FIG. 12B. Reference numeral 1210B illustrates three different processes to generate three arrangements that may be used to integrate the primary and secondary display devices.

A freeform display apparatus described in FIGS. 12B-E may include one or more arrangements of these three arrangements. In some embodiments, a first arrangement may be determined at 1212B for the primary and the secondary display devices based in part or in whole upon the primary field of view and/or the secondary field of view. In some embodiments, the first arrangement includes a horizontal arrangement.

At 1214B, the horizontal or the diagonal field of view of the freeform display apparatus may be expanded with the first arrangement that arranges the primary and the secondary display devices adjacent to each other. In addition or in the alternative, a second arrangement may be determined at 1216B for the primary and secondary display devices based in part or in whole upon the primary field of view and/or the secondary field of view. In some embodiments, the second arrangement may include a vertical arrangement. The vertical and/or the diagonal field of view of the freeform display apparatus may be expanded at 1218B with the second arrangement.

In some embodiments, the primary display device may be placed atop the secondary display device. In some other embodiments, the secondary display device may be placed atop the primary display device. In addition or in the alternative, a third arrangement may be determined at 1220B for the freeform display apparatus based in part or in whole upon the primary field of view and/or the secondary field of view. The freeform display apparatus may be devised at 1222B with the third arrangement at least by exactly or approximately matching the secondary field of view (e.g., the secondary vertical field of view) of the secondary display device with the primary field of view (e.g., the primary vertical field of view) of the primary display device.

With the primary display device and the second display device integrated for a tiled display device, one or more other secondary display devices may be attached to or integrated with the primary display device or with the tiled display device at 1224B to further expand the field of view of the freeform display apparatus in some embodiments. In some embodiments, the primary display device may have the addressable focus capability. The secondary display device may also have the addressable focus capability in some embodiments or may not have the addressable focus capability in some other embodiments. More details about the addressable focus capability will be described below.

The quality of stereoscopic images produced by the freeform display apparatus may be optionally improved at 1226B at least by coupling the primary display device and/or one or more image sources with an optical coupling optical mechanism. For example, a coupling device (e.g., coupling lens 108) may be coupled with the primary display device to correct optical aberrations at 1226B in some embodiments. As another example, the primary display device may include or be integrated with a compensation lens having one or more freeform refractive surfaces to minimize or reduce the shift and distortion that is introduced to the light rays from real-world scene and/or to provide viewing of the surrounding environment in some embodiments.

In these embodiments, the freeform display apparatus described herein provide the see-through field of view. In some of these embodiments, the compensation lens may cover at least a portion of the primary display device or the freeform optical element of the primary display device. The focal length may also be optionally changed at 1227B by altering the optical power of a variable focus mechanism. In some embodiments where the variable focus mechanism includes a deformable mirror or a deformable membrane mirror, the focal length may also be optionally changed at 1227B by altering the optical power of the deformable mirror or the deformable membrane mirror a variable focus mechanism.

At 1228B, one or more focal distances of one or more focal planes of the freeform display apparatus may be optionally adjusted with a variable focus mechanism. The primary display device and/or the secondary display device may be optionally devised at 1230B with the addressable focus functionality at least by controlling and varying a focal distance of a single focal plane in some embodiments. In some other embodiments, the primary display device and/or the secondary display device may also be optionally devised at 1232B with addressable focus functionality at least by switching among a plurality of focal planes.

In these latter embodiments, each of the plurality of focal planes has a fixed focal length, and the addressable focus functionality enables the freeform display apparatus to switch among the plurality of focal planes in projecting the stereoscopic images. In some of these embodiments, the respective focal distances of the plurality of focal planes may be addressed with a variable focus mechanism at 1234B. The quality of viewing the surrounding environment may be optionally improved at 1236B at least by at least one compensation lens with at least a portion of the primary display device. A compensation lens is to compensate for reduction in viewing quality due to the presence of the freeform display apparatus between the real-world scenes and an observer's eye (with a monocular freeform display apparatus) or eyes (with a binocular freeform display apparatus) and may comprise one or more refractive surfaces to minimize or reduce the shift and distortion introduced to the light rays from a real-world scene so as to compensate for the primary, secondary, and/or one or more other secondary display devices to provide proper viewing of the surrounding environment.

Figure 13A:
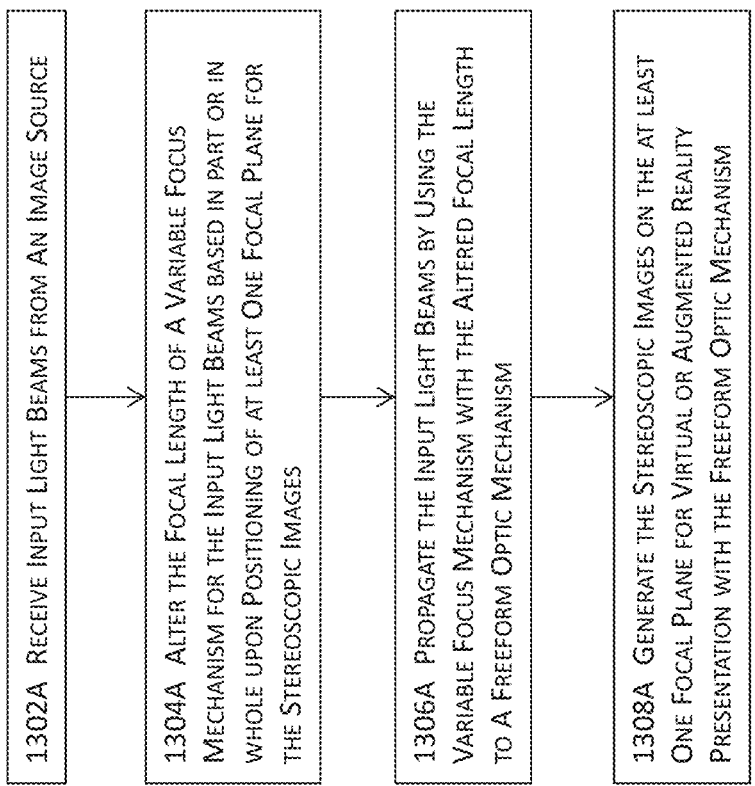
FIG. 13A illustrates a high level flow diagram of a method for generating stereoscopic images with a variable focusing freeform optical system in a tiled arrangement in some embodiments.

FIG. 13A illustrates a high level flow diagram of a method for generating stereoscopic images with a variable focusing mechanism in a tiled arrangement for a freeform display apparatus in some embodiments. In these embodiments, input light beams may be received at 1302A from an image source. The image source may include one or more of a bundle of projectors (e.g., pico-projectors, laser projectors, etc.), micro-array displays, LCoS or Liquid Crystal on Silicon, or LCD based DLP or Digital Light Processing, etc. the focal length of the input light beams may be altered with a variable focus mechanism a 1304A based in part or in whole upon the positioning of at least one focal plane for the stereoscopic images produced by the freeform display apparatus and observed by an observer's eye (with a monocular freeform display apparatus) or eyes (with a binocular freeform display apparatus).

The input light beams with the altered focal length may be propagated to a freeform optic mechanism at 1306A. The stereoscopic images may then be generated or projected at 1308A on the at least one focal plane for virtual or augmented reality presentation to a human observer with the freeform optic mechanism. More details about the method for generating stereoscopic images with a variable focusing mechanism in a tiled arrangement for a freeform display apparatus illustrated in FIG. 13A are provided in the following section with reference to FIGS. 13B-D.

Figure 13B:
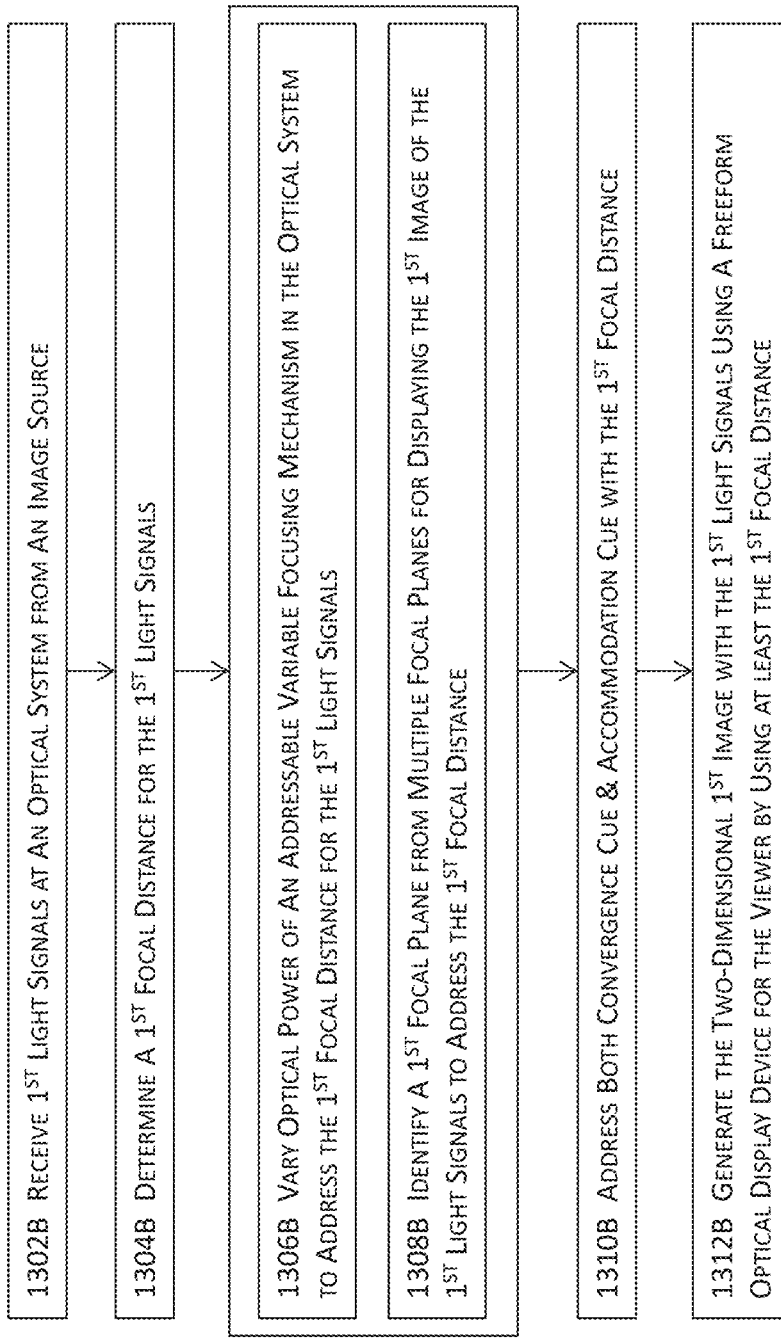
FIG. 13B illustrates a more detailed flow diagram of a method for generating stereoscopic images with a variable focusing freeform optical system in a tiled arrangement in some embodiments.

FIG. 13B illustrates a flow diagram of a method for generating stereoscopic images with a variable focusing freeform optical display system in some embodiments. In these embodiments illustrated in FIG. 13B, first light signals may be received at an optical system from an image source at 1302B. In some of these embodiments, the image source includes one or more bundles of projectors, a Liquid Crystal on Silicon micro-array display, or a Digital Light Processing micro-array display system. In addition or in the alternative, the optical system may include a variable focusing system such as the variable focusing system 936 of FIG. 9B or that of FIG. 10A in some embodiments. The optical system may further include an image source, and the variable focusing mechanism may include a liquid lens or a deformable membrane mirror that is further coupled to one or more relay lens in some embodiments.

At 1304B, a first focal distance may be determined for the first light signals from the image source. The first focal distance includes the distance of a focal plane perceived by a user viewing virtual display content rendered by the variable focusing freeform optical display system as if the part of the virtual display content that is rendered in focus were situated at the distance from the user in some embodiments. In some of these embodiments, the optical power of an addressable variable focusing mechanism in the optical system may be varied at 1306B to address the first focal distance for the first light signals. In these embodiments, the optical system includes a single focal plane and changes the focal distance of the single focal plane to couple accommodation cues and convergence cues to the changing focal distance.

In some of these embodiments, the addressable variable focusing element comprises a liquid lens. In some other embodiments, the addressable variable focusing element may comprise a deformable membrane mirror that is further coupled to one or more relay lens. Alternatively, a first focal plane may be identified from multiple focal planes for displaying the first image of the first light signals to address the first focal distance of the first light signals at 1308B. In these embodiments, the optical system may include the multiple focal planes and renders virtual display content in parallel onto at least two of the multiple focal planes to couple accommodation cues and convergence cues to the changing focal distance.

At 1310B, both the convergence cues and the accommodation cues may be addressed, registered, or associated with (collectively addressed) the first focal distance that varies among the multiple focal planes. In some embodiments, both the convergence cues and the accommodation cues may be addressed by coupling both the convergence cues and the accommodation cues with the first focal distance, without tying the accommodation cues or the convergence cues to a fixed focal distance. At 1312B, the two-dimensional first image may be generated or rendered with the first light signals using a freeform optical display device for viewing by using at least the first focal distance.

Figure 13C:
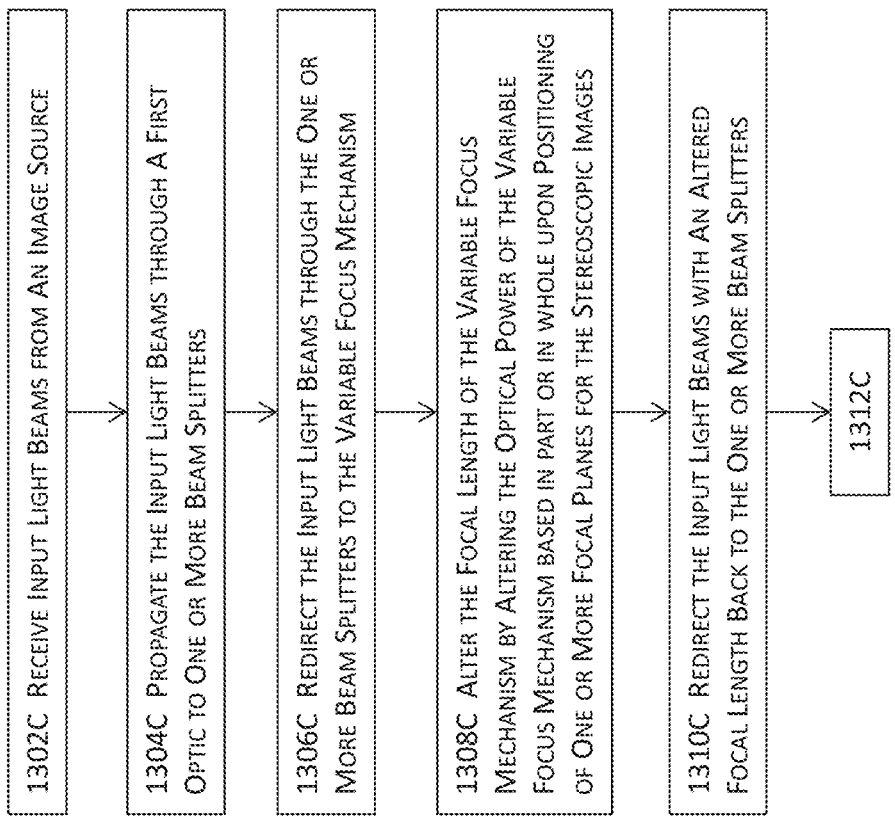

FIGS. 13C-D jointly illustrate a flow diagram of a process for generating stereoscopic images with a variable focusing freeform optical system in some embodiments. In these embodiments, input light beams may be received at 1302C from an image source in an identical or substantially similar manner as that described for 1302B or 1302A. The received input light beams may be propagated through a first optic in a variable focus mechanism to one or more beam splitters at 1304C.

In some embodiments, the first optic may include a biconvex lens to convert the received input light beams into parallel light beams. After passing through the first optic, the input light beams may be redirected at 1306C through the one or more beam splitters to a second optic in the variable focus mechanism. In some embodiments, the second optic comprises a deformable mirror, a deformable membrane mirror, or any other suitable optic that provide the variable focus capability or functionality. The focal length of the variable focus mechanism may be changed by altering the optical power of the variable focus mechanism at 1308C based in part or in whole upon positioning of one or more focal planes on which the stereoscopic images will be rendered by the freeform display apparatus.

After the input light beams have been processed by the variable focus mechanism with an altered focal distance, the input light beams may be redirected back to the one or more beam splitters at 1310C. A requirement for changing focal planes may be identified at 1312C. In some embodiments, the requirement may include, for example, how fast (spatially, temporally, or both spatially and temporally) the focal plane or the focal distance is changing, whether or not the focal plane or the focal distance is changing continuously or periodically, or any other requirements associated with changing focal planes or focal lengths.

The requirement identified at 1312C may also be used to determine how the optical power is to be controlled in some embodiments. One or more controls may be provided at 1314C to alter the focal length(s) of the variable focus mechanism based in part or in whole upon the requirement identified at 1312C. A focal length of the variable focus mechanism may be altered at 1316C with the one or more controls based in part or in whole upon the altered focal lengths. With the altered focal length, the input light beams may be propagated to a freeform optic mechanism at 1318C, and the stereoscopic images may be generated or projected at 1320C on the one or more focal planes with the freeform optic mechanism for virtual or augmented reality presentation for one or more human observers.

Figure 14A:
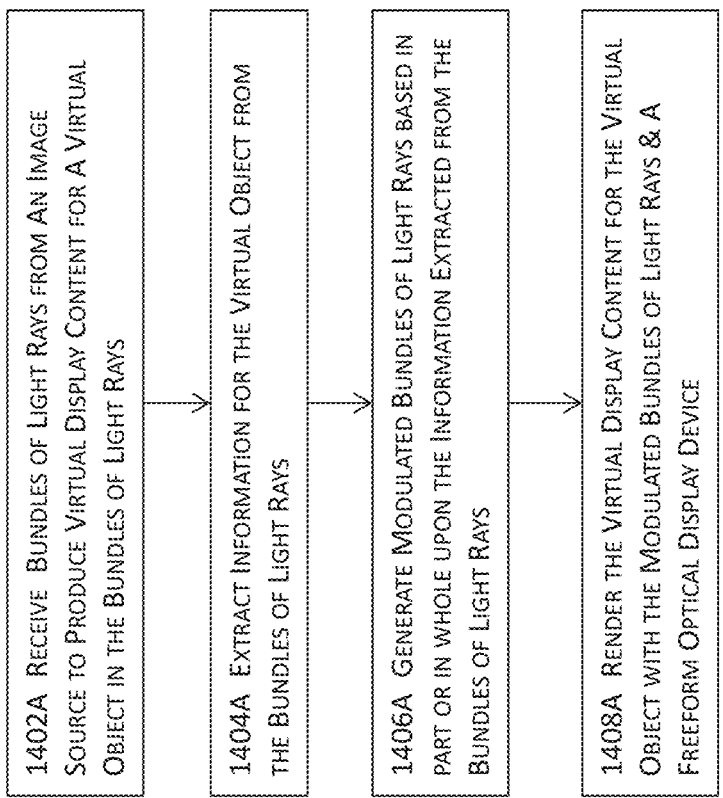
FIG. 14A illustrates a high level flow diagram of a method for generating a light field display with a freeform optical system in some embodiments.

FIG. 14A illustrates a high level flow diagram of a method for generating a light field display with a freeform optical system in some embodiments. In these embodiments, bundles of light rays may be received from an image device at 1402A to produce virtual display content for a virtual object in the bundles of light rays. Information for the virtual object may be extracted at 1404A from the bundles of light rays. For example, colors, radiances, and/or depths of the virtual object that emits the first light rays may be extracted at 1404A from the recording of the bundles of light rays that are subsequently used for reproducing the virtual object in the virtual display content. Modulated bundles of light rays may be generated at 1406A based in part or in whole upon the information extracted from the bundles of light rays. The virtual display content may then be rendered with the modulated bundles of light rays and a freeform optical display device at 1408A. More details about the method for generating a light field display with a freeform optical system illustrated in FIG. 14A will be provided below with reference to FIGS. 14B-D.

Figure 14B:
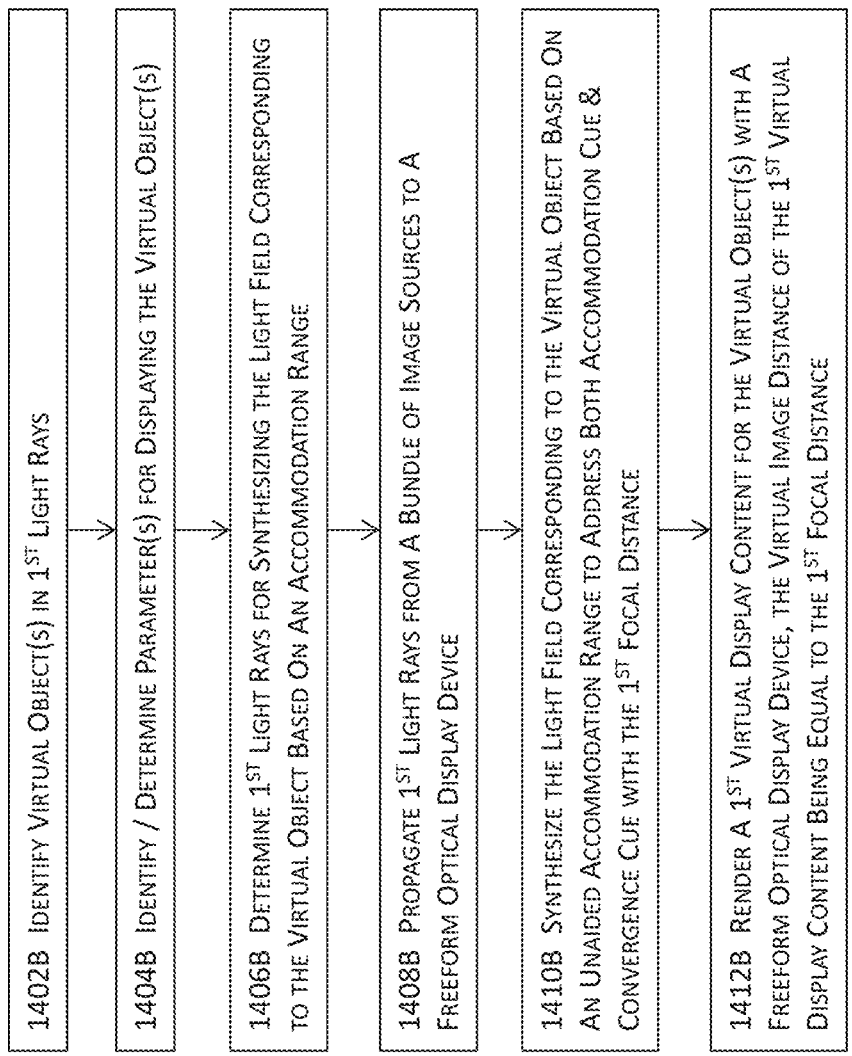
FIG. 14B illustrates a more detailed flow diagram of a method for generating a light field display with a freeform optical system in some embodiments.

FIG. 14B illustrates a flow diagram of a method for generating a light field display with a freeform optical system in some embodiments. In these embodiments illustrated in FIG. 14B, the method may identify a virtual object represented in first light rays at 1402B and identify or determine one or more parameters for displaying the virtual object with the first light rays in a freeform display system at 1404B. The one or more parameters for a first light ray may include the radiance of the first light ray in rendering the virtual object, the virtual depth of the virtual object in the virtual content display rendered by the freeform display system, the location of the part of first light ray for the part (e.g., one or more pixels) of the virtual object rendered by the first light ray, a required or desired resolution, the field of view of the freeform display device, one or more ergonomic parameters, one or more form factors of the freeform display device, or any combination thereof in some embodiments.

At 1406B, the method may determine the first light rays for synthesizing the light field that corresponds to the virtual object based at least in part upon an accommodation range of a user's visual system. In some of these embodiments, the method may determine the first light rays by modulating or mapping light samples of different colors, radiances, and/or the virtual object that emits the first light rays when recording or producing the light rays that may be subsequently used for reproducing the virtual object in virtual display content. The method may extract the radiance and/or depth information form the light rays and use the extracted information to determine where the light rays are to be projected, which image projector(s) is (are) to be used to project the corresponding light rays, and where the image projector(s) is or are projecting the corresponding light rays. At 1408B, the method may transmit the first light rays from a bundle of image sources to a freeform optical display device.

In some of these embodiments, the bundle of image sources includes a plurality of projectors, each injecting one or more light rays to synthesize the light field of the virtual display content. At 1410B, the method may synthesize the light field that corresponds to the identified virtual object based at least in part upon an unaided accommodation range. In some of these embodiments, the method may synthesize the light field to address both the accommodation cues and the convergence cues at certain accommodation range. In addition or in the alternative, the method may synthesize the light field for the virtual object by using the first light rays determined from mapping the light samples of the virtual object to render a stereoscopic view overlaid on the real-world view perceived by a user using the freeform optical display device. At 1412B, the method may further render the first virtual display content for the virtual object with a freeform optical display device. In some embodiments, the method may render the virtual display content at a virtual image distance that is equal to the first focal distance identified or determined in 1410B.

Figure 14C:
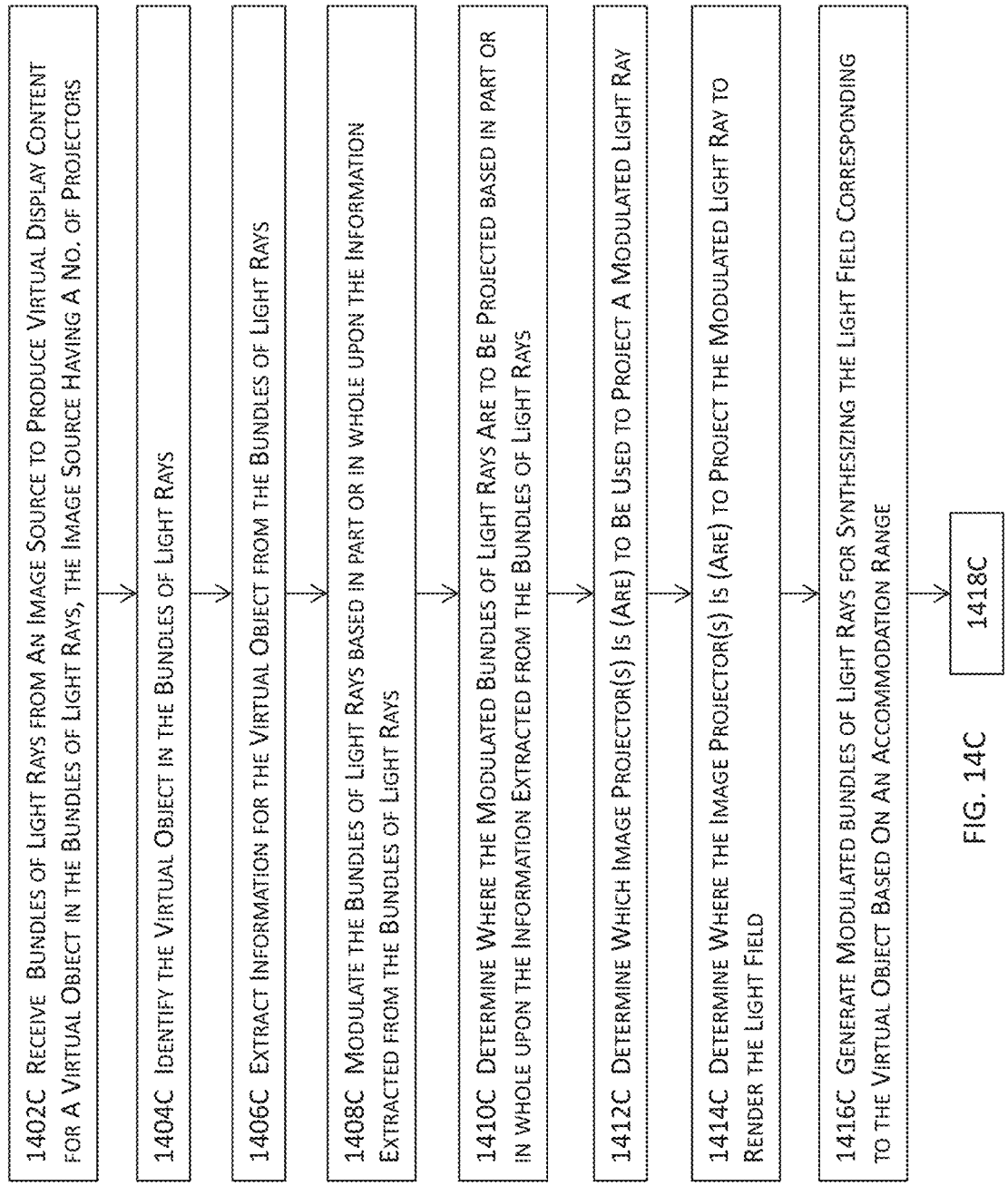
FIGS. 14C-D jointly illustrate another more detailed flow diagram of a method for generating a light field display with a freeform optical system in some embodiments.
Figure 14D:
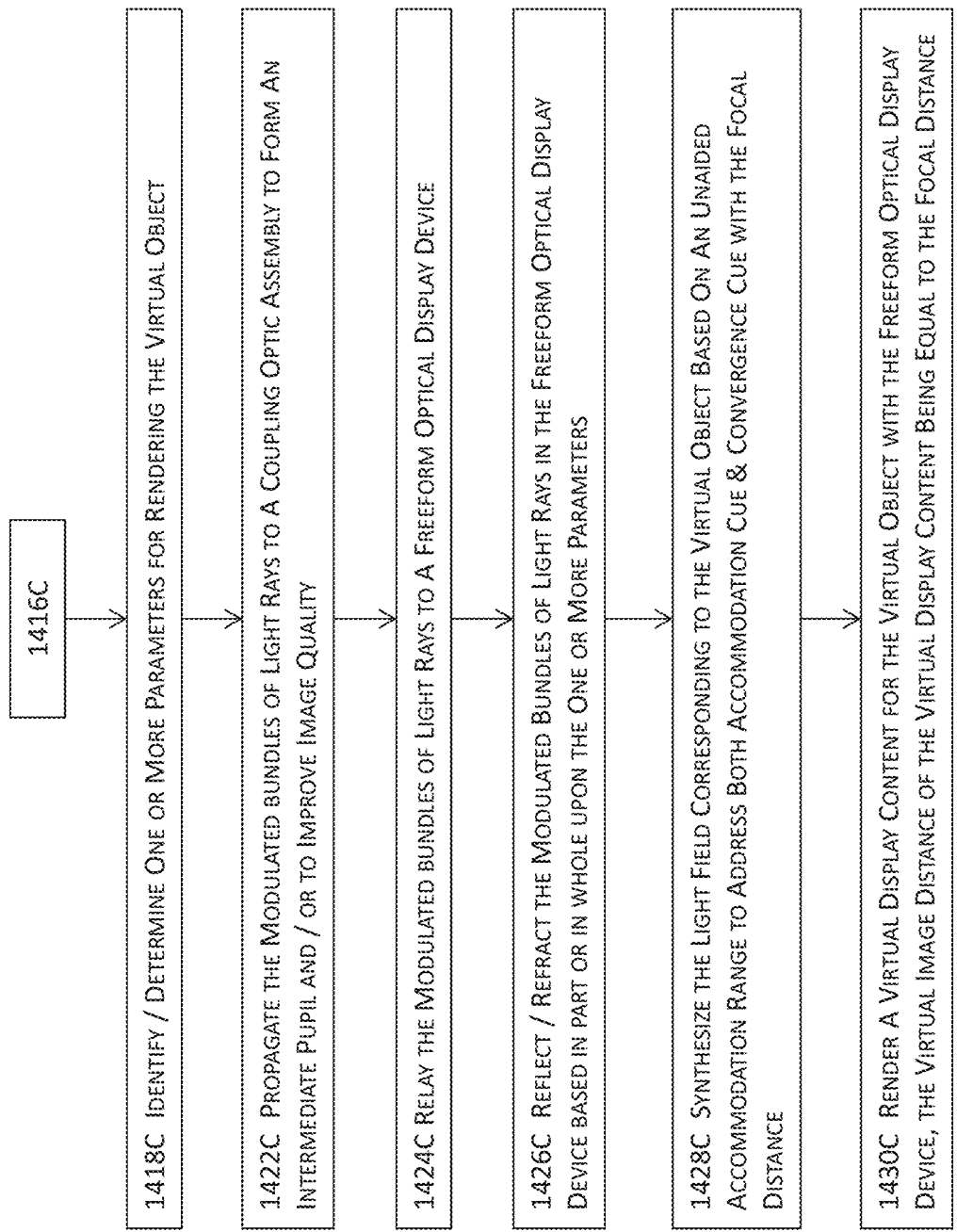

FIGS. 14C-D jointly illustrate another more detailed flow diagram of a method for generating a light field display with a freeform optical system in some embodiments. In these embodiments, bundles of light rays may be received at 1402C from an image source to produce virtual display content for a virtual objet in the bundles of light rays. In some embodiments, the image source includes a number of projectors. In some of these embodiments, the number of projectors in the image source may be determined based in part or in whole upon the desired or required resolution of the virtual display content, the angular resolution of human eyes, a combination thereof, or any other suitable factors.

The virtual object in the bundles of light rays may be identified at 1404C, and information for the virtual object may be extracted at 1406C from the bundles of light rays. In some of these embodiments, the extracted information may include the color(s), radiances, and/or depth information of the virtual object to be rendered in the virtual display content. The bundles of light rays may be modulated at 1408C based in part or in whole upon the information extracted from the bundles of light rays in some embodiments.

Modulating the bundles of light rays may be performed by a computing system that maps light samples of different colors, radiances, and/or depths of the virtual object into modulated light samples or modulated bundles of light rays in some embodiments. At 1410C, where the modulated bundles of light rays are to be projected may be determined based in part or in whole upon the information extracted from the bundles of light rays. At 1412C, which image projector is going to be used to project a modulated light ray or a modulated bundle of light rays may be determined.

At 1414C, where an image projector is to project a modulated light ray or a modulated bundle of light rays to render the light field may also be determined in some embodiments. The modulated bundles of light rays may then be generated at 1416C for synthesizing the light field corresponding to the virtual object based in part or in whole upon an accommodation range. In some embodiments, a computing system may generate the modulated bundles of light rays with modulated colors, radiances, and/or depths as a function of the direction(s) of one or more bundles of light rays. One or more parameters may be determined at 1418C for rendering the virtual object in the virtual content display.

In some embodiments, the one or more parameters include, for example, one or more properties of one or more refractive properties, one or more properties of one or more reflective surfaces, or any other suitable parameters of one or more optical surfaces. The modulated bundles of light rays may then be propagated to a coupling optic assembly at 1422C to form an intermediate pupil and/or to improve image quality. The modulated bundles of light rays may be relayed at 1424C to a freeform optic display device and may be reflected and/or refracted at 1426C within the freeform optic display device based in part or in whole upon the one or more parameters identified or determined at 1418C. The light field corresponding to the virtual object may be synthesized at 1428C based in part or in whole upon an unaided accommodation range to address both the accommodation cue and the convergence cue with the focal distance. The virtual display content may then be rendered for the virtual object with the freeform optical display device at 1430C. In some of these embodiments, the virtual image distance of the virtual display content is equal to the focal distance.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A method for generating stereoscopic images with a variable focusing freeform optical display system for virtual or augmented reality, comprising:
receiving input light beams at an optical system from an image source;
determining a first focal distance for rendering at least a part of the stereoscopic images in focus;
identifying a first focal plane from multiple focal planes for displaying the at least a part of the stereoscopic images based in part or in whole upon the first focal distance;
addressing both accommodation cues and convergence cues with the first focal distance, without tying the accommodation cues or the convergence cues to a fixed focal distance by rendering virtual content of the at least a part of the stereoscopic images on the first focal plane while simultaneously displaying virtual content on at least one other focal plane at a flickering-free display rate;
altering a focal length of a variable focus mechanism for the input light beams based in part or in whole upon positioning of the first focal plane for the stereoscopic images;
propagating the input light beams by using the variable focus mechanism with an altered focal length into a first refractive surface of a freeform optic mechanism, the freeform optic mechanism reflecting the input light beams at least three times and directing the input light beams out of the freeform optic mechanism; and
generating the at least part of the stereoscopic images on the first focal plane with the input light beams using at least the freeform optic mechanism and the first focal distance for virtual or augmented reality presentation with the freeform optic mechanism.

2. The method of claim 1, further comprising:
changing a focal length of the variable focus mechanism by altering optical power of the variable focus mechanism based in part or in whole upon positioning of one or more focal planes for the stereoscopic images.

3. The method of claim 1, further comprising:
propagating the input light beams to one or more beam splitters through a first optic; and
redirecting the input light beams to the variable focus mechanism through the one or more beam splitters.

4. The method of claim 3, further comprising:
redirecting the input light beams back to the one or more beam splitters with the variable focus mechanism with an altered focal length; and
propagating the input light beams from the one or more beam splitters to the freeform optic mechanism.

5. The method of claim 1, further comprising:
identifying a requirement for changing focal planes for the stereoscopic images produced by the freeform optical display mechanism;
providing one or more controls to alter the focal length of the variable focus mechanism based in part or in whole upon the requirement; and
altering the focal length of the variable focus mechanism into an altered focal length with the one or more controls.

6. The method of claim 5, further comprising:
propagating the input light beams from the variable focus mechanism with the altered focal length to the freeform optic mechanism; and
generating the stereoscopic images on the one or more focal planes for virtual or augmented reality presentation with the freeform optic mechanism.

7. The method of claim 1, further comprising:
addressing the first focal distance by using the variable focus mechanism of the freeform optical display mechanism.

8. The method of claim 7, the act of addressing the first focal distance comprising:
varying optical power of an addressable variable focusing element in the variable focus mechanism to change the first focal distance for rendering the at least the part of the stereoscopic images.

9. A variable focusing freeform optical display system for generating stereoscopic images for virtual or augmented reality, comprising:
an image source emitting input light beams into an optical system;
a variable focus mechanism having a focal length that is altered into an altered focal length based in part or in whole upon positioning of at least one focal plane for the stereoscopic images; and
a freeform optic mechanism to receive the input light beams directed by the variable focus mechanism with an altered focal length to generate the stereoscopic images on the at least one focal plane for virtual or augmented reality presentation with the freeform optic mechanism, the freeform optic mechanism configured to propagate the input light beams through a first refractive surface of the freeform optic mechanism, internally reflect the input light beams at least three times and direct the input light beams out of the freeform optic mechanism
wherein the variable focusing freeform optical display system is configured to:
receive input light beams at an optical system from the image source;
determine a first focal distance for rendering at least a part of the stereoscopic images in focus;
identify a first focal plane from multiple focal planes for displaying the at least a part of the stereoscopic images based in whole or in part on the first focal distance;
address both accommodation cues and convergence cues with the first focal distance, without tying the accommodation cues or the convergence cues to a fixed focal distance by rendering virtual content of the at least a part of the stereoscopic images on the first focal plane while simultaneously displaying virtual content on at least one other focal plane at a flickering-free display rate;
alter a focal length of a variable focus mechanism for the input light beams based in part or in whole upon positioning of the first focal plane for the stereoscopic images;
propagate the input light beams by using the variable focus mechanism with an altered focal length into the first refractive surface of a freeform optic mechanism, reflect the input light beams at least three times and direct the input light beams out of the freeform optic mechanism; and generate the at least part of the stereoscopic images with the input light beams on the first focal plane using at least the freeform optic mechanism and the first focal distance for virtual or augmented reality presentation with the freeform optic mechanism.

10. The variable focusing freeform optical display system of claim 9, wherein the variable focus mechanism is one of a deformable mirror, deformable membrane mirror or a liquid lens.

11. The variable focusing freeform optical display system of claim 9, further comprising:

one or more beam splitters to receive the input light beams propagated from the image source through a first optic to redirect the input light beams to the variable focus mechanism.

12. The variable focusing freeform optical display system of claim 11, wherein the one or more beam splitters are to redirect the input light beams back to the variable focus mechanism with an altered focal length, and the input light beams are to be propagated from the one or more beam splitters to the freeform optic mechanism.

13. The variable focusing freeform optical display system of claim 9, wherein the variable focus mechanism is configured to alter a focal length of the variable focus mechanism with one or more controls based in part or in whole upon a requirement for changing focal planes for the stereoscopic images produced by the freeform optical display mechanism.

14. The variable focusing freeform optical display system of claim 13, wherein the variable focus mechanism is operatively coupled with the freeform optic mechanism to propagate the input light beams from the variable focus mechanism with the altered focal length to the freeform optic mechanism, and the freeform optic mechanism is to generate the stereoscopic images on the one or more focal planes for virtual or augmented reality presentation.

15. An optical display system comprising:

an image source configured to emit light beams;

a variable focus mechanism optically coupled to the image source and configured to impart a controllable amount of optical power to light beams received from the image source;

viewing optics optically coupled to the variable focus mechanism and configured to direct light beams received from the variable focus mechanism to a user, the viewing optics including a freeform optic mechanism to propagate the input light beams through a first refractive surface of the freeform optic mechanism, internally reflect the input light beams at least three times and direct the input light beams out of the freeform optic mechanism; and control circuitry communicatively coupled to the image source and the variable focus mechanism, the control circuitry configured to:

identify, from among a plurality of different focal planes, a first focal plane on which one or more images of virtual content are to be displayed;

determine a first focal distance of the first focal plane for rendering at least a part of one or more images of virtual content in focus;

address both accommodation cues and convergence cues with the first focal distance, without tying the accommodation cues or the convergence cues to a fixed focal distance, by rendering the one or more images of virtual content on the first focal plane while simultaneously displaying virtual content on at least one other focal plane at a flickering-free display rate;

display the one or more images of virtual content on the first focal plane to the user through the viewing optics using at least the freeform optic mechanism and the first focal distance, wherein to display the one or more images of virtual content the control circuitry is configured to contemporaneously:

control the image source to emit light beams corresponding to the one or more images of virtual content; and control the variable focus mechanism to impart at least one amount of optical power corresponding to the first focal plane to light beams received from the image source, respectively.

16. The optical display system of claim 15 further comprising:

at least one beam splitter configured to optically couple the image source to the variable focus mechanism.

17. The optical display system of claim 16, wherein the at least one beam splitter is further configured to optically couple the variable focus mechanism to the viewing optics.

* * * * *